(12) United States Patent
Goto et al.

(10) Patent No.: US 11,966,550 B2
(45) Date of Patent: Apr. 23, 2024

(54) SENSOR MODULE AND ELECTRONIC DEVICE

(71) Applicant: Sony Group Corporation, Tokyo (JP)

(72) Inventors: Tetsuro Goto, Tokyo (JP); Ken Kobayashi, Tokyo (JP); Kei Tsukamoto, Tokyo (JP); Tomoko Katsuhara, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/790,396

(22) PCT Filed: Jan. 29, 2021

(86) PCT No.: PCT/JP2021/003126
§ 371 (c)(1),
(2) Date: Jun. 30, 2022

(87) PCT Pub. No.: WO2021/153700
PCT Pub. Date: Aug. 5, 2021

(65) Prior Publication Data
US 2023/0043375 A1  Feb. 9, 2023

(30) Foreign Application Priority Data

Jan. 31, 2020  (JP) .................................. 2020-015400

(51) Int. Cl.
*G06F 3/044* (2006.01)
*G06F 3/041* (2006.01)

(52) U.S. Cl.
CPC .......... *G06F 3/0446* (2019.05); *G06F 3/0414* (2013.01); *G06F 3/0445* (2019.05);
(Continued)

(58) Field of Classification Search
CPC .... G06F 3/0446; G06F 3/0445; G06F 3/0447; G06F 3/0414; G06F 2203/04102; G06F 2203/04106
(Continued)

(56) References Cited

U.S. PATENT DOCUMENTS

2009/0031825 A1  2/2009  Kishida et al.
2013/0279769 A1* 10/2013  Benkley, III .......... G06F 3/0445
382/124
(Continued)

FOREIGN PATENT DOCUMENTS

EP      2772838 A1    9/2014
JP      2009034742 A  2/2009
(Continued)

OTHER PUBLICATIONS

Nakai Yuriko et al: "Tangential Force Input for Touch Panel Using Shear Deformation of Gel Layer", ISPJ Interaction 2014, Feb. 27, 2014 (Feb. 27, 2014), pp. 212-215, XP093048352, Retrieved from the Internet: URL:http://www.interaction-ipsj.org/proceedings/2014/data/20140220/A2-1.pdf [retrieved on May 22, 2023].
(Continued)

*Primary Examiner* — Kwin Xie
(74) *Attorney, Agent, or Firm* — K&L Gates LLP

(57) ABSTRACT

A sensor module includes a sensor that includes a first sensor layer of a capacitance type including a plurality of first detection units arranged two-dimensionally and a second sensor layer of a capacitance type including a plurality of second detection units arranged two-dimensionally, the first sensor layer being provided on the second sensor layer, and a control unit that scans the plurality of first detection units and the plurality of second detection units.

21 Claims, 34 Drawing Sheets

(52) U.S. Cl.
CPC .. *G06F 3/0447* (2019.05); *G06F 2203/04102* (2013.01); *G06F 2203/04106* (2013.01)

(58) Field of Classification Search
USPC .................................................. 345/173–174
See application file for complete search history.

(56) References Cited

U.S. PATENT DOCUMENTS

| | | |
|---|---|---|
| 2015/0070306 A1 | 3/2015 | Shinkai et al. |
| 2015/0261360 A1* | 9/2015 | Chang .................. G06F 3/0445 345/174 |
| 2017/0010730 A1* | 1/2017 | Chuang ............... G06F 3/04166 |
| 2017/0242523 A1* | 8/2017 | Hoch .................. G06F 3/04144 |
| 2017/0315662 A1* | 11/2017 | Reynolds .............. G06F 3/0412 |
| 2017/0356812 A1* | 12/2017 | Madden ............... H03K 17/962 |
| 2018/0267660 A1* | 9/2018 | Shepelev .............. G06F 3/0446 |
| 2019/0004625 A1 | 1/2019 | Chen |
| 2019/0050080 A1* | 2/2019 | Bagheri .................. G06F 3/044 |
| 2019/0212860 A1 | 7/2019 | Chou |
| 2021/0109627 A1 | 4/2021 | Goto et al. |

FOREIGN PATENT DOCUMENTS

| | | |
|---|---|---|
| JP | 2015056005 A | 3/2015 |
| KR | 20160086689 A | 7/2016 |
| WO | 2018186022 A1 | 10/2018 |

OTHER PUBLICATIONS

International Search Report from corresponding PCT application PCT/JP2021/003126, dated Apr. 20, 2021.

* cited by examiner

FIG. 12
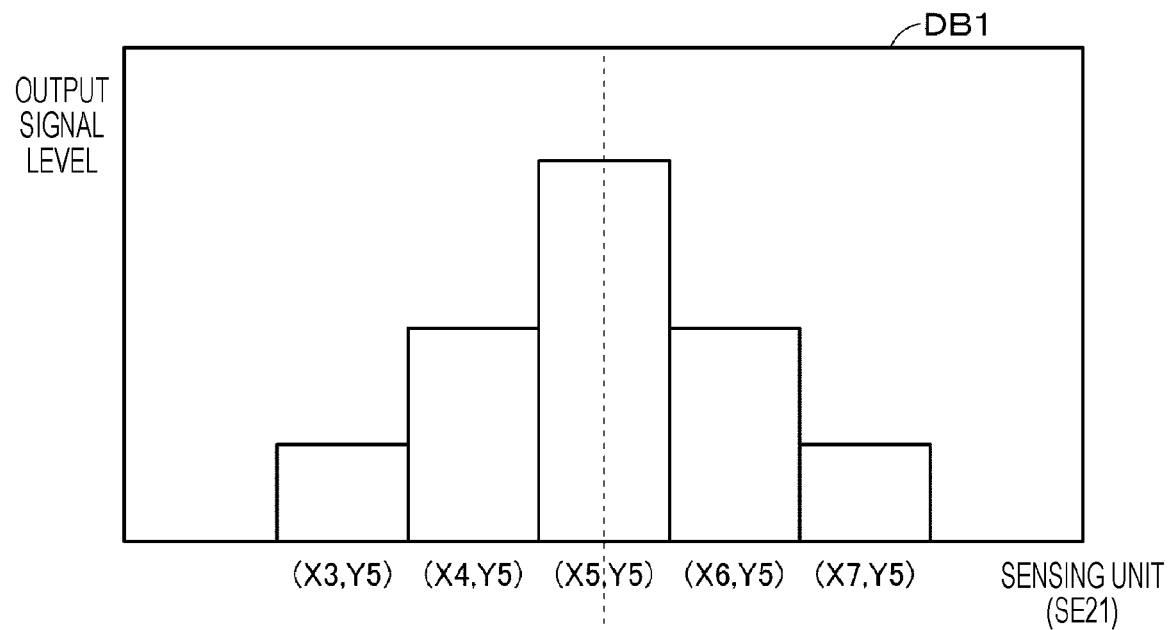
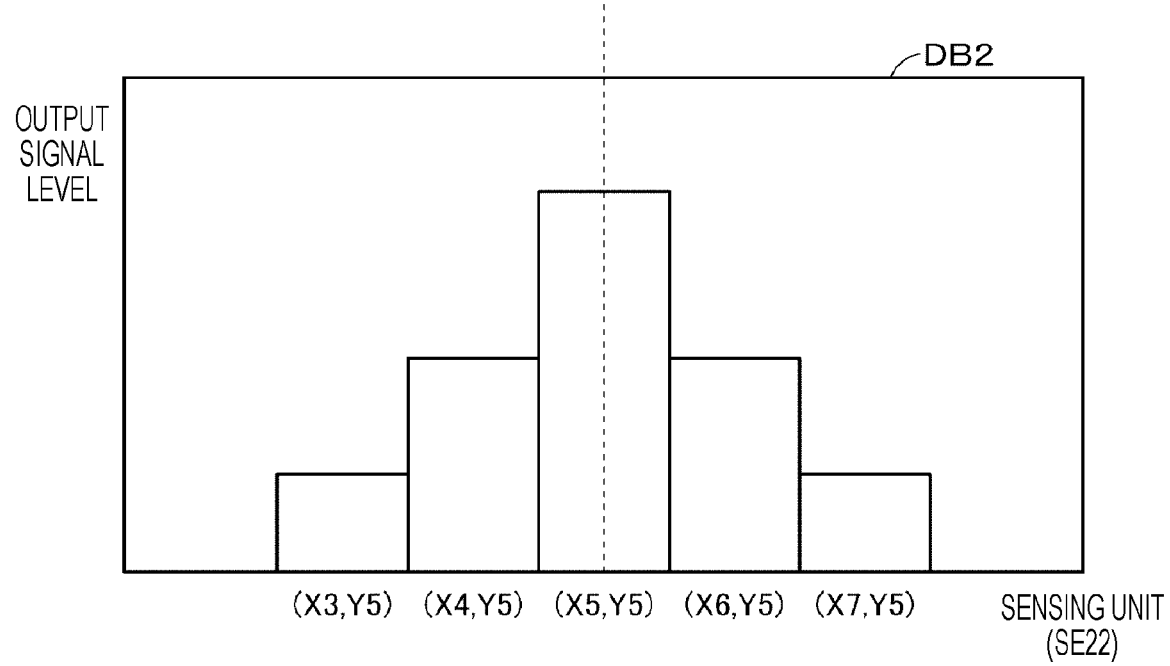

FIG. 24
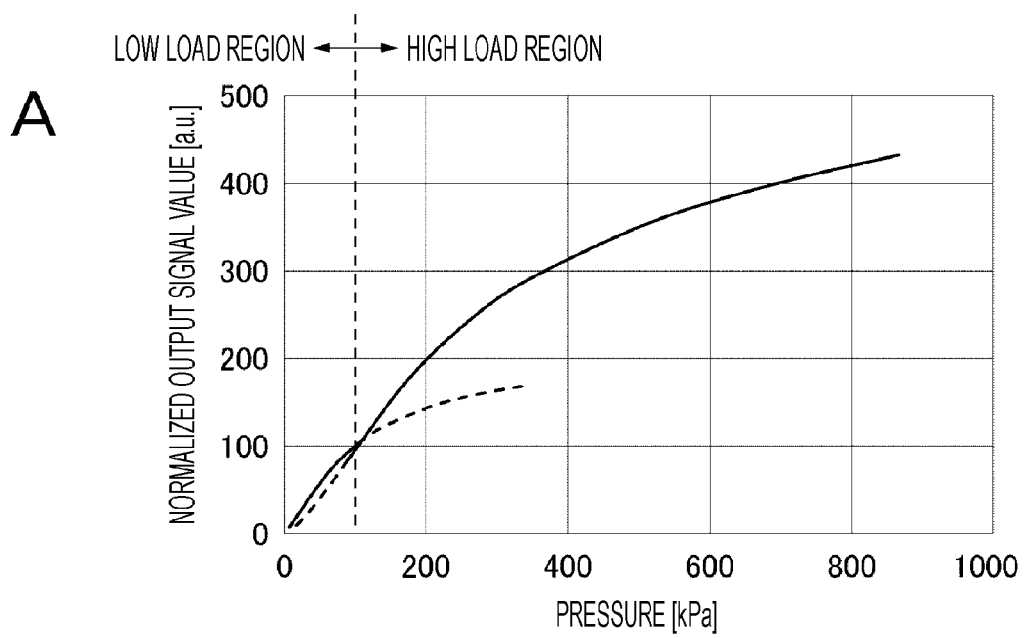
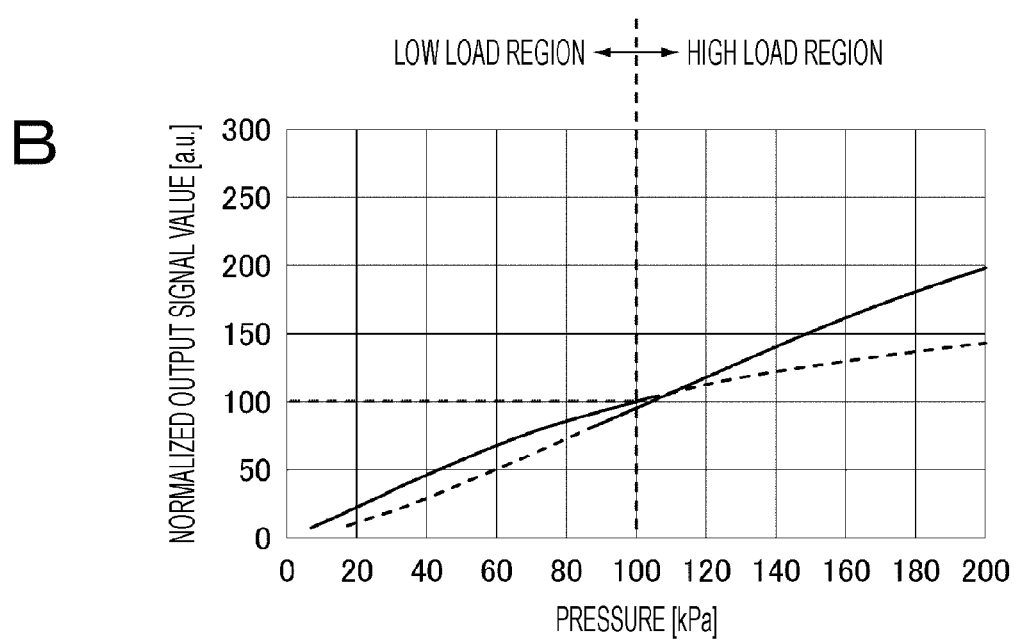

FIG. 25
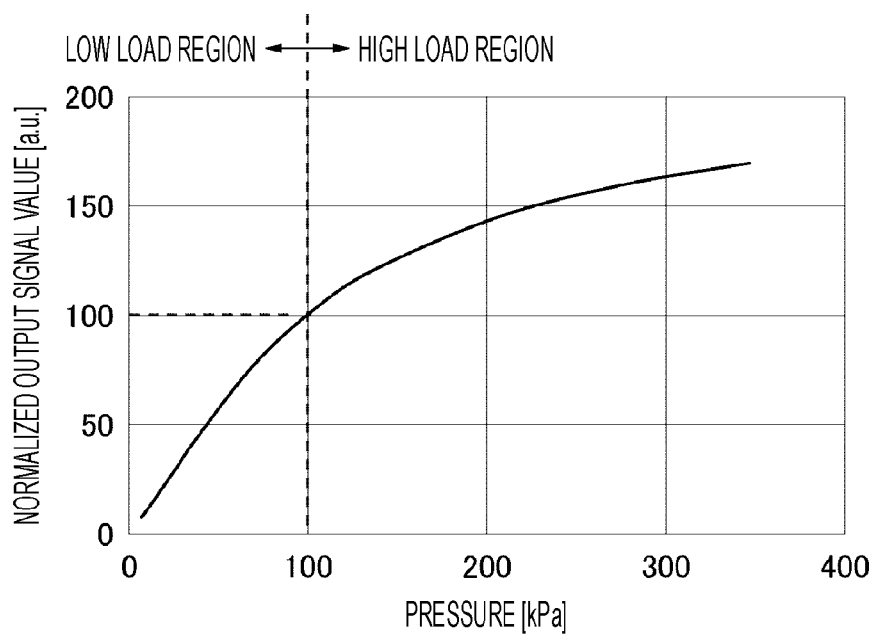
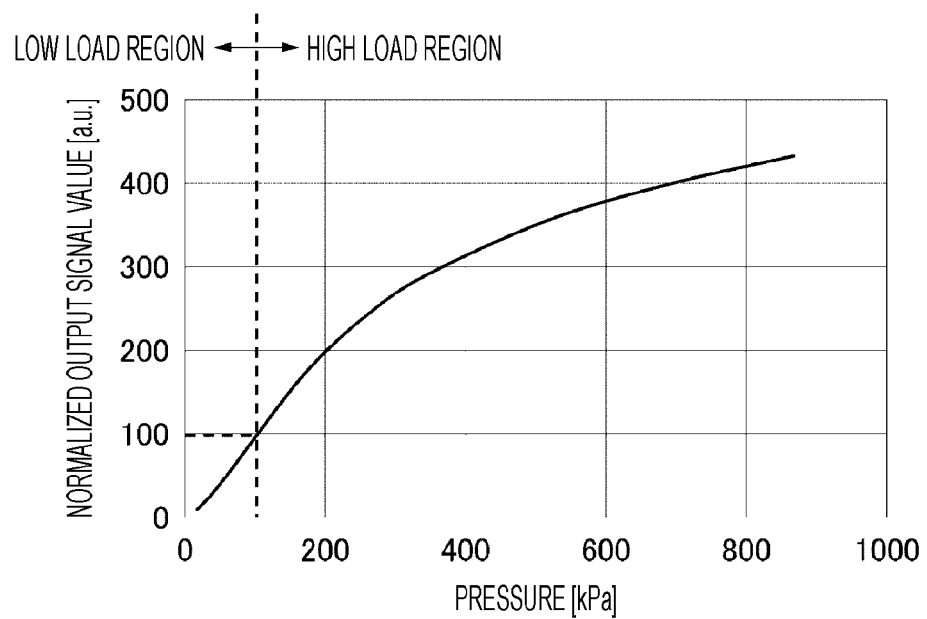

FIG. 30
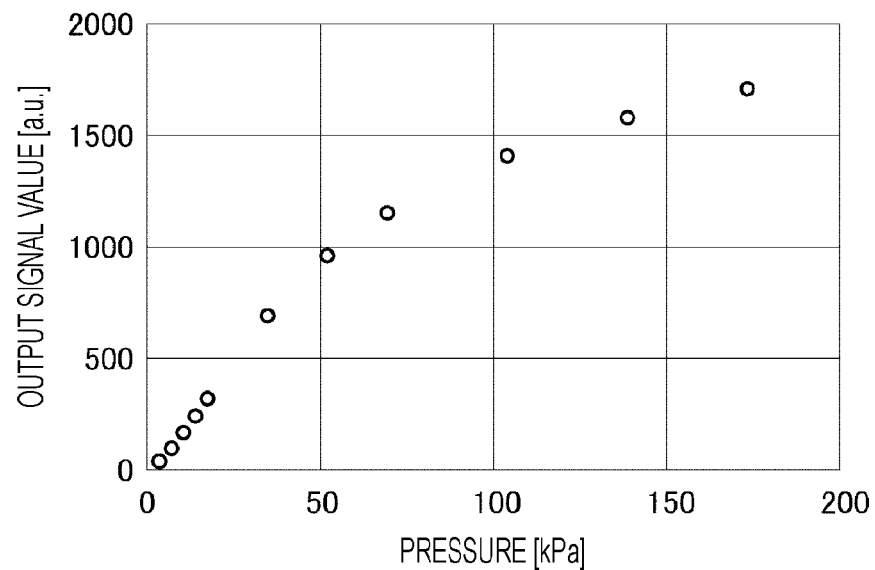
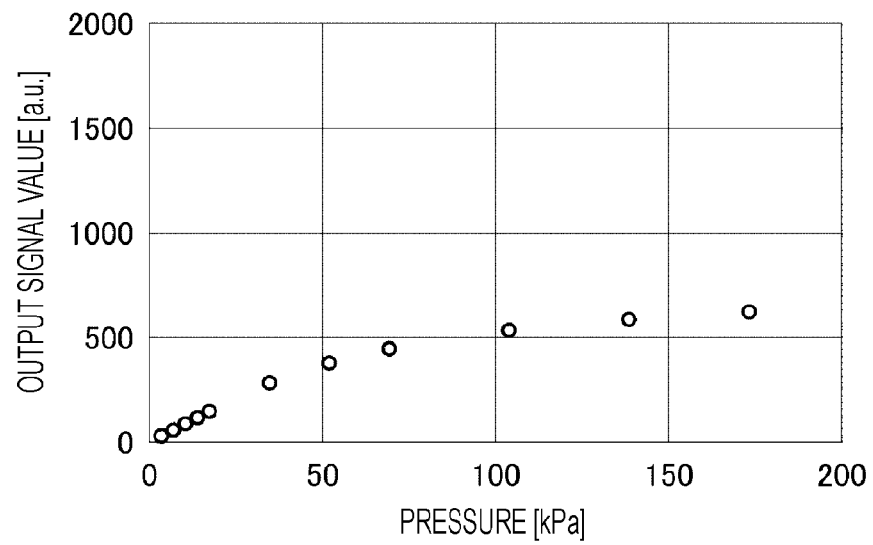

FIG. 31
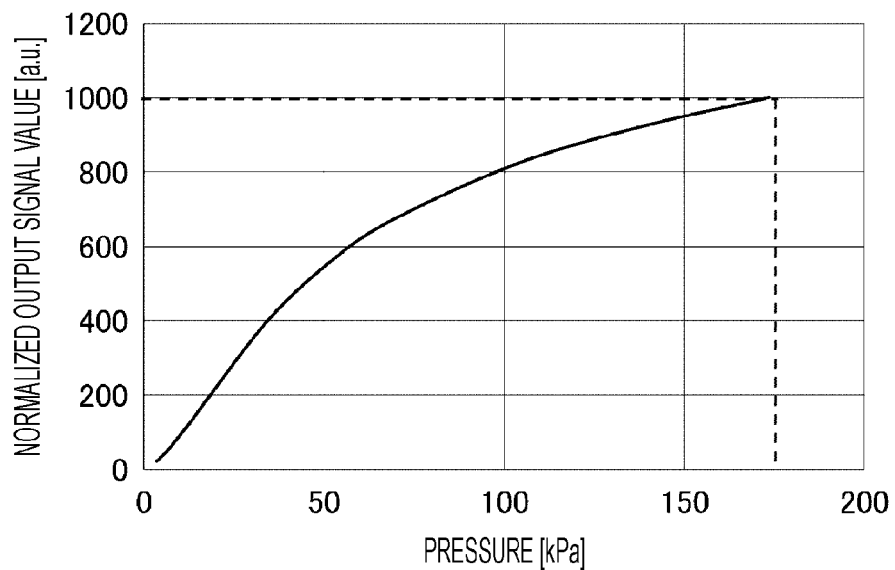
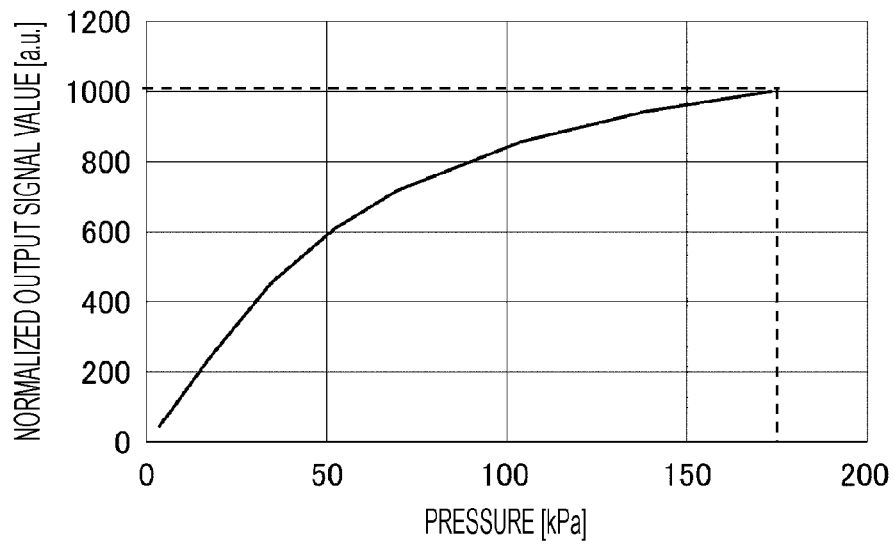

FIG. 32
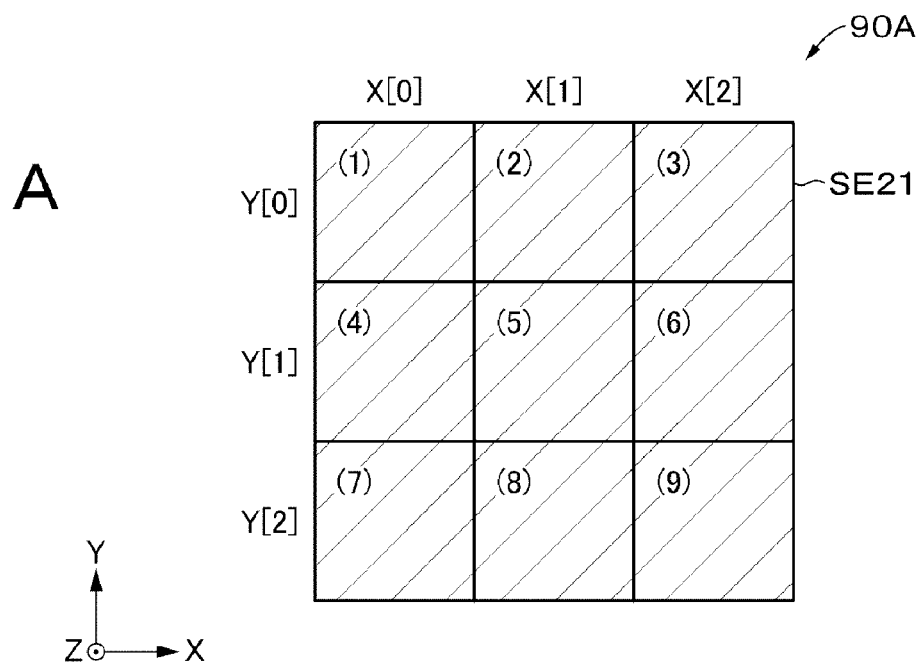
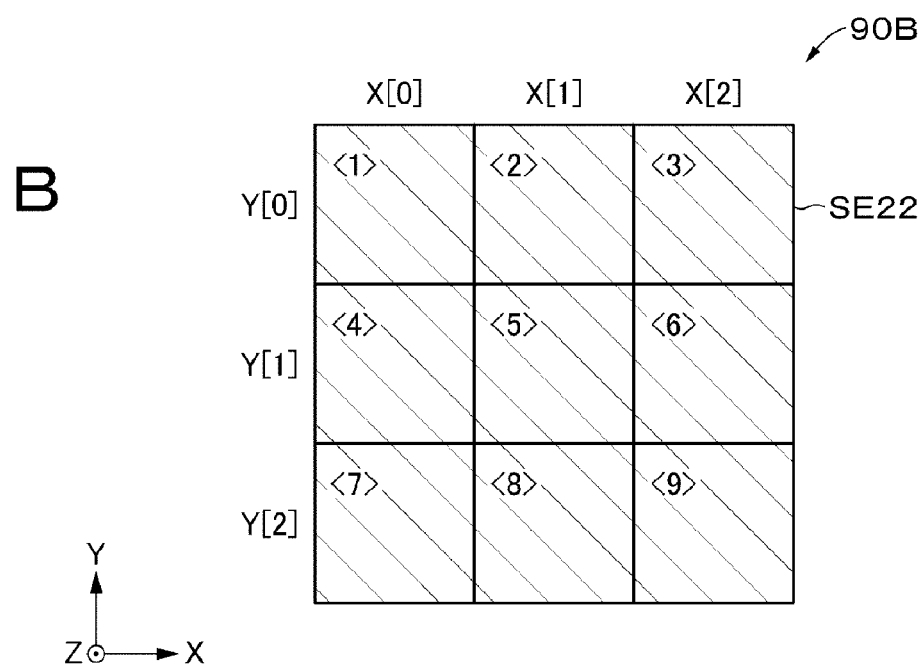

SENSOR MODULE AND ELECTRONIC DEVICE

TECHNICAL FIELD

The present disclosure relates to a sensor module and an electronic device including the same.

BACKGROUND ART

In recent years, a sensor module capable of detecting a pressure or the like is widely used in various electronic devices such as a mobile personal computer (PC) and a tablet PC. As the sensor module, sensor modules having various configurations have been studied.

For example, Patent Document 1 discloses a sensor module that detects a slip using a pressure sensor formed by interposing a first viscoelastic body that is deformed by an external load and causes stress dispersion between a first detection unit and a second detection unit that detect a pressure.

CITATION LIST

Patent Document

Patent Document 1: Japanese Patent Application Laid-Open No. 2009-34742

SUMMARY OF THE INVENTION

Problems to be Solved by the Invention

However, in the sensor module disclosed in Patent Document 1, since the first detection unit and the second detection unit are scanned by separate sensor integrated circuits (ICs), there is a problem that the configuration of the sensor module becomes complicated.

An object of the present disclosure is to provide a sensor module capable of suppressing complication of a configuration and an electronic device including the sensor module.

Solutions to Problems

In order to solve the above problem, a first disclosure is a sensor module including a sensor that includes a first sensor layer of a capacitance type including a plurality of first detection units arranged two-dimensionally and a second sensor layer of a capacitance type including a plurality of second detection units arranged two-dimensionally, the first sensor layer being provided on the second sensor layer, and a control unit that scans the plurality of first detection units and the plurality of second detection units.

A second disclosure is a sensor module including a sensor that includes a first sensor layer having a plurality of first detection units arranged two-dimensionally and a second sensor layer having a plurality of second detection units arranged two-dimensionally, the first sensor layer being provided on the second sensor layer, and a control unit that scans the plurality of first detection units and the plurality of second detection units.

A third disclosure is an electronic device including the sensor module of the first disclosure or the second disclosure.

BRIEF DESCRIPTION OF DRAWINGS

FIG. 12 is a graph illustrating an example of output signal distributions of a first detection layer and a second detection layer in a state where a pressure acts on the sensor.

FIG. 24A is a graph illustrating an example of a load sensitivity curve of the sensor.

FIG. 24B is an enlarged graph illustrating a part of FIG. 24A (near a boundary between a low load region and a high load region).

FIG. 25A is a graph illustrating an example of a load sensitivity curve of a sensor layer as an upper layer.

FIG. 25B is a graph illustrating an example of a load sensitivity curve of a sensor layer as a lower layer.

FIG. 30A is a graph illustrating an example of a load sensitivity curve of the upper sensor layer.

FIG. 30B is a graph illustrating an example of a load sensitivity curve of the lower sensor layer.

FIG. 31A is a graph obtained by normalizing the load sensitivity curve in FIG. 30A.

FIG. 31B is a graph obtained by normalizing the load sensitivity curve in FIG. 30B.

FIG. 32A is a schematic diagram of a plurality of detection units included in the upper sensor layer.

FIG. 32B is a schematic diagram of a plurality of detection units included in the lower sensor layer.

MODE FOR CARRYING OUT THE INVENTION

Figure 1:
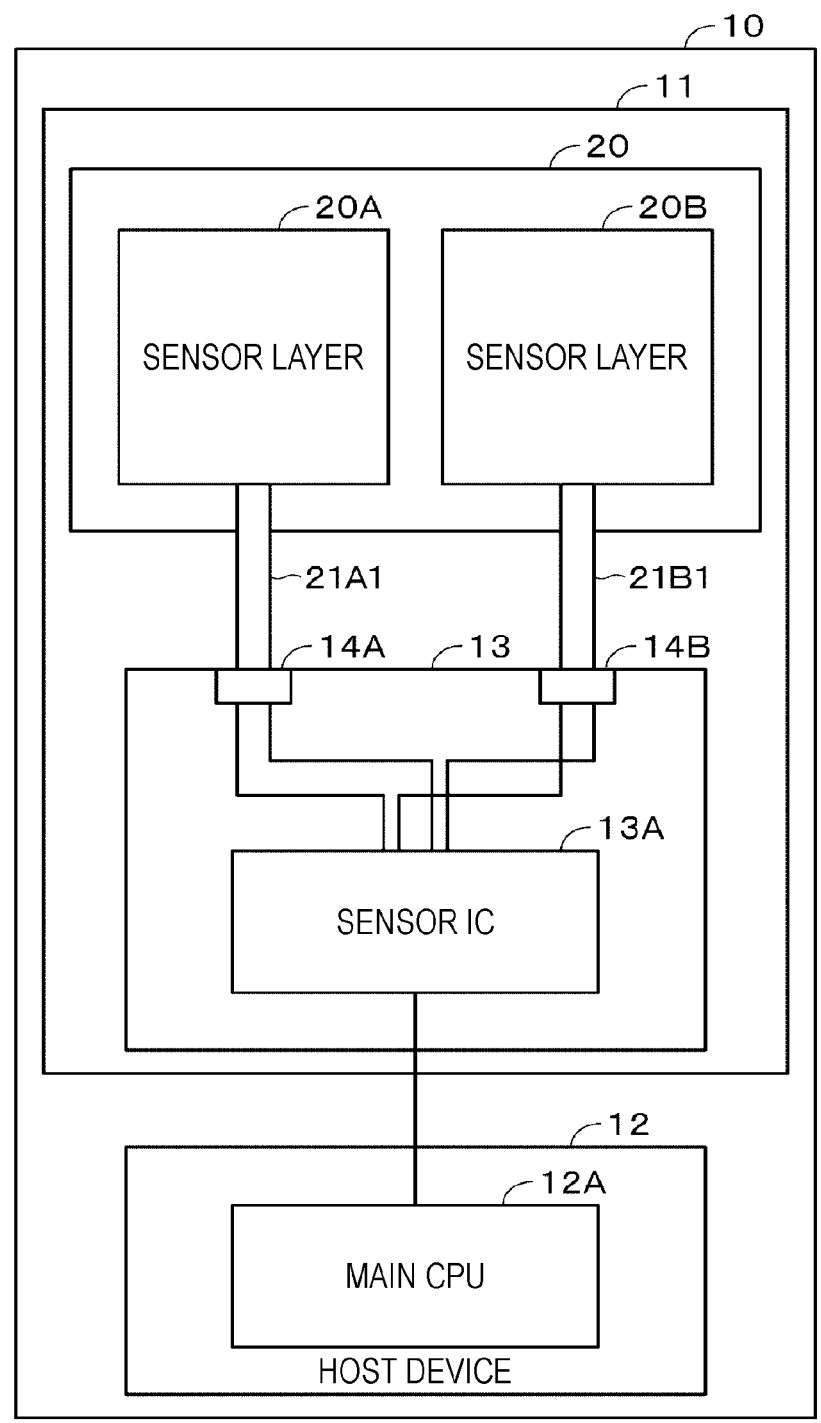
FIG. 1 is a block diagram illustrating an example of a configuration of an electronic device according to a first embodiment of the present disclosure.

The embodiments of the present disclosure will be described in the following order. Note that in all the drawings of the following embodiments, the same or corresponding parts are denoted by the same reference numerals.

1. First embodiment (example of sensor and electronic device including sensor)
2. Second embodiment (example of sensor)
3. Third embodiment (example of sensor)
4. Fourth embodiment (example of sensor)
5. Fifth embodiment (example of Sensor)
6. Sixth embodiment (example of sensor)
7. Seventh embodiment (example of sensor)
8. Modification example
9. Application example

1. First Embodiment

[Configuration of Electronic Device]

FIG. 1 is a block diagram illustrating an example of a configuration of an electronic device 10 according to a first embodiment of the present disclosure. The electronic device 10 includes a sensor module 11 and a host device 12 which is a main body of the electronic device 10. The host device 12 includes a main central processing unit (CPU) (hereinafter simply referred to as "CPU") 12A and an exterior member (not illustrated) such as a housing, and three-axis forces acting on a surface of the exterior member is detected by the sensor module 11, thereby operating according to a detection result.

(Sensor Module)

The sensor module 11 includes a sensor 20 and a sensor board 13. The sensor 20 is a three-axis force sensor (combined sensor) capable of detecting a pressure and a shearing force. The sensor 20 includes a sensor layer (first sensor layer) 20A and a sensor layer (second sensor layer) 20B. On the sensor board 13, a sensor IC (hereinafter, simply referred to as "IC") 13A as a control unit, a connector 14A, and a connector 14B are provided.

The sensor layers 20A and 20B have connection portions 21A1 and 21B1, respectively. The connection portion 21A1 connects the sensor layer 20A to the connector 14A of the sensor board 13. The connection portion 21B1 connects the sensor layer 20B to the connector 14B of the sensor board 13. The sensor layers 20A and 20B are configured to be capable of detecting a pressure acting on the surface of the sensor 20 as a capacitance distribution.

The sensor 20 is provided on a surface of an exterior member of the electronic device 10. The surface of the exterior member may be a flat surface or a curved surface. The sensor 20 is configured to be capable of detecting, in a surface distribution, three-axis forces acting between the surface of the sensor 20 and an object in contact with the surface. The sensor 20 detects the pressure and the shearing force acting on the sensor 20 as a capacitance distribution, and outputs a detection result to the IC 13A.

The IC 13A controls the sensor 20, acquires a capacitance distribution according to the pressure and the shearing force acting on the sensor 20, and outputs an acquisition result to the CPU 12A of the host device 12. The CPU 12A calculates three-axis forces applied to the sensor 20 on the basis of an output signal (capacitance distribution) from the IC 13A, and executes various controls of the host device 12 on the basis of the calculation result.

[Configuration of Sensor]

Figure 2:
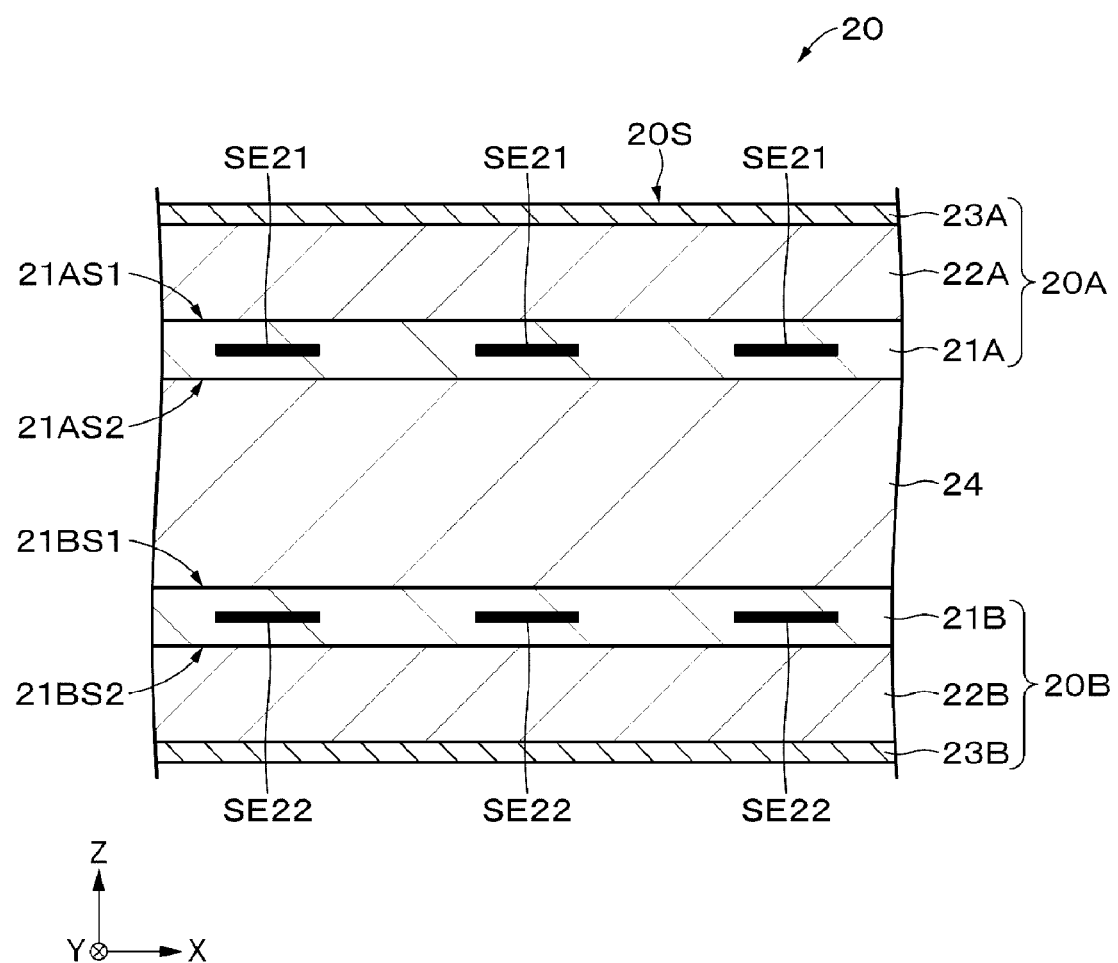
FIG. 2 is a cross-sectional view illustrating an example of a configuration of a sensor.

FIG. 2 is a cross-sectional view illustrating an example of a configuration of the sensor 20. The sensor 20 is a capacitance type sensor capable of detecting a three-axis force distribution, and detects a pressure acting on the surface of the sensor 20 and a shearing force in an in-plane direction of the sensor 20. The sensor 20 has a film shape. In the present disclosure, the film is defined to include a sheet. Since the sensor 20 has a film shape, the sensor can be applied not only to a flat surface but also to a curved surface. In the present description, axes orthogonal to each other in a plane of a surface of the sensor 20 in a flat state are referred to as an X axis and a Y axis, respectively, and an axis perpendicular to a surface of the sensor 20 in the flat state is referred to as a Z axis.

Of both surfaces of the sensor 20, a first surface on a conductive layer 23A side is a sensing surface 20S that detects the pressure and the shearing force, and a second surface opposite to the sensing surface 20S is a back surface to be bonded to an exterior member such as a housing.

The sensor 20 includes a sensor layer (first sensor layer) 20A, a sensor layer (second sensor layer) 20B, and a separation layer 24. The sensor layer 20A is provided above the sensor layer 20B. The separation layer 24 is provided between the sensor layer 20A and the sensor layer 20B. The sensor layer 20A and the sensor layer 20B are held in parallel by the separation layer 24. The sensor layer 20A and the sensor layer 20B are sensor layers of a capacitance type, more specifically, a mutual capacitance type. The sensor layer 20A and the sensor layer 20B are pressure distribution sensor layers capable of detecting a pressure distribution acting on the sensing surface 20S.

The sensor layer 20A includes a detection layer (first detection layer) 21A, a deformation layer (first deformation layer) 22A, and a conductive layer (first conductive layer) 23A. The detection layer 21A has a first surface 21AS1 and a second surface 21AS2 opposite to the first surface 21AS1. The conductive layer 23A is provided to face the first surface 21AS1 of the detection layer 21A. The deformation layer 22A is provided between the detection layer 21A and the conductive layer 23A. The detection layer 21A and the conductive layer 23A are held in parallel by the deformation layer 22A.

The sensor layer 20B includes a detection layer (second detection layer) 21B, a deformation layer (second deformation layer) 22B, and a conductive layer (second conductive layer) 23B. The detection layer 21B has a first surface 21BS1 facing the second surface 21AS2 of the detection layer 21A and a second surface 21BS2 opposite to the first surface 21BS1. The conductive layer 23B is provided to face the second surface 21BS2 of the detection layer 21B. The deformation layer 22B is provided between the detection layer 21B and the conductive layer 23B. The detection layer 21B and the conductive layer 23B are held in parallel by the deformation layer 22B.

Adhesive layers that are not illustrated are provided between the respective layers of the sensor 20, bonding the layers to each other. However, in a case where at least one of the two adjacent layers has adhesiveness, the adhesive layer may not be provided.

(Detection Layer)

The detection layer 21A has flexibility. The detection layer 21A bends toward the sensor layer 20B when a pressure acts on the sensing surface 20S. The detection layer 21A includes a plurality of detection units (first detection units) SE21. A detection unit SE21 detects a pressure acting on the sensing surface 20S and outputs a detection result to the IC 13A. Specifically, the detection unit SE21 detects a capacitance corresponding to a distance between the detection unit SE21 and the conductive layer 23A, and outputs a detection result to the IC 13A.

The detection layer 21B has flexibility. The detection layer 21B bends toward the conductive layer 23B when a pressure acts on the sensing surface 20S. The detection layer 21B includes a plurality of detection units (second detection units) SE22. A detection unit SE22 detects a pressure acting on the sensing surface 20S and outputs a detection result to the IC 13A. Specifically, the detection unit SE22 detects a capacitance corresponding to a distance between the detection unit SE22 and the conductive layer 23B, and outputs a detection result to the IC 13A.

An arrangement pitch P1 of the plurality of detection units SE21 included in the detection layer 21A is the same as an arrangement pitch P2 of the plurality of detection units SE22 included in the detection layer 21B. In an initial state where no shearing force is applied, the detection unit SE22 is provided at a position facing the detection unit SE21. That is, in the initial state where no shearing force is applied, the detection unit SE21 and the detection unit SE22 overlap each other in the thickness direction of the sensor 20. However, it is also possible to employ a configuration in which the detection unit SE22 is not provided at a position facing the detection unit SE21 in the initial state where no shearing force is applied.

Since the detection layer 21B has a configuration similar to that of the detection layer 21A, only the configuration of the detection layer 21A will be described below.

Figure 3:
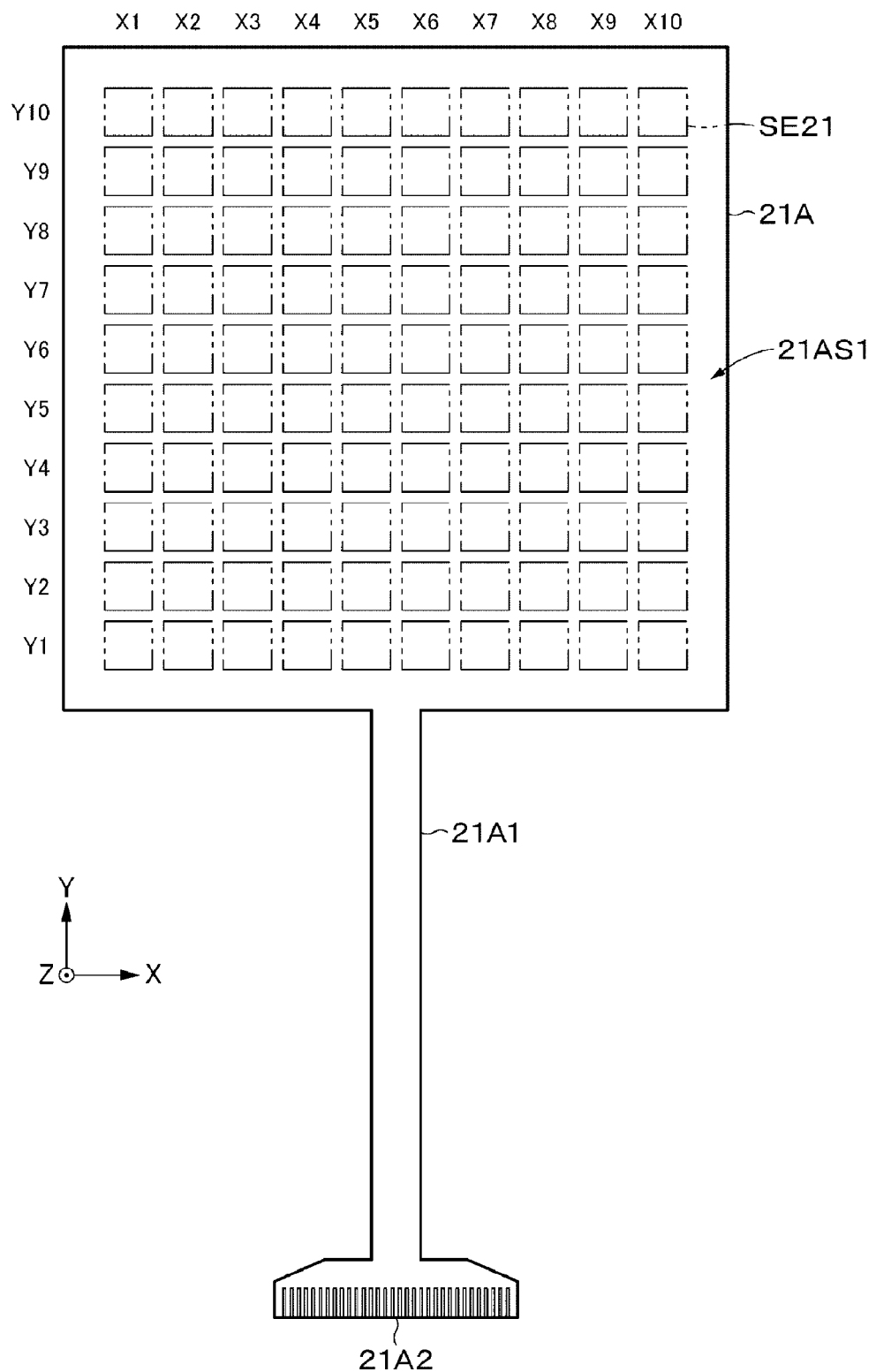
FIG. 3 is a plan view illustrating an example of a configuration of a detection layer.

FIG. 3 is a plan view illustrating an example of a configuration of the detection layer 21A. The plurality of detection units SE21 is arranged in a matrix. FIG. 3 illustrates an example in which a row direction of a matrix array is the X-axis direction and a column direction is the Y-axis direction. However, an arrangement form of the plurality of detection units SE21 is not limited to the matrix-like arrangement, and may be a two-dimensional arrangement other than the matrix arrangement. The detection unit SE21 has, for example, a square shape. However, the shape of the detection unit SE21 is not particularly limited, and may be a circular shape, an elliptical shape, a polygonal shape other than a square shape, or the like.

Note that, in FIG. 3, coordinates X1 to X10 indicate a center position of each detection unit SE21 in the X-axis direction, and coordinates Y1 to Y10 indicate a center position of each detection unit SE21 in the Y-axis direction.

A film-shaped connection portion 21A1 extends from a part of the peripheral edge of the detection layer 21A. A connection terminal 21A2 for connection with the connector 14A of the sensor board 13 is provided at a leading end of the connection portion 21A1.

The detection layer 21A and the connection portion 21A1 are preferably integrally configured by one flexible printed circuit (FPC). Since the detection layer 21A and the connection portion 21A1 are integrally formed in this manner, the number of components of the sensor 20 can be reduced. Furthermore, impact durability of the connection between the sensor 20 and the sensor board 13 can be improved.

Figure 4:
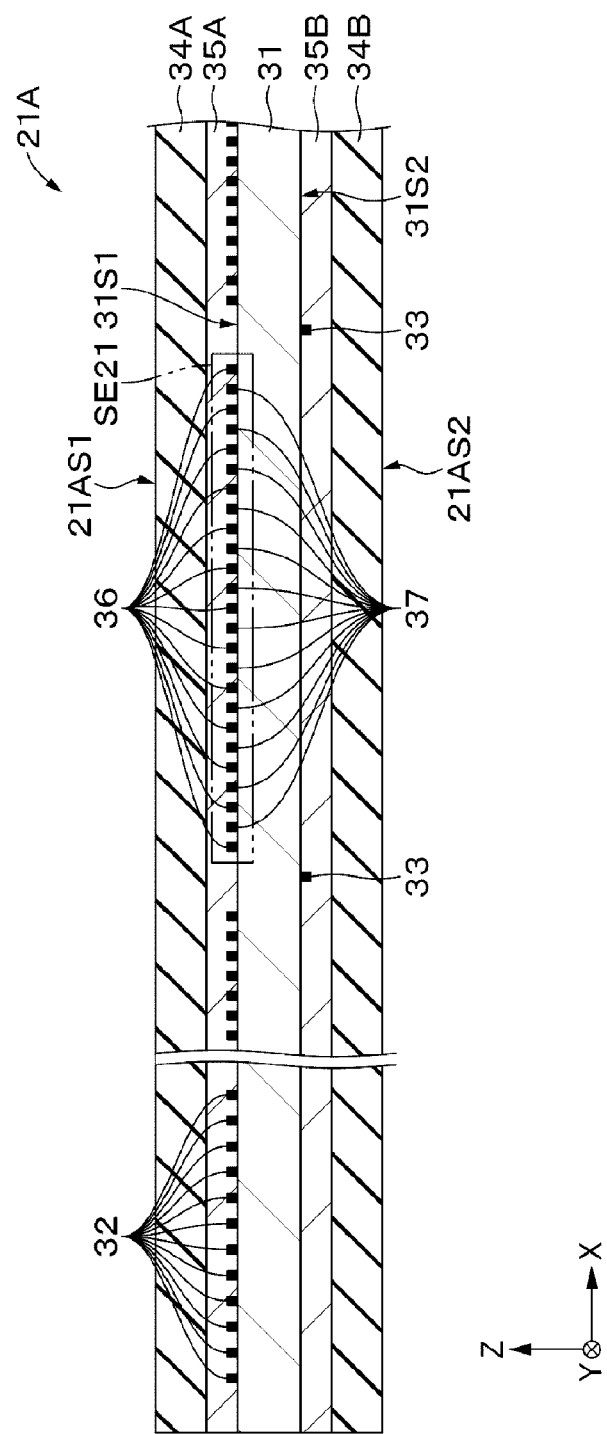
FIG. 4 is a cross-sectional view illustrating an example of the configuration of the detection layer.

FIG. 4 is a cross-sectional view illustrating an example of a configuration of the detection layer 21A. The detection layer 21A includes a base material 31, the plurality of detection units SE21, a plurality of routing wirings 32, a plurality of routing wirings 33, a coverlay film 34A, a coverlay film 34B, an adhesive layer 35A, and an adhesive layer 35B.

The base material 31 has a first surface 31S1 and a second surface 31S2 opposite to the first surface 31S1. The plurality of detection units SE21 and the plurality of routing wirings 32 are provided on the first surface 31S1 of the base material 31. The plurality of routing wirings 33 is provided on the second surface 31S2 of the base material. The coverlay film 34A is bonded to the first surface 31S1 of the base material 31 provided with the plurality of detection units SE21 and the plurality of routing wirings 32 by the adhesive layer 35A. The coverlay film 34B is bonded to the second surface 31S2 of the base material 31 provided with the plurality of routing wirings 33 by the adhesive layer 35B.

The base material 31 has flexibility. The base material 31 has a film shape. The base material 31 contains a polymer resin. Examples of the polymer resin include polyethylene terephthalate (PET), polyethylene naphthalate (PEN), polycarbonate (PC), acrylic resin (PMMA), polyimide (PI), triacetyl cellulose (TAC), polyester, polyamide (PA), aramid, polyethylene (PE), polyacrylate, polyether sulfone, polysulfone, polypropylene (PP), diacetyl cellulose, polyvinyl chloride, epoxy resin, urea resin, urethane resin, melamine resin, cyclic olefin polymer (COP), norbornene-based thermoplastic resin, or the like, but are not limited to these polymer resins.

Figure 5:
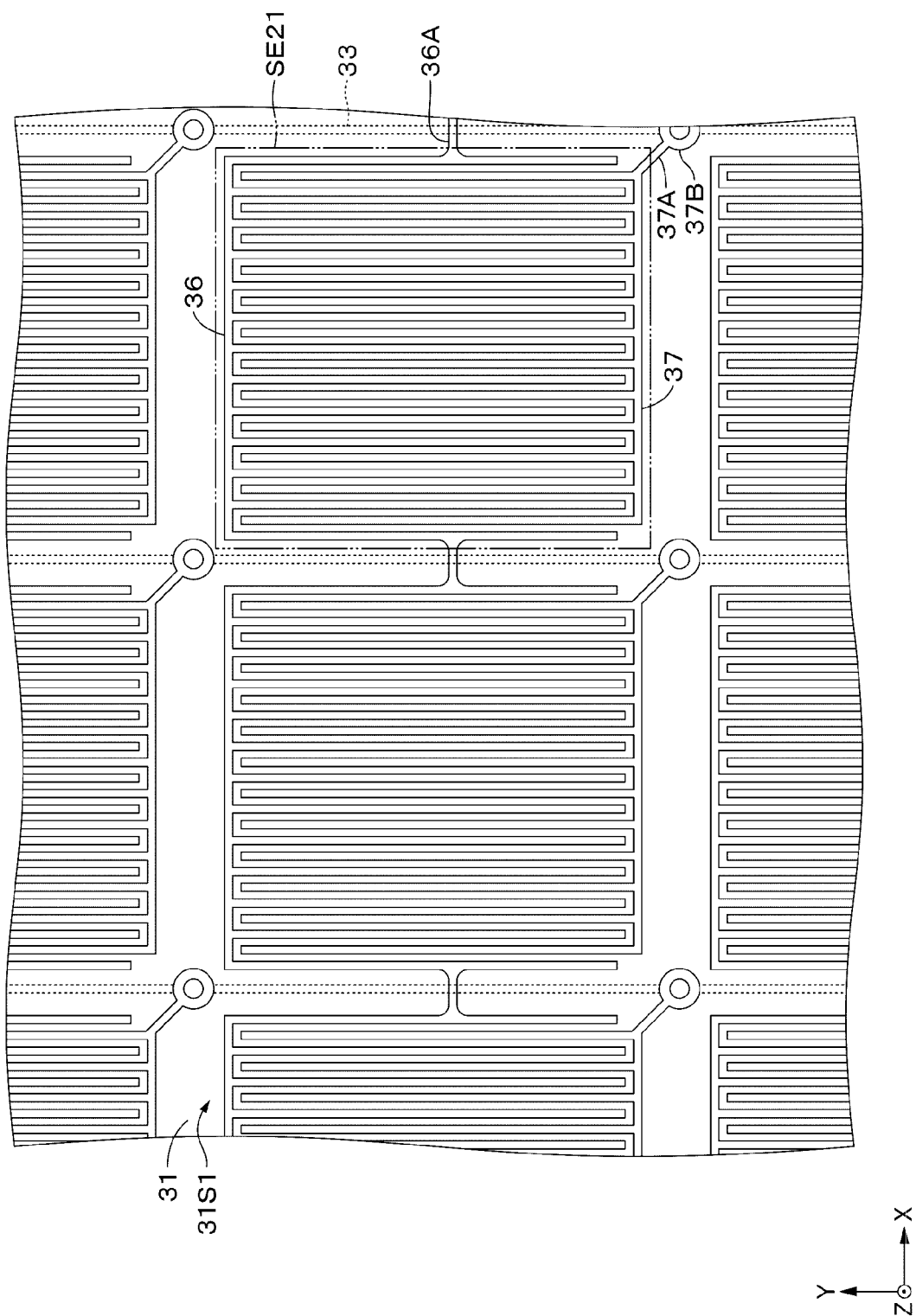
FIG. 5 is a plan view illustrating an example of a configuration of a detection unit.

FIG. 5 is a plan view illustrating an example of a configuration of the detection unit SE21. The detection unit SE21 includes a reception electrode (sense electrode) 36 as a first electrode and a drive electrode (pulse electrode) 37 as a second electrode. The reception electrode 36 and the drive electrode 37 are configured to by capable of forming capacitive coupling. More specifically, the reception electrode 36 and the drive electrode 37 have a comb-teeth shape, and are arranged such that comb-teeth portions thereof mesh with each other.

The reception electrodes 36 adjacent to each other in the X-axis direction are connected to each other by a connection line 36A. Each drive electrode 37 is provided with a lead-out wiring 37A, and a leading end of the lead-out wiring 37A is connected to the routing wiring 33 via a through hole 37B. The routing wiring 33 connects the drive electrodes 37 adjacent to each other in the Y-axis direction.

Figure 6:
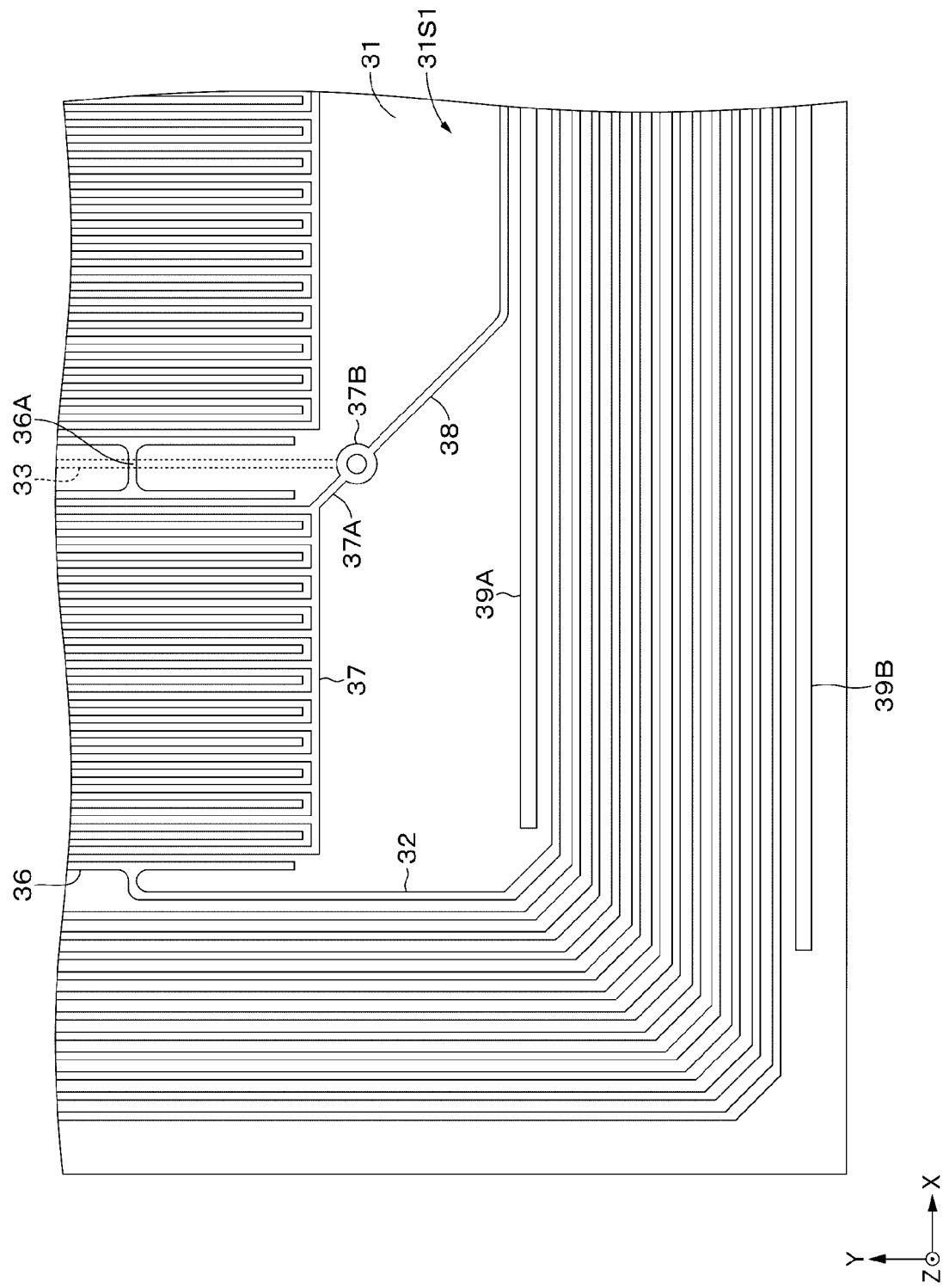
FIG. 6 is a plan view illustrating an example of arrangement of a plurality of routing wirings.

FIG. 6 is a plan view illustrating an example of the arrangement of the plurality of routing wirings 32 and a plurality of routing wirings 38. A routing wiring 32 is drawn out from the reception electrode 36 located at one end in the X-axis direction among the plurality of reception electrodes 36 connected by the plurality of connection lines 36A. The plurality of routing wirings 32 is routed to a peripheral edge portion of the first surface 31S1 of the base material 31 and is connected to the connection terminal 21A2 through the connection portion 21A1.

The detection layer 21A further includes the plurality of routing wirings 38. A routing wiring 38 is connected to the lead-out wiring 37A led out from the drive electrode 37 located at one end in the Y-axis direction among the plurality of drive electrodes 37 connected by the routing wiring 33. The plurality of routing wirings 38 is routed to the peripheral edge portion of the first surface 31S1 of the base material 31 together with the plurality of routing wirings 32, and is connected to the connection terminal 21A2 through the connection portion 21A1.

The detection layer 21A further includes a ground electrode 39A and a ground electrode 39B. The ground electrode 39A and the ground electrode 39B are connected to a reference potential. The ground electrode 39A and the ground electrode 39B extend in parallel with the plurality of routing wirings 32. The plurality of routing wirings 32 is provided between the ground electrode 39A and the ground electrode 39B. Since the plurality of routing wirings 32 is provided between the ground electrode 39A and the ground electrode 39B in this manner, it is possible to suppress external noise (external electric field) from entering the plurality of routing wirings 32. Therefore, it is possible to suppress a decrease in detection accuracy of the sensor 20 or erroneous detection due to external noise.

(Separation Layer)

The separation layer 24 separates the sensor layer 20A and the sensor layer 20B. Thus, electromagnetic interference between the sensor layer 20A and the sensor layer 20B can be suppressed. The separation layer 24 is formed to be elastically deformable in an in-plane direction of the sensing surface 20S by the shearing force acting in the in-plane direction of the sensing surface 20S (that is, the in-plane direction of the sensor 20).

The separation layer 24 preferably contains a gel. Since the separation layer 24 contains the gel, the separation layer 24 is hardly crushed by the pressure acting on the sensing surface 20S and is easily elastically deformed by the shearing force acting in the in-plane direction of the sensing surface 20S, and desirable characteristics as the separation layer 24 are obtained. The gel is, for example, at least one polymer gel selected from the group including a silicone gel, a urethane gel, an acrylic gel, and a styrene gel. The separation layer 24 may be supported by a base material that is not illustrated.

The 25% compression-load-deflection (CLD) value of the separation layer 24 is 10 times or more the 25% CLD value of the deformation layer 22A, preferably 30 times or more the 25% CLD value of the deformation layer 22A, and more preferably 50 times or more the 25% CLD value of the deformation layer 22A. If the 25% CLD value of the separation layer 24 is 10 times or more the 25% CLD value of the deformation layer 22A, when a pressure acts on the sensing surface 20S, the deformation layer 22A is sufficiently collapsed more easily compared to the separation layer 24, so that the detection sensitivity of the detection unit SE21 can be improved.

The 25% CLD value of the separation layer 24 is 10 times or more the 25% CLD value of the deformation layer 22B, preferably 30 times or more the 25% CLD value of the deformation layer 22B, and more preferably 50 times or more the 25% CLD value of the deformation layer 22B. If the 25% CLD value of the separation layer 24 is 10 times or more the 25% CLD value of the deformation layer 22B, when a pressure acts on the sensing surface 20S, the deformation layer 22B is sufficiently collapsed more easily compared to the separation layer 24, so that the detection sensitivity of the detection unit SE22 can be improved.

The 25% CLD value of the separation layer 24 is preferably 500 kPa or less. If the 25% CLD value of the separation layer 24 exceeds 500 kPa, there is a possibility that it becomes difficult to elastically deform in the in-plane direction of the sensing surface 20S due to the shearing force acting in the in-plane direction of the sensing surface 20S (that is, the in-plane direction of the sensor 20). Therefore, there is a possibility that the detection sensitivity of the shearing force in the in-plane direction of the sensor 20 decreases.

The 25% CLD values of the separation layer 24, the deformation layer 22A, and the deformation layer 22B are measured in accordance with JIS K 6254.

(Conductive Layer)

The conductive layer 23A has at least one of flexibility or stretchability. When a pressure acts on the sensing surface 20S, the conductive layer 23A bends toward the detection layer 21A. The conductive layer 23B may or may not have at least one of flexibility or elasticity, but preferably has flexibility in order to enable the sensor 20 to be attached to a curved surface.

The elastic modulus of the conductive layer 23A is preferably 10 MPa or less. When the elastic modulus of the conductive layer 23A is 10 MPa or less, the flexibility of the conductive layer 23A is improved, and when a pressure acts on the sensing surface 20S, the pressure is easily transmitted to the detection layer 21B, and the detection layer 21B is easily deformed. Therefore, the detection sensitivity of the detection unit SE22 can be improved. The elastic modulus described above is measured in accordance with JIS K 7161.

The conductive layer 23A and the conductive layer 23B are what are called grounding electrodes, and are connected to the reference potential. Examples of the shape of the conductive layer 23A and the conductive layer 23B include a thin film shape, a foil shape, a mesh shape, and the like, but are not limited to these shapes. Each of the conductive layer 23A and the conductive layer 23B may be supported by a base material that is not illustrated.

The conductive layers 23A and 23B are only required to have electrical conductivity, and are, for example, an inorganic conductive layer containing an inorganic conductive material, an organic conductive layer containing an organic conductive material, or an organic-inorganic conductive layer containing both an inorganic conductive material and an organic conductive material, or the like. The inorganic conductive material and the organic conductive material may be particles. The conductive layers 23A and 23B may be conductive fabrics.

Examples of the inorganic conductive material include metals, metal oxides, or the like. Here, the metal is defined as including a semimetal. Examples of the metal include metals such as aluminum, copper, silver, gold, platinum, palladium, nickel, tin, cobalt, rhodium, iridium, iron, ruthenium, osmium, manganese, molybdenum, tungsten, niobium, tantalum, titanium, bismuth, antimony, and lead, or alloys containing two or more of these metals, and the like, but are not limited to these metals. Specific examples of the alloy include, but are not limited to, stainless steel. Examples of the metal oxide include indium tin oxide (ITO), zinc oxide, indium oxide, antimony-added tin oxide, fluorine-added tin oxide, aluminum-added zinc oxide, gallium-added zinc oxide, silicon-added zinc oxide, zinc oxide-tin oxide system, indium oxide-tin oxide system, zinc oxide-indium oxide-magnesium oxide system, and the like, but are not limited to these metal oxides.

Examples of the organic conductive material include a carbon material, a conductive polymer, and the like. Examples of the carbon material include carbon black, carbon fiber, fullerene, graphene, carbon nanotube, carbon microcoil, nanohorn, and the like, but are not limited to these carbon materials. As the conductive polymer, for example, substituted or unsubstituted polyaniline, polypyrrole, polythiophene, or the like can be used, but the conductive polymer is not limited to these conductive polymers.

The conductive layers 23A and 23B may be thin films prepared by either a dry process or a wet process. As the dry process, for example, a sputtering method, a vapor deposition method, or the like can be used, but the dry process is not particularly limited thereto.

Since the conductive layers 23A and 23B are provided on both surfaces of the sensor 20, it is possible to suppress external noise (external electric field) from entering the sensor 20 from both main surface sides of the sensor 20. Therefore, it is possible to suppress a decrease in detection accuracy of the sensor 20 or erroneous detection due to external noise.

(Deformation Layer)

The deformation layer 22A separates the detection layer 21A and the conductive layer 23A so that the detection layer 21A and the conductive layer 23A are parallel. The sensitivity and the dynamic range of the detection unit SE21 can be adjusted by a thickness of the deformation layer 22A. The deformation layer 22A is formed to be elastically deformable according to the pressure acting on the sensing surface 20S, that is, the pressure acting in the thickness direction of the sensor 20. The deformation layer 22A may be supported by a base material that is not illustrated.

The deformation layer 22B separates the detection layer 21B and the conductive layer 23B so that the detection layer 21B and the conductive layer 23B are parallel. The sensitivity and the dynamic range of the detection unit SE22 can be adjusted by a thickness of the deformation layer 22B. The deformation layer 22B is formed to be elastically deformable according to the pressure acting on the sensing surface 20S, that is, the pressure acting in the thickness direction of the sensor 20. The deformation layer 22B may be supported by a base material that is not illustrated.

The 25% CLD values of the deformation layer 22A and the deformation layer 22B may be the same or substantially the same. The deformation layers 22A and 22B include, for example, a foamed resin, an insulating elastomer, or the like. The foamed resin is what is called a sponge, and is, for example, at least one of foamed polyurethane (polyurethane foam), foamed polyethylene (polyethylene foam), foamed polyolefin (polyolefin foam), foamed acrylic (acrylic foam), sponge rubber, or the like. The insulating elastomer is, for example, at least one of a silicone-based elastomer, an acrylic-based elastomer, a urethane-based elastomer, a styrene-based elastomer, or the like.

(Adhesive Layer)

The adhesive layer is formed by an adhesive or a double-sided adhesive film having an insulating property. As the adhesive, for example, at least one of an acrylic adhesive, a silicone-based adhesive, or a urethane-based adhesive can be used. Note that in the present disclosure, pressure sensitive adhesion is defined as a type of adhesion. According to this definition, the adhesive layer is regarded as a kind of adhesive layer.

(IC)

The IC 13A sequentially scans the plurality of detection units SE21 included in the detection layer 21A, acquires a first output signal distribution, that is, a first capacitance distribution from the plurality of detection units SE21, and outputs the first capacitance distribution to the CPU 12A. Furthermore, the IC 13A sequentially scans the plurality of detection units SE22 included in the detection layer 21B, acquires a second output signal distribution, that is, a second capacitance distribution from the plurality of detection units SE22, and outputs the second capacitance distribution to the CPU 12A. After the plurality of detection units SE21 included in the detection layer 21A is sequentially scanned, the plurality of detection units SE22 included in the detection layer 21B may be sequentially scanned, or after the plurality of detection units SE22 included in the detection layer 21B is sequentially scanned, the plurality of detection units SE21 included in the detection layer 21A may be sequentially scanned.

Figure 7:
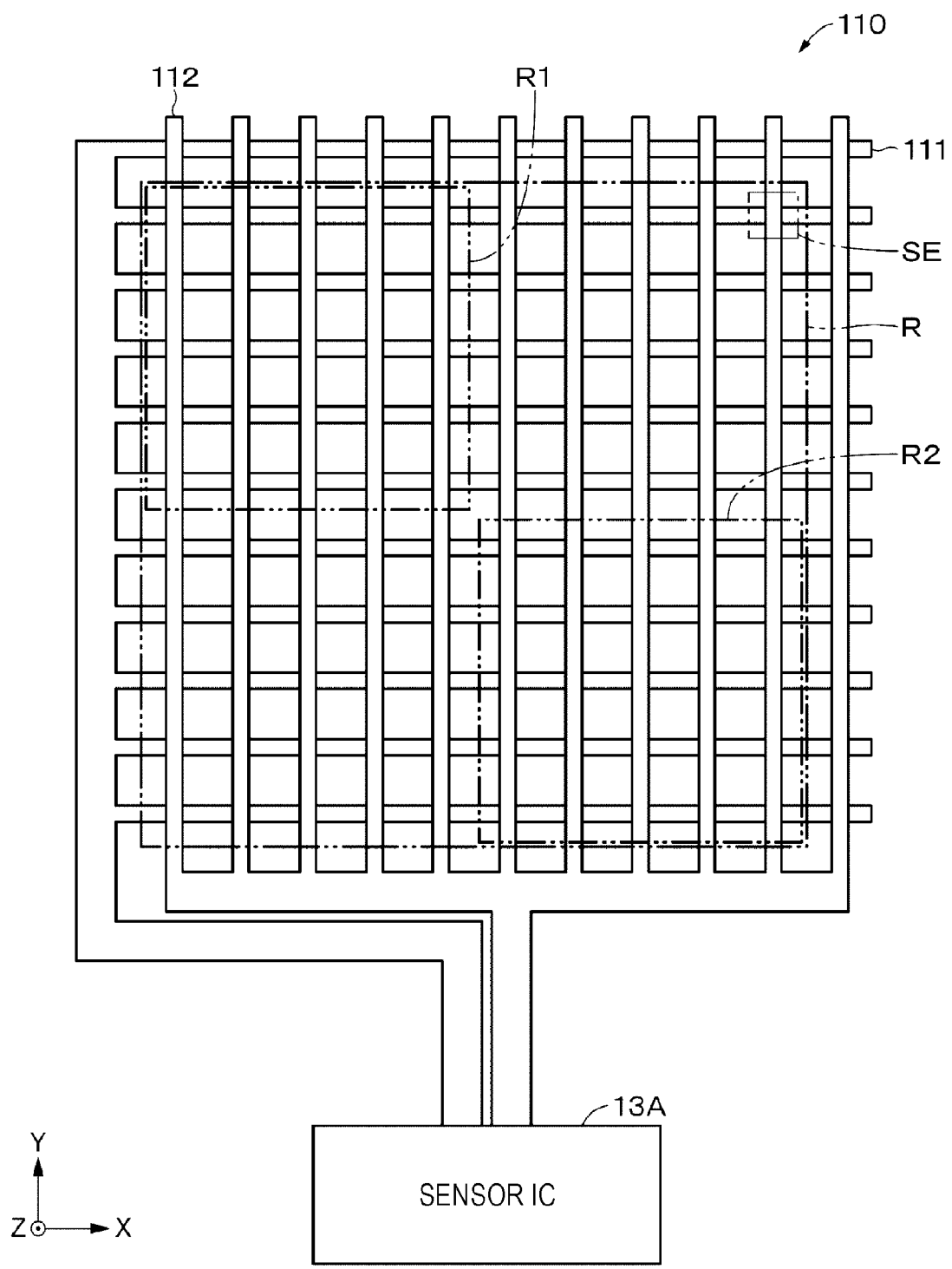
FIG. 7 is a plan view illustrating a first example of detection units arranged in a matrix arrangement.

FIG. 7 is a plan view for describing a first example of the operation of the IC 13A. The detection layer 110 illustrated in FIG. 7 is virtual for describing the operation of the IC 13A, and is different from the detection layers 21A and 21B actually included in the sensor 20.

The detection layer 110 includes a plurality of detection units SE. The detection layer 110 has a detection region R for detecting a pressure distribution. The plurality of detection units SE is arranged in a matrix arrangement in the detection region R. However, the arrangement form of the plurality of detection units SE is not limited to the matrix arrangement, and may be a two-dimensional arrangement other than the matrix arrangement. The detection layer 110 has a first detection region R1 and a second detection region R2. The first detection region R1 of the detection layer 110 corresponds to the detection region of the detection layer 21A, and the second detection region R2 of the detection layer 110 corresponds to the detection region of the detection layer 21B.

The detection layer 110 includes a plurality of reception electrodes 111 and a plurality of drive electrodes 112. The plurality of reception electrodes 111 extends in the X direction and is arranged in a stripe shape. The plurality of drive electrodes 112 extends in the Y direction and is arranged in a stripe shape. A detection unit SE is configured at each intersection of the reception electrodes 111 and the drive electrodes 112. The reception electrodes 111 of the detection layer 110 correspond to the reception electrodes 36 of the detection layer 21A and the detection layer 21B. The drive electrodes 112 of the detection layer 110 correspond to the drive electrodes 37 of the detection layer 21A and the detection layer 21B.

The IC 13A is configured to be capable of sequentially scanning the plurality of detection units SE arranged in the matrix arrangement as described above, and acquiring an output signal distribution, that is, a capacitance distribution from the plurality of detection units SE. Therefore, as the IC 13A, an existing sensor IC used in a capacitance type touch sensor or the like can be used.

The IC 13A scans the plurality of detection units SE21 as a group of detection units SE included in the first detection region R1 among the plurality of detection units SE arranged in the matrix arrangement, acquires the first output signal distribution, that is, the first capacitance distribution from the plurality of detection units SE21, and outputs the first output signal distribution to the CPU 12A. Furthermore, the IC 13A scans the plurality of detection units SE22 as a group of detection units included in the second detection region R2 among the plurality of detection units SE arranged in the matrix arrangement, acquires the second output signal distribution, that is, the second capacitance distribution from the plurality of detection units SE22, and outputs the second output signal distribution to the CPU 12A.

The first detection region R1 and the second detection region R2 are arranged in a diagonal direction of the matrix array in the virtual detection layer 110. Therefore, the detection units SE included in the first detection region R1 and the detection units SE included in the second detection region R2 are configured by the reception electrodes 111 and the drive electrodes 112 different from each other, and do not share the reception electrodes 111 and the drive electrodes 112. That is, the detection units SE21 included in the detection layer 21A and the detection units SE22 included in the detection layer 21B are configured by the reception electrode 36 and the drive electrode 37 different from each other, and do not share the reception electrode 36 and the drive electrode 37. Here, the diagonal direction of the matrix array is a direction from a certain corner of the matrix array to a corner opposite thereto.

Since the detection units SE21 included in the detection layer 21A and the detection units SE22 included in the detection layer 21B do not share the reception electrode 36 and the drive electrode 37, crosstalk between the detection units SE21 and SE22 can be suppressed, so that detection accuracy (SNR) can be improved.

Figure 8:
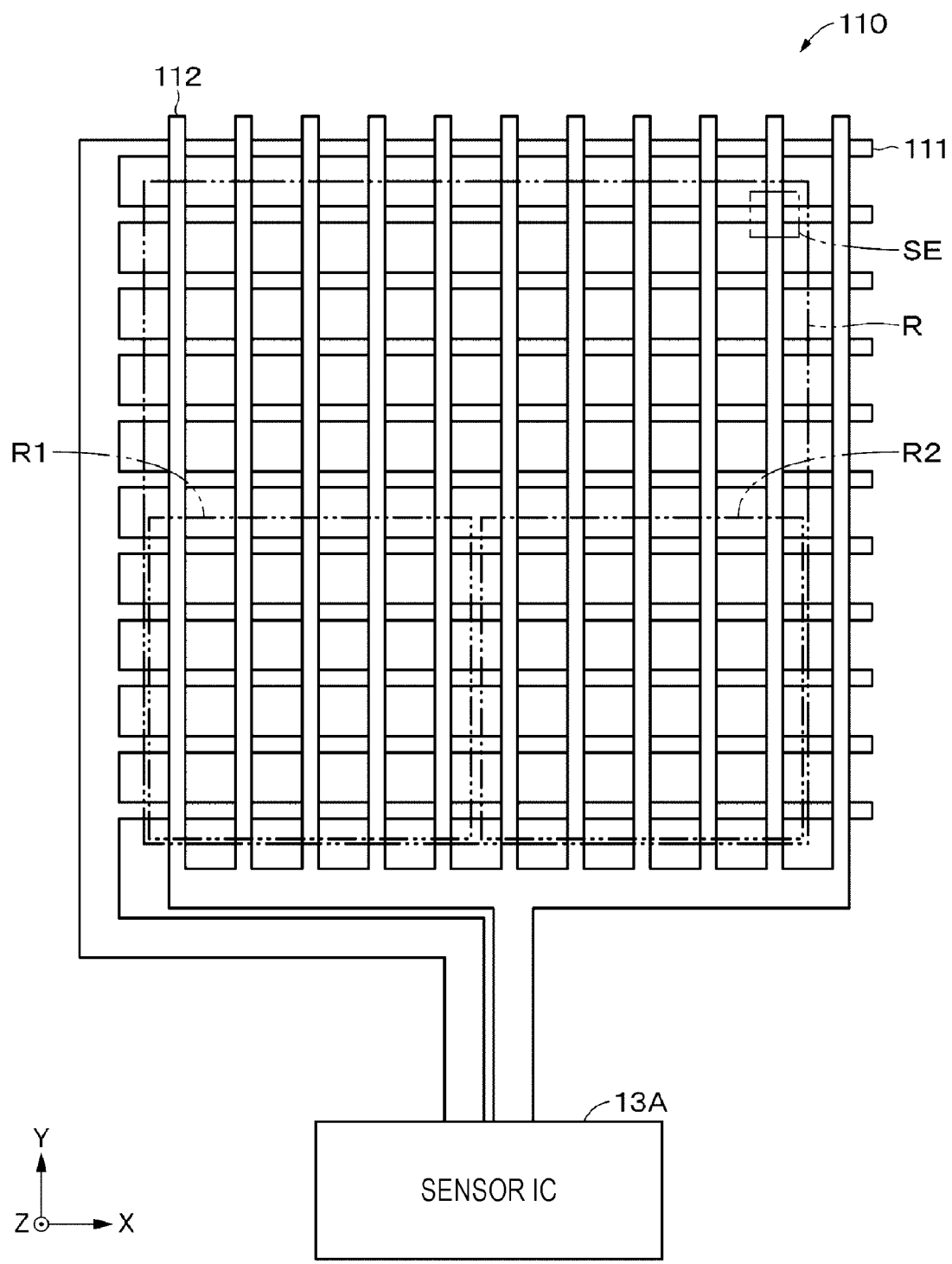
FIG. 8 is a plan view illustrating a second example of the detection units arranged in the matrix arrangement.

FIG. 8 is a plan view for describing a second example of the operation of the IC 13A. The first detection region R1 and the second detection region R2 may be arranged in the row direction or the column direction of the matrix array. Therefore, the detection units SE included in the first detection region R1 and the detection units SE included in the second detection region R2 share the reception electrode 111 or the drive electrode 112. That is, the detection units SE21 included in the detection layer 21A and the detection units SE22 included in the detection layer 21B share the reception electrode 36 or the drive electrode 37.

FIG. 8 illustrates an example in which the first detection region R1 and the second detection region R2 are arranged in the row direction of the matrix array. That is, an example in which the detection units SE21 included in the detection layer 21A and the detection units SE22 included in the detection layer 21B share the reception electrode 36 is illustrated.

Since the detection units SE21 included in the detection layer 21A and the detection units SE22 included in the detection layer 21B share the reception electrode 36 or the drive electrode 37, the number of detection units SE21 and SE22 to be scanned by the capacitance sensors can be reduced, so that the detection units SE21 and SE22 can be scanned at high speed (high scan rate). From the viewpoint of improving the detection accuracy (SNR), it is preferable that the detection units SE21 included in the detection layer 21A and the detection units SE22 included in the detection layer 21B share the drive electrode 37 rather than that the detection units SE21 included in the detection layer 21A and the detection units SE22 included in the detection layer 21B share the reception electrode 36.

(CPU)

The CPU 12A calculates centroid coordinates of the pressure acting on the sensor layer 20A on the basis of the first output signal (that is, the first capacitance distribution) from the IC 13A, and calculates centroid coordinates of the pressure acting on the sensor layer 20B on the basis of the second output signal (that is, the second capacitance distribution) from the IC 13A. The CPU 12A calculates magnitude and direction of the shearing force from the difference between the centroid coordinates of the pressure in the sensor layer 20A and the centroid coordinates of the pressure in the sensor layer 20B, and executes various controls of the host device 12 on the basis of calculation results thereof.

Figure 9:
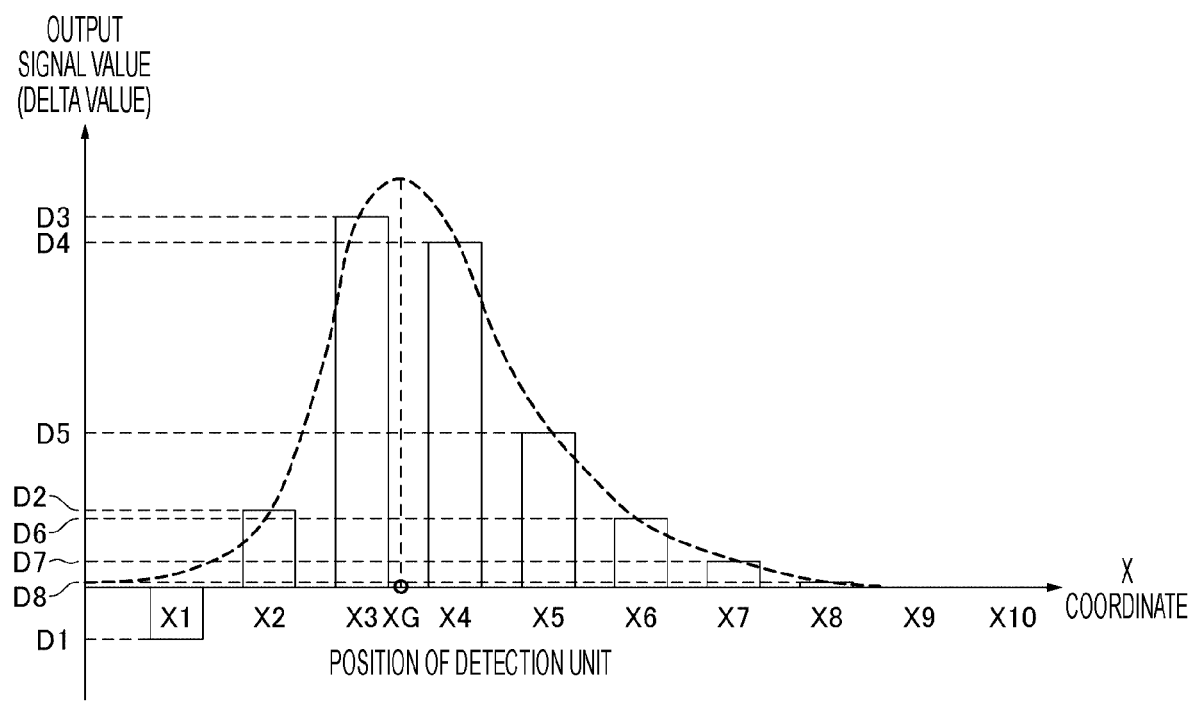
FIG. 9 is a graph for describing an example of a method of calculating a pressure center coordinate.

FIG. 9 is a graph for describing an example of a method of calculating the pressure center coordinates in the X-axis direction. The CPU 12A calculates a pressure centroid coordinate XG in the X-axis direction by the following expression.

$$XG=(X1 \times D1+X2 \times D2+X3 \times D3+ \ldots +X10 \times D10)/(D1+D2+D3+ \ldots +D10)$$

(where X1 to X10 represent the center positions of the detection units SE21 in the X-axis direction, and D1 to D10 represent output signal values in the detection units SE21 described above in the X-axis direction.)

Furthermore, the CPU 12A calculates a pressure centroid coordinate YG in the Y-axis direction by the following equation.

$$YG=(Y1 \times D1+Y2 \times D2+Y3 \times D3+ \ldots +Y10 \times D10)/(D1+D2+D3+ \ldots +D10)$$

(where Y1 to Y10 represent the center positions of the detection units SE21 in the Y-axis direction, and D1 to D10 represent output signal values in the detection units SE21 described above in the Y-axis direction.)

[Operation of Sensor]

(Operation of Sensor at Time of Pressure Detection)

Figure 10:
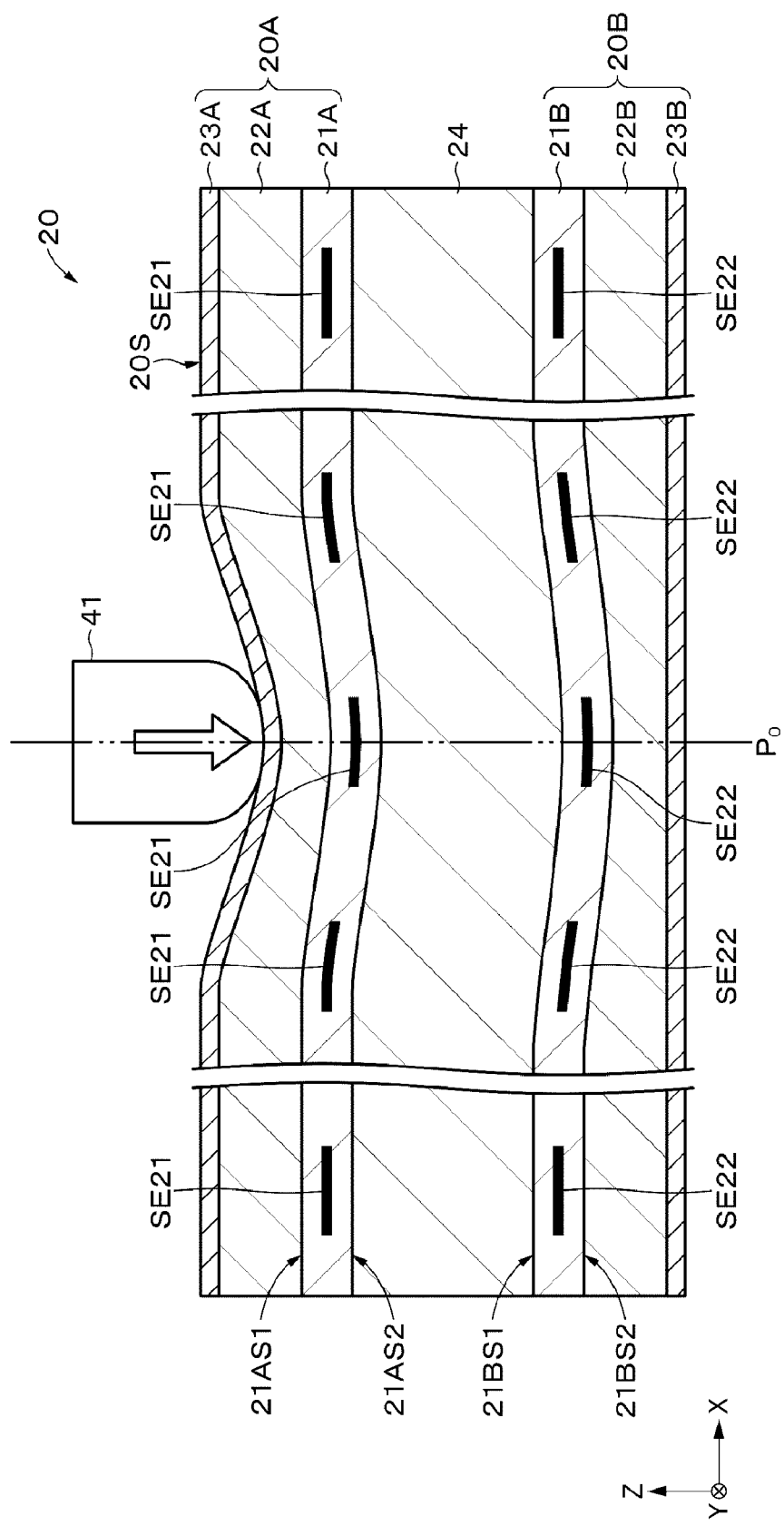
FIG. 10 is a cross-sectional view for describing an example of operation of the sensor at a time of pressure detection.

FIG. 10 is a cross-sectional view for describing an example of the operation of the sensor 20 at the time of pressure detection. When the sensing surface 20S is pressed by the object 41 and a pressure acts on the sensing surface 20S, the conductive layer 23A bends toward the detection layer 21A with the pressure acting portion as the center, and collapses a part of the deformation layer 22A. Thus, the conductive layer 23A and a part of the detection layer 21A approach each other. Consequently, a part of the lines of electric force of the plurality of detection units SE21 included in the part of the detection layer 21A close to the conductive layer 23A (that is, a part of the lines of electric force between the reception electrode 36 and the drive electrode 37) flows to the conductive layer 23A, and the capacitances of the plurality of detection units SE21 change.

Furthermore, the pressure acts on the first surface 21AS1 of the detection layer 21A by a part of the deformation layer 22A crushed as described above, and the detection layer 21A, the separation layer 24, and the detection layer 21B are bent toward the conductive layer 23B around the pressure acting portion. Thus, the detection layer 21B and a part of the conductive layer 23B approach each other. Consequently, a part of the lines of electric force of the plurality of detection units SE22 included in the part of the detection layer 21B close to the conductive layer 23B (that is, a part of the lines of electric force between the reception electrode 36 and the drive electrode 37) flows to the conductive layer 23B, and the capacitances of the plurality of detection units SE22 change.

The IC 13A sequentially scans the plurality of detection units SE21 included in the detection layer 21A and the plurality of detection units SE22 included in the detection layer 21B, and acquires an output signal distribution, that is, a capacitance distribution from the plurality of detection units SE21 and the plurality of detection units SE22. The IC 13A outputs the acquired output signal distribution to the CPU 12A of the host device 12.

The CPU 12A calculates magnitude of the pressure and an acting position of the pressure on the basis of the output signal distribution of the plurality of detection units SE21 received from the IC 13A. The reason why the magnitude of the pressure and the acting position of the pressure are calculated on the basis of the output signal distribution of the plurality of detection units SE21 is that the detection layer 21A is closer to the sensing surface 20S compared to the detection layer 21B, and the detection sensitivity is higher. However, the CPU 12A may calculate the magnitude of the pressure and the acting position of the pressure on the basis of the output signal distribution of the plurality of detection units SE22 received from the IC 13A, or may calculate the magnitude of the pressure and the acting position of the pressure on the basis of the output signal distributions received from both of the plurality of detection units SE21 and the plurality of detection units SE22.

(Operation of Sensor When Shearing Force Is Detected)

Figure 11:
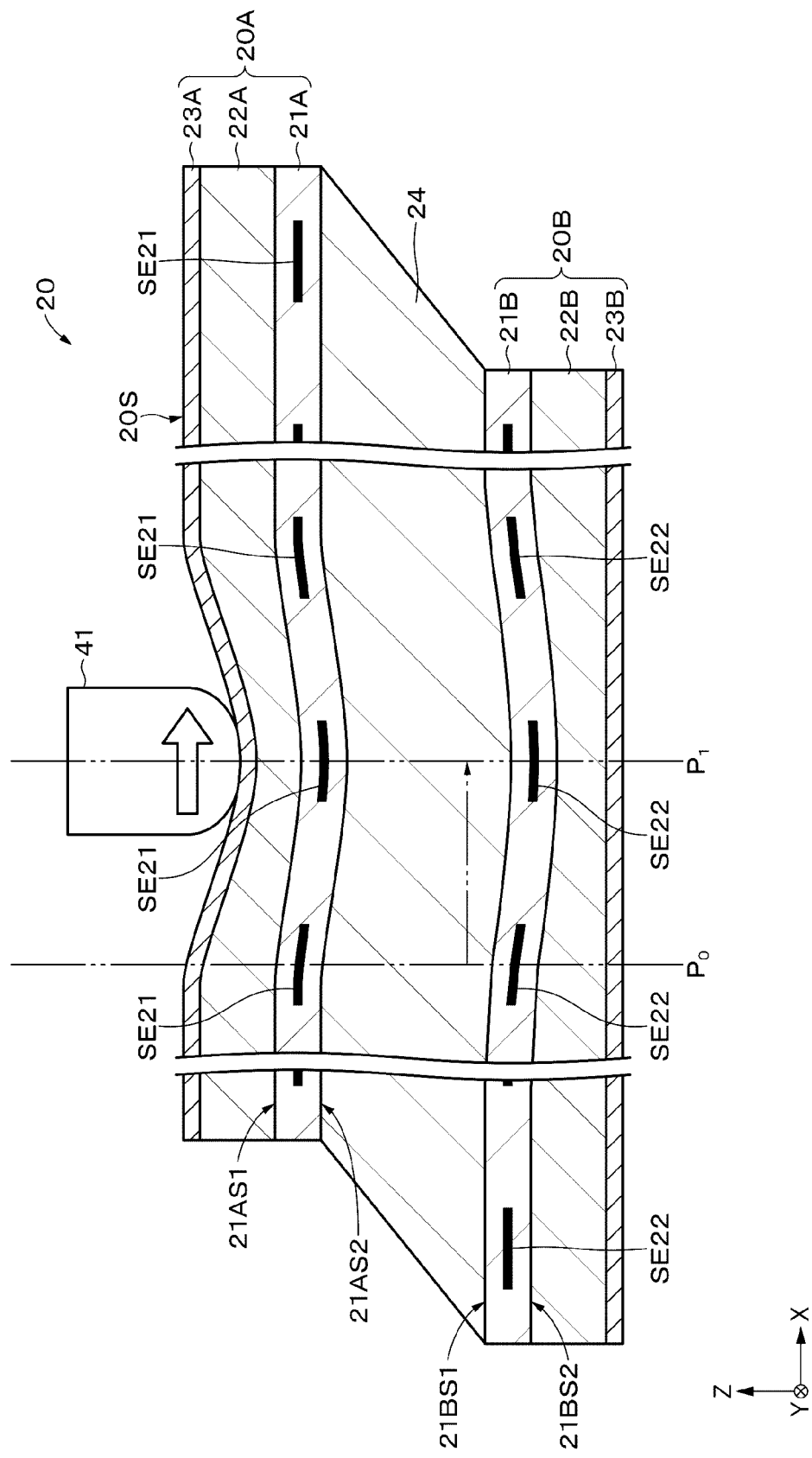
FIG. 11 is a cross-sectional view for describing an example of operation of the sensor at a time of detecting a shearing force.

FIG. 11 is a cross-sectional view for describing an example of the operation of the sensor 20 at the time of detecting a shearing force. When the object 41 moves in the in-plane direction of the sensing surface 20S and the shearing force acts on the sensor 20, the separation layer 24 is elastically deformed in the in-plane direction of the sensor 20, and the relative positions of the detection layer 21A and the detection layer 21B in the in-plane direction (X, Y direction) of the sensor 20 are shifted. That is, the relative positions of the detection unit SE21 and the detection unit SE22 in the in-plane direction of the sensor 20 are shifted. Thus, a centroid position of the output signal distribution (capacitance distribution) of the detection layer 21A and a centroid position of the output signal distribution (capacitance distribution) of the detection layer 21B are shifted in the in-plane direction (X, Y direction) of the sensor 20.

FIG. 12 is a graph illustrating an example of an output signal distribution DB1 of the detection layer 21A and an output signal distribution DB2 of the detection layer 21B in a state where the pressure acts on the sensor 20. The output signal distribution DB1 and the output signal distribution DB2 correspond to a capacitance distribution (pressure distribution). In a state where only the pressure acts on the sensor 20, the centroid positions of the output signal distribution DB1 of the detection layer 21A and the output signal distribution DB2 of the detection layer 21B coincide with each other.

Figure 13:
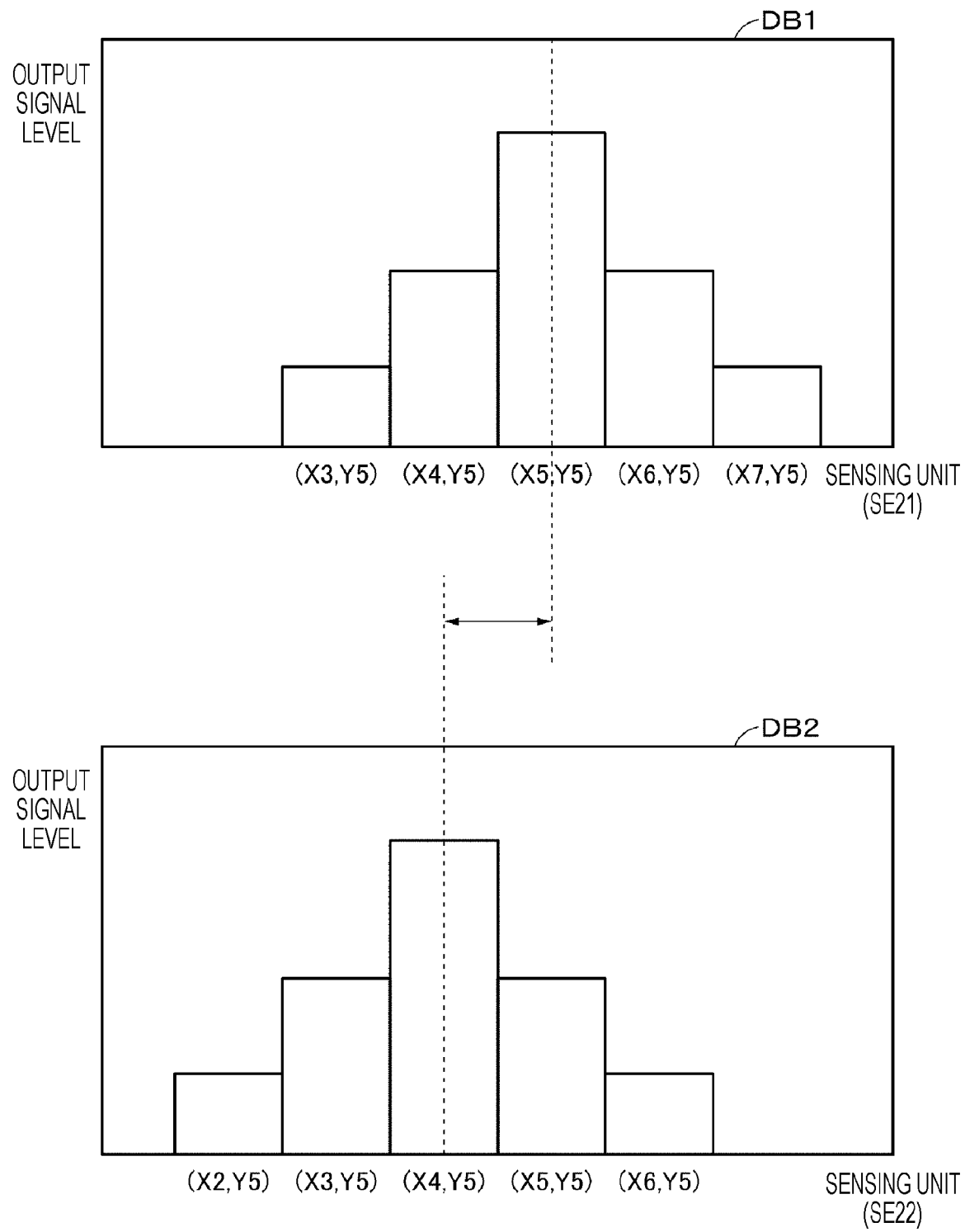
FIG. 13 is a graph illustrating an example of output signal distributions of the first detection layer and the second detection layer in a state where a shearing force acts on the sensor.

FIG. 13 is a graph illustrating an example of the output signal distribution DB1 of the detection layer 21A and the output signal distribution DB2 of the detection layer 21B in a state where the shearing force acts on the sensor 20. In a state where the shearing force acts on the sensor 20, the centroid positions of the output signal distribution DB1 of the detection layer 21A and the output signal distribution DB2 of the detection layer 21B are shifted.

The CPU 12A calculates the three-axis forces on the basis of the output signal distribution of the detection layer 21A and the output signal distribution of the detection layer 21B output from the sensor module 11. More specifically, the CPU 12A calculates the centroid position of the pressure in the detection layer 21A from the output signal distribution DB1 of the detection layer 21A, and calculates the centroid position of the pressure in the detection layer 21B from the output signal distribution DB2 of the detection layer 21B. The CPU 12A calculates the magnitude and direction of the shearing force from the difference between the centroid position of the pressure in the detection layer 21A and the centroid position of the pressure in the detection layer 21B.

[Effects]

As described above, in the sensor 20 according to the first embodiment, since one IC 13A sequentially scans the plurality of detection units 21 included in the sensor layer (first sensor layer) 20A and the plurality of detection units 22 included in the sensor layer (second sensor layer) 20B, it is possible to suppress complication of the configuration of the sensor 20.

Furthermore, since the sensor 20 according to the first embodiment has a configuration in which the sensor layer 20A and the sensor layer 20B are stacked with the separation layer 24 interposed therebetween, it is possible to detect the distribution of the three-axis forces with a relatively simple and space-saving configuration as a whole.

Furthermore, in the sensor 20 according to the first embodiment, the CPU 12A can calculate the shearing force on the basis of the output signal from one IC 13A, and thus it is possible to suppress a decrease in detection speed due to calculation delay. On the other hand, in the invention described in Patent Document 1, since the CPU needs to calculate the shearing force by integrating the output results from the different sensor ICs, the detection speed decreases due to the calculation delay.

Furthermore, the IC 13A is configured to be capable of scanning the plurality of detection units SE arranged in the matrix arrangement and acquires the output signal distribution, that is, the capacitance distribution from the plurality of detection units SE (see FIGS. 7 and 8). Therefore, as the IC 13A, an existing sensor IC used in a capacitance type touch sensor or the like can be used.

2. Second Embodiment

[Configuration of Sensor]

Figure 14:
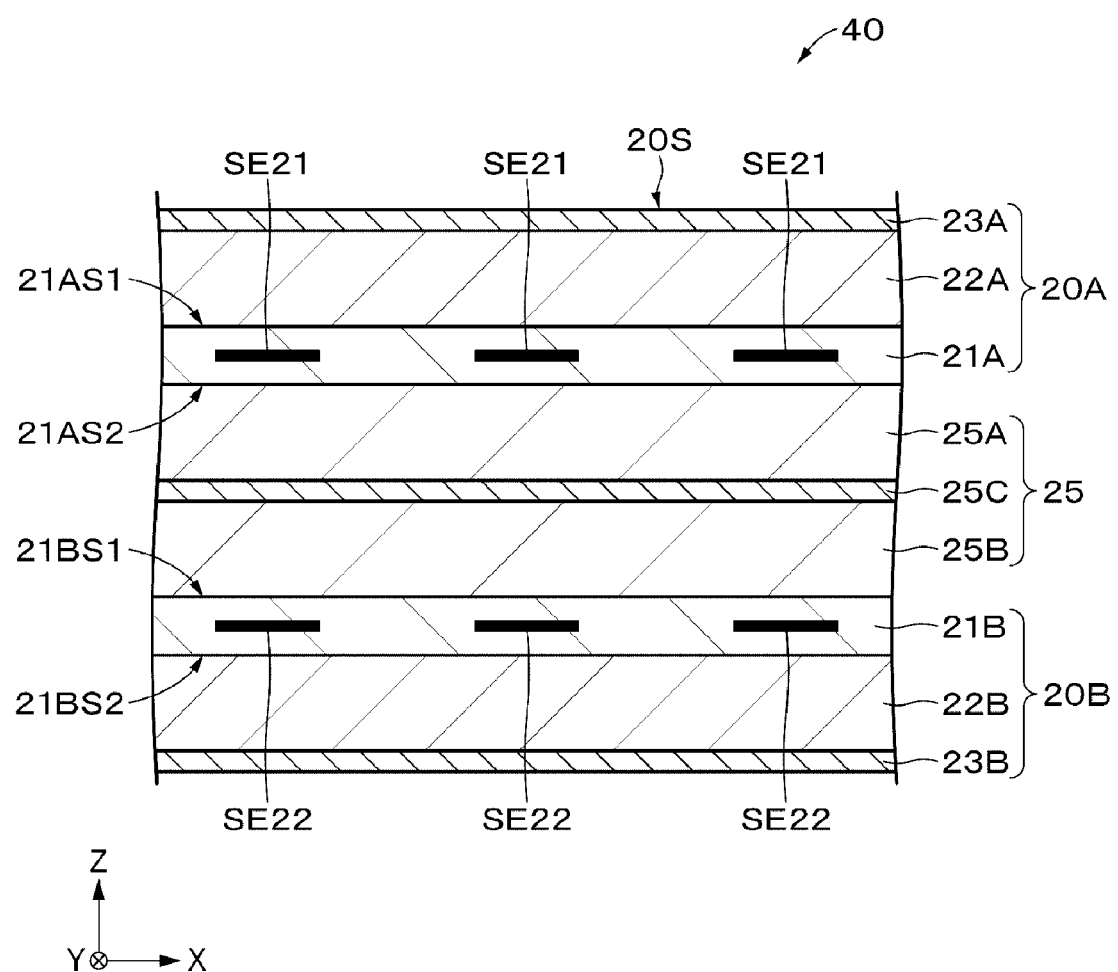
FIG. 14 is a cross-sectional view illustrating an example of a configuration of a sensor according to a second embodiment of the present disclosure.

FIG. 14 is a cross-sectional view illustrating an example of a configuration of a sensor 40 according to a second embodiment of the present disclosure. The sensor 40 is different from the sensor 20 according to the first embodiment in including a separation layer 25 having a stacked structure instead of the separation layer 24 (see FIG. 2). Note that in the second embodiment, the same reference numerals are given to parts similar to those in the first embodiment, and the description thereof will be omitted.

(Separation Layer)

The separation layer 25 includes a separation layer (first separation layer) 25A, a separation layer (second separation layer) 25B, and a conductive layer (third conductive layer) 25C. The conductive layer 25C is provided between the separation layer 25A and the separation layer 25B. The separation layer 25A is provided between the sensor layer 20A and the conductive layer 25C, and separates the sensor layer 20A and the conductive layer 25C. The separation layer 25B is provided between the sensor layer 20B and the conductive layer 25C, and separates the sensor layer 20B and the conductive layer 25C. The separation layer 25A and the separation layer 25B are formed to be elastically deformable in the in-plane direction of the sensing surface 20S by a shearing force acting in the in-plane direction of the sensing surface 20S (that is, the in-plane direction of the sensor 20).

The materials of the separation layer 25A and the separation layer 25B are similar to those of the separation layer 24 in the first embodiment.

The 25% CLD value of each of the separation layer 25A and the separation layer 25B is 10 times or more the 25% CLD value of the deformation layer 22A, preferably 30 times or more the 25% CLD value of the deformation layer 22A, and more preferably 50 times or more the 25% CLD value of the deformation layer 22A. If the 25% CLD value of each of the separation layer 25A and the separation layer 25B is 10 times or more the 25% CLD value of the deformation layer 22A, the detection sensitivity of the detection unit SE21 can be improved.

The 25% CLD value of each of the separation layer 25A and the separation layer 25B is 10 times or more the 25% CLD value of the deformation layer 22B, preferably 30 times or more the 25% CLD value of the deformation layer 22B, and more preferably 50 times or more the 25% CLD value of the deformation layer 22B. If the 25% CLD value of each of the separation layer 25A and the separation layer 25B is 10 times or more the 25% CLD value of the deformation layer 22B, the detection sensitivity of the detection unit SE22 can be improved.

The 25% CLD value of each of the separation layer 25A and the separation layer 25B is preferably 500 kPa or less. If the 25% CLD value of each of the separation layer 25A and the separation layer 25B exceeds 500 kPa, there is a possibility that it becomes difficult to elastically deform in the in-plane direction of the sensing surface 20S due to the shearing force acting in the in-plane direction of the sensing surface 20S (that is, the in-plane direction of the sensor 40). Therefore, there is a possibility that the detection sensitivity of the shearing force in the in-plane direction of the sensor 40 decreases.

The 25% CLD values of the separation layer 25A and the separation layer 25B are measured in accordance with JIS K 6254.

(Conductive Layer)

The conductive layer 25C is provided between the separation layer 25A and the separation layer 25B as described above, and suppresses electromagnetic interference between the sensor layer 20A and the sensor layer 20B. The conductive layer 25C has at least one of flexibility or stretchability. When a pressure acts on the sensing surface 20S, the conductive layer 25C bends toward the sensor layer 20B. The shape and material of the conductive layer 25C are similar to those of the conductive layer 23A in the first embodiment.

[Operation of Sensor]

(Operation of Sensor at Time of Pressure Detection)

Figure 15:
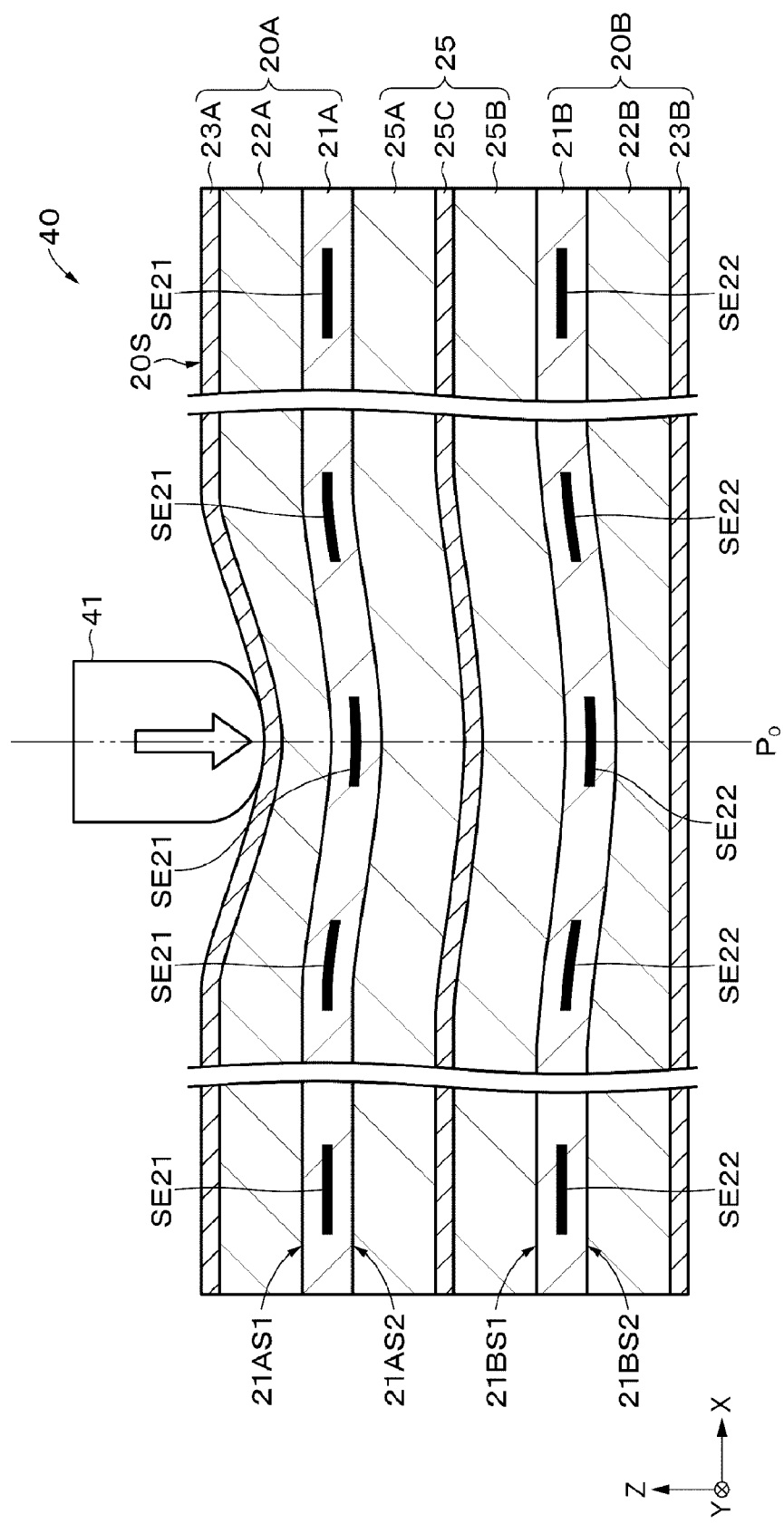
FIG. 15 is a cross-sectional view for describing an example of operation of the sensor at a time of pressure detection.

FIG. 15 is a cross-sectional view for describing an example of an operation of the sensor 40 at the time of pressure detection. The operation of the sensor 40 at the time of pressure detection is similar to the operation of the sensor 20 at the time of pressure detection in the first embodiment except for the following points. When the sensing surface 20S is pushed by the object 41 and a pressure acts on the first surface 21AS1 of the detection layer 21A by a part of the crushed deformation layer 22A, the detection layer 21A, the separation layer 25, and the detection layer 21B are bent toward the conductive layer 23B with the pressure acting portion as the center.

(Operation of Sensor When Shearing Force Is Detected)

Figure 16:
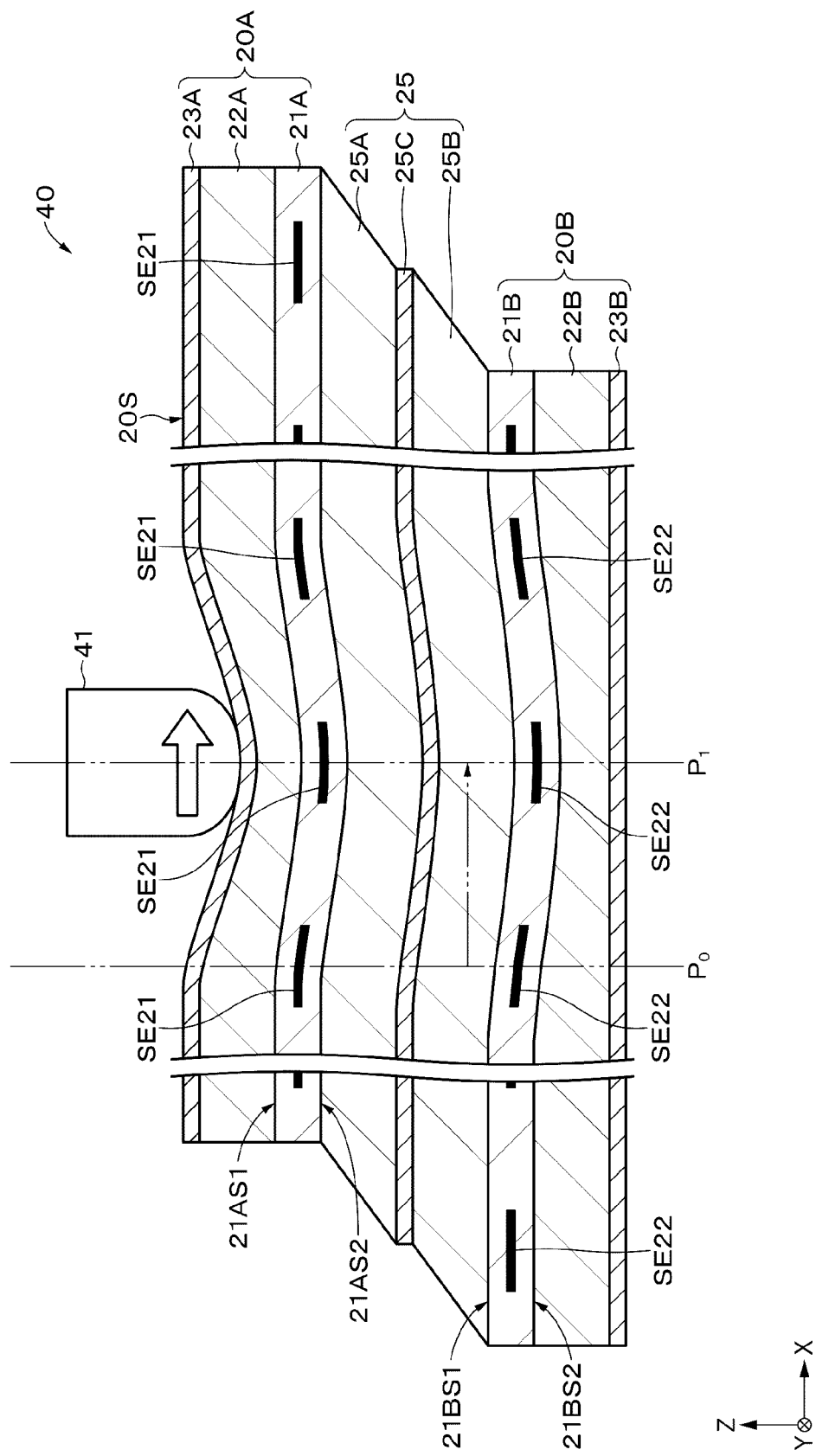
FIG. 16 is a cross-sectional view for describing an example of operation of the sensor at a time of detecting a shearing force.

FIG. 16 is a cross-sectional view for describing an example of the operation of the sensor 40 at the time of detecting a shearing force. The operation of the sensor 40 at the time of detecting the shearing force is similar to the operation of the sensor 40 at the time of detecting the pressure in the first embodiment except for the following points. When the shearing force acts on the sensor 40, the separation layer 25A and the separation layer 25B are elastically deformed in the in-plane direction of the sensor 40, and the relative positions of the detection layer 21A and the detection layer 21B in the in-plane direction of the sensor 40 are shifted.

[Effects]

The sensor 40 according to the second embodiment further includes the conductive layer 25C between the detection layer 21A and the detection layer 21B. Thus, electromagnetic interference between the detection layer 21A and the detection layer 21B can be further suppressed. Therefore, in the sensor 40, it is possible to suppress a decrease in detection accuracy or erroneous detection as compared with the sensor 20 according to the first embodiment.

3. Third Embodiment

[Configuration of Sensor]

Figure 17:
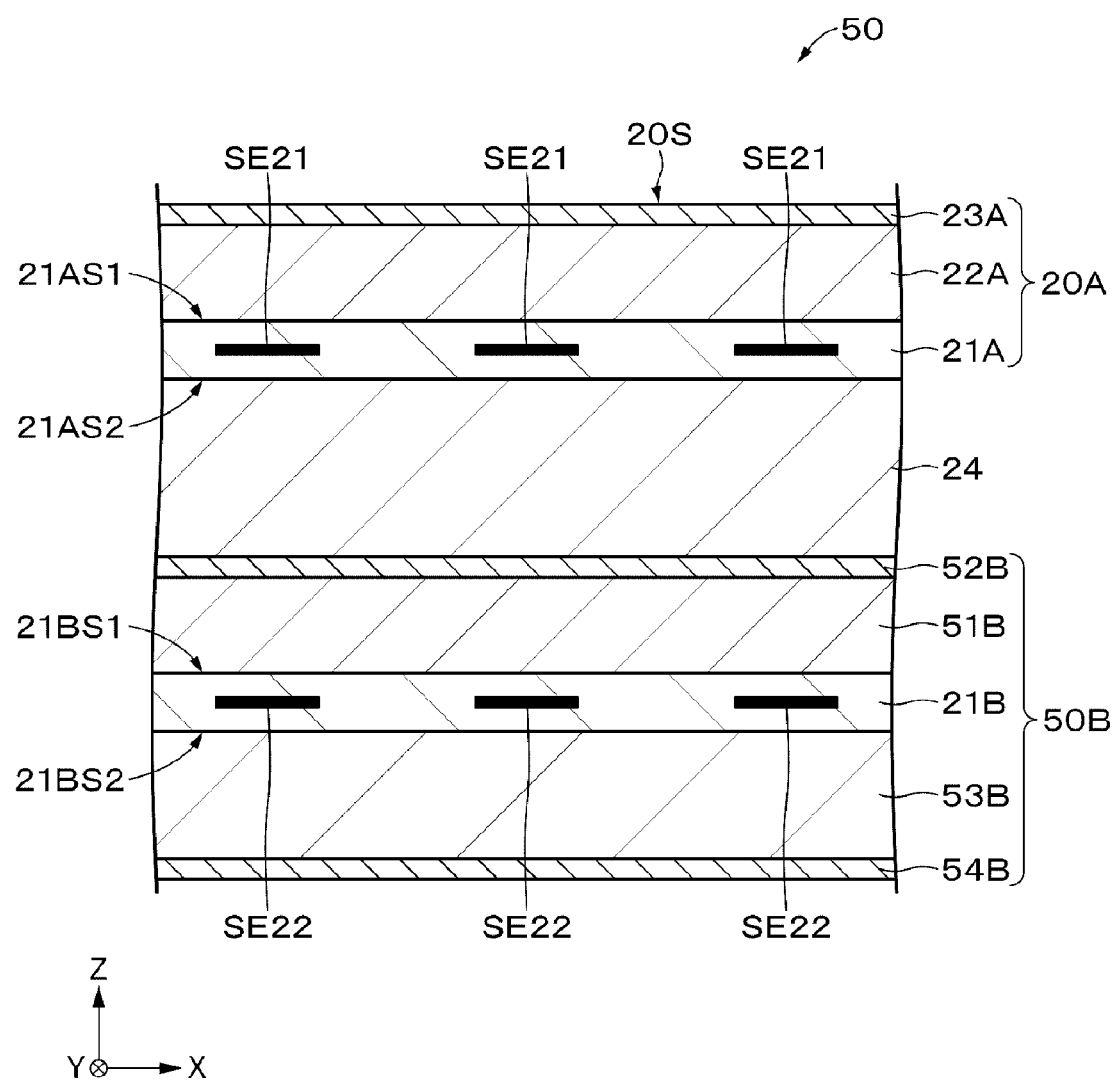
FIG. 17 is a cross-sectional view illustrating an example of a configuration of a sensor according to a third embodiment of the present disclosure.

FIG. 17 is a cross-sectional view illustrating an example of a configuration of a sensor 50 according to a third embodiment of the present disclosure. The sensor 50 is different from the sensor 20 according to the first embodiment in including a sensor layer 50B instead of the sensor layer 20B (see FIG. 2). Note that in the third embodiment, the same reference numerals are given to parts similar to those in the first embodiment, and the description thereof will be omitted.

The sensor layer 50B includes a detection layer (second detection layer) 21B, a deformation layer (second deformation layer) 51B, a conductive layer (second conductive layer) 52B, a separation layer 53B, and a conductive layer (third conductive layer) 54B. The conductive layer 52B is provided to face the second surface 21BS2 of the detection layer 21B. The deformation layer 51B is provided between the detection layer 21B and the conductive layer 52B. The detection layer 21B and the conductive layer 52B are held in parallel by the deformation layer 51B. The conductive layer 54B is provided to face the second surface 21BS2 of the detection layer 21B. The separation layer 53B is provided between the detection layer 21B and the conductive layer 54B. The detection layer 21B and the conductive layer 54B are held in parallel by the separation layer 53B.

(Conductive Layer)

The conductive layer 52B has at least one of flexibility or stretchability. When a pressure acts on the sensing surface 20S, the conductive layer 54B bends toward the detection layer 21B. The conductive layer 52B may or may not have at least one of flexibility or stretchability, but preferably has at least one of flexibility or stretchability in order to enable the sensor 50 to be attached to a curved surface.

The conductive layer 52B and the conductive layer 54B are what are called grounding electrodes, and are connected to the reference potential. The shapes and materials of the conductive layer 52B and the conductive layer 54B are similar to those of the conductive layer 23A in the first embodiment.

(Deformation Layer)

The deformation layer 51B has an insulating property. The deformation layer 51B separates the detection layer 21B and the conductive layer 52B so that the detection layer 21B and the conductive layer 52B are parallel. The sensitivity and dynamic range of the detection layer 21B can be adjusted by a thickness of the deformation layer 51B. The deformation layer 51B is formed to be elastically deformable according to the pressure acting on the sensing surface 20S, that is, the pressure acting in the thickness direction of the sensor 50. The material of the deformation layer 51B is similar to that of the deformation layer 22A in the first embodiment.

(Separation Layer)

The separation layer 53B has an insulating property. The separation layer 53B separates the detection layer 21B and the conductive layer 54B. The initial electrostatic capacitance of the sensor layer 50B is adjusted by a thickness of the separation layer 53B. The separation layer 53B may or may not be formed to be elastically deformable by the pressure acting on the sensing surface 20S. In a case where the separation layer 53B is formed to be elastically deformable, the pressure detection sensitivity in the sensor layer 50B can be further improved. The separation layer 53B formed to be elastically deformable may include a foamed resin, an insulating elastomer, or the like.

The separation layer 53B may or may not have adhesiveness. In a case where the separation layer 53B has adhesiveness, the detection layer 21B and the conductive layer 54B are bonded by the separation layer 53B. The separation layer 53B having adhesiveness is formed by, for example, a single adhesive layer or a stacked body (for example, a double-sided adhesive film) in which adhesive layers are provided on both surfaces of a base material. The material of the adhesive layer is similar to that of the adhesive layer in the first embodiment.

[Operation of Sensor]

Figure 18:
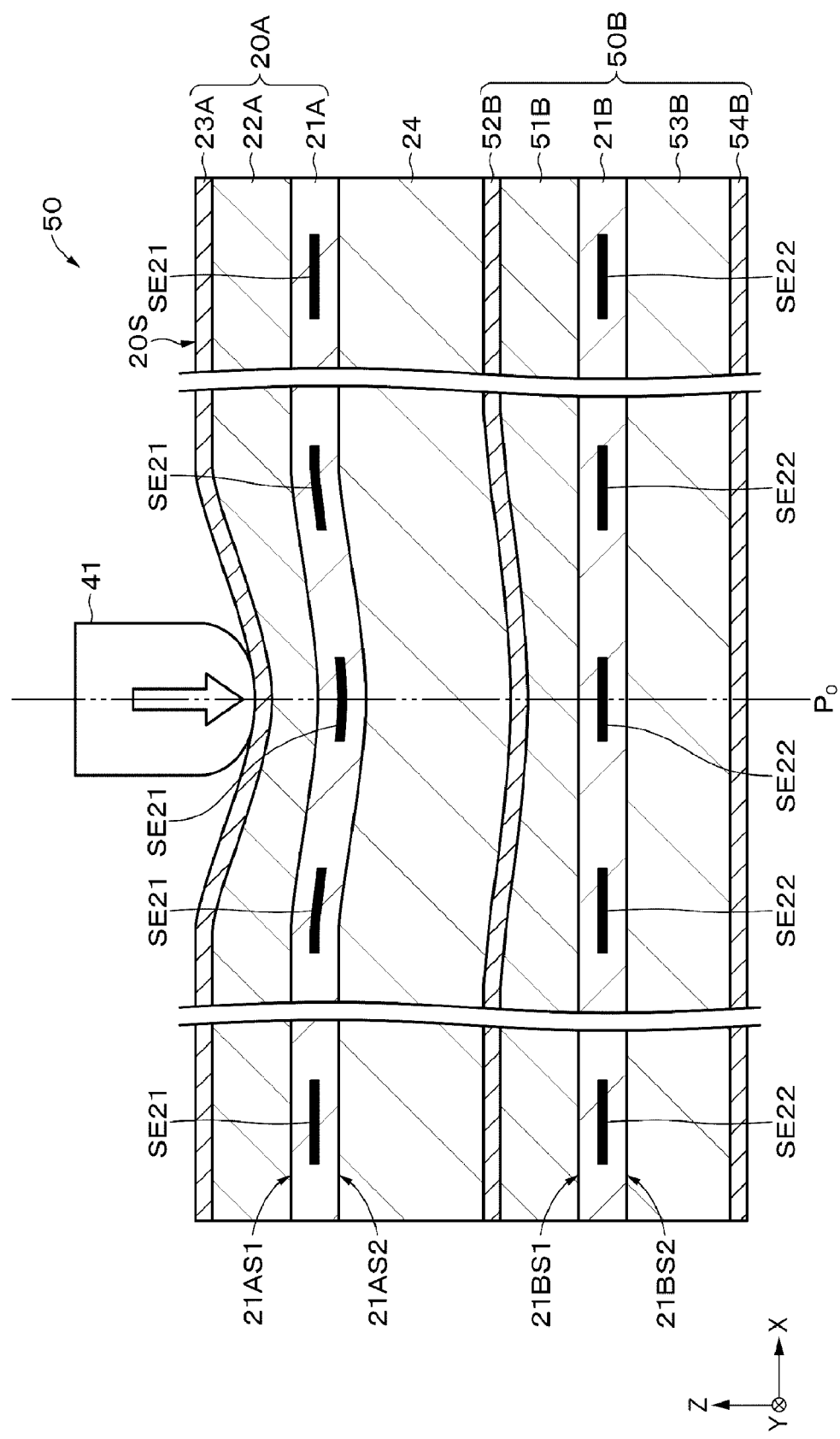
FIG. 18 is a cross-sectional view for describing an example of operation of the sensor at a time of pressure detection.

(Operation of Sensor at Time of Pressure Detection) FIG. 18 is a cross-sectional view for describing an example of operation of the sensor 50 at the time of pressure detection. When the sensing surface 20S is pressed by the object 41 and a pressure acts on the sensing surface 20S, the conductive layer 23A and a part of the detection layer 21A approach each other, and the electrostatic capacitance of the plurality of detection units SE21 changes, similarly to the operation of the sensor 20 according to the first embodiment.

Furthermore, when a pressure acts on the first surface 21AS1 of the detection layer 21A by a part of the deformation layer 22A crushed as described above, the detection layer 21A, the separation layer 24, and the conductive layer 52B are bent toward the detection layer 21B with the pressure acting portion as the center, and a part of the deformation layer 51B is crushed. Thus, the conductive layer 52B and a part of the detection layer 21B approach each other. Consequently, a part of the lines of electric force of the plurality of detection units SE22 included in the part of the detection layer 21B where the conductive layer 52B approaches (that is, a part of the lines of electric force between the reception electrode 36 and the drive electrode 37) flows to the conductive layer 52B, and the capacitance of the detection unit SE22 changes.

(Operation of Sensor When Shearing Force Is Detected)

Figure 19:
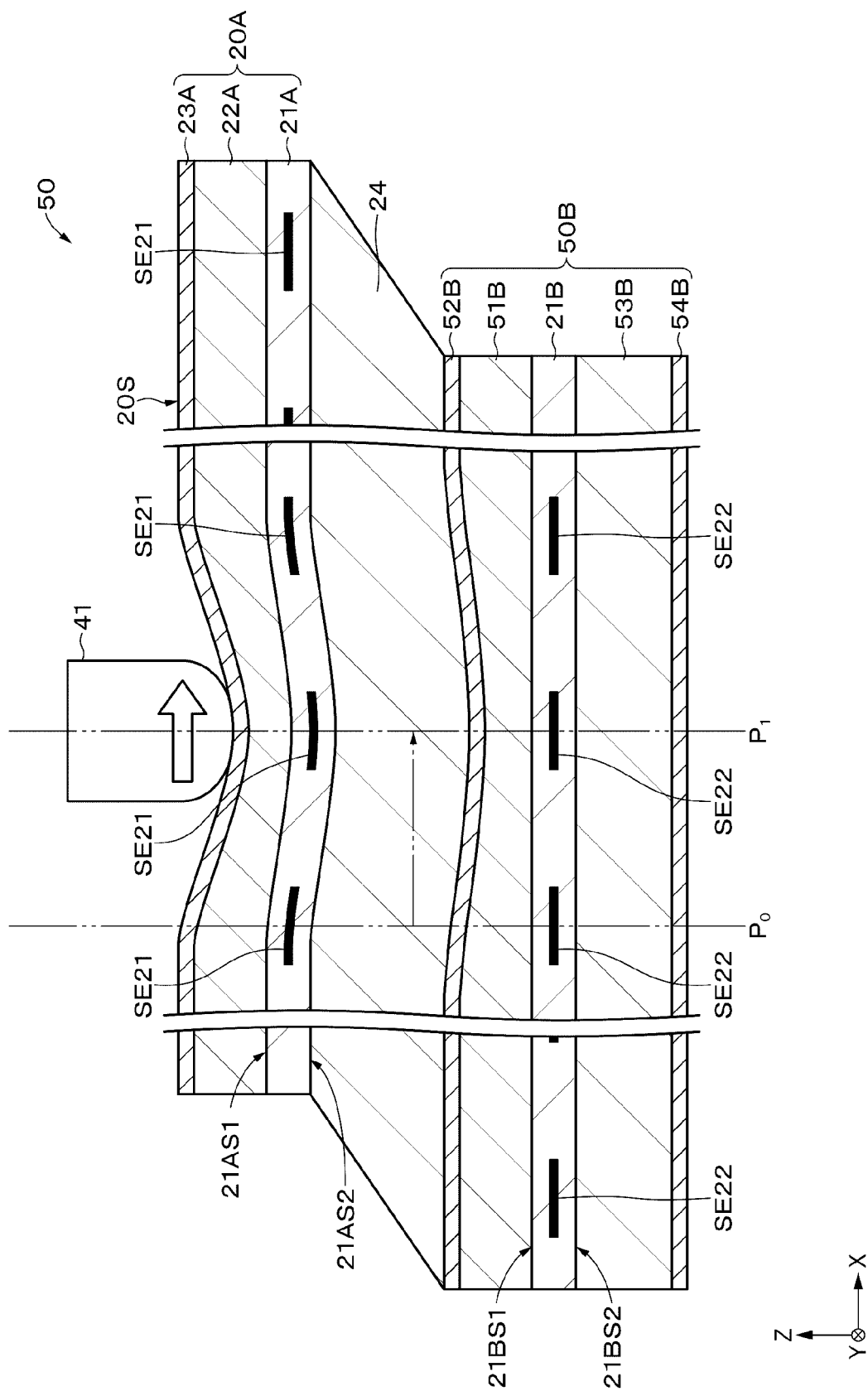
FIG. 19 is a cross-sectional view for describing an example of operation of the sensor at a time of detecting a shearing force.

FIG. 19 is a cross-sectional view for describing an example of operation of the sensor 50 at the time of detecting a shearing force. When the shearing force acts on the sensor 50, the separation layer 24 is elastically deformed in the in-plane direction of the sensor 50, and the relative positions of the detection unit SE21 and the detection unit SE22 in the in-plane direction (X, Y direction) of the sensor 50 are shifted. Thus, the centroid position of the output signal distribution (capacitance distribution) of the detection layer 21A and the centroid position of the output signal distribution (capacitance distribution) of the detection layer 21B are shifted in the in-plane direction (X, Y direction) of the sensor 50.

[Effects]

The sensor 50 according to the third embodiment includes the deformation layer 51B on the detection layer 21B. Therefore, the detection sensitivity of the pressure and the shearing force can be improved as compared with the sensor 20 according to the first embodiment including the deformation layer 22B below the detection layer 21B.

4. Fourth Embodiment

[Configuration of Sensor]

Figure 20:
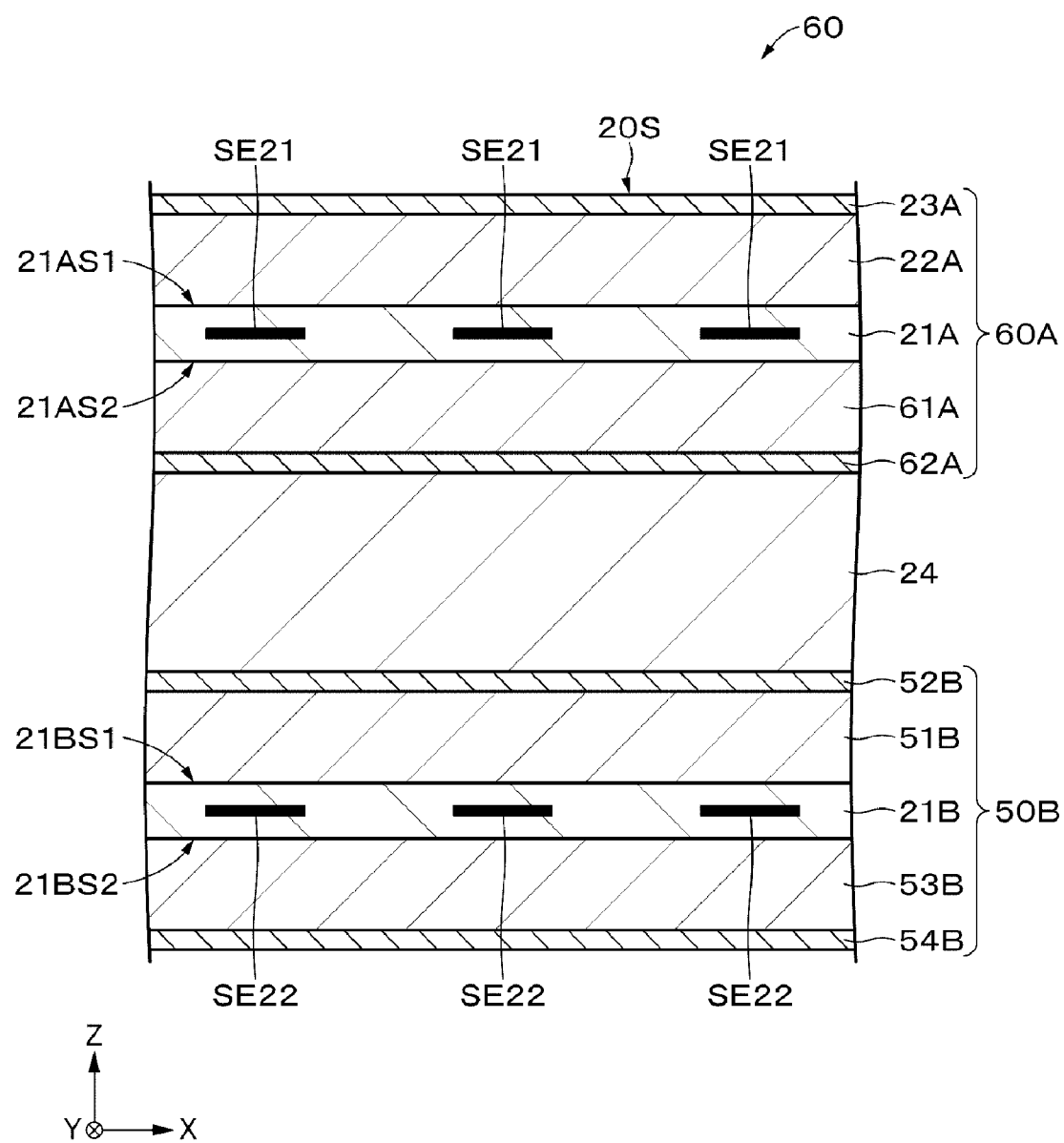
FIG. 20 is a cross-sectional view illustrating an example of a configuration of a sensor according to a fourth embodiment of the present disclosure.

FIG. 20 is a cross-sectional view illustrating an example of a configuration of a sensor 60 according to a fourth embodiment of the present disclosure. The sensor 60 is different from the sensor 50 according to the third embodiment in including a sensor layer 60A instead of the sensor layer (first sensor layer) 20A. Note that in the fourth embodiment, the same reference numerals are given to parts similar to those in the third embodiment, and the description thereof will be omitted.

The sensor layer 60A has a layer configuration similar to that of the sensor layer 50B. Specifically, the sensor layer 60A includes a detection layer (first detection layer) 21A, a deformation layer (first deformation layer) 22A, a conductive layer (first conductive layer) 23A, a separation layer 61A, and a conductive layer (second conductive layer) 62A. The conductive layer 62A is provided to face the second surface 21BS2 of the detection layer 21A. The separation layer 61A is provided between the detection layer 21A and the conductive layer 62A. The detection layer 21A and the conductive layer 62A are held in parallel by the separation layer 61A.

(Conductive Layer)

The conductive layer 62A has at least one of flexibility or stretchability. When a pressure acts on the sensing surface 20S, the conductive layer 62A bends toward the sensor layer 50B.

The conductive layer 62A is what is called a grounding electrode, and is connected to the reference potential. The shape and material of the conductive layer 62A are similar to the shape and material of the conductive layer 23A in the first embodiment.

(Separation Layer)

The separation layer 61A has an insulating property. The separation layer 61A separates the detection layer 21A and the conductive layer 62A. The initial electrostatic capacitance of the sensor layer 60A is adjusted by a thickness of the separation layer 61A. The separation layer 61A may or may not be formed to be elastically deformable by the pressure acting on the sensing surface 20S. In a case where the separation layer 61A is formed to be elastically deformable, the pressure detection sensitivity in the sensor layer 60A can be further improved. The separation layer 61A formed to be elastically deformable may include a foamed resin, an insulating elastomer, or the like.

The separation layer 61A may or may not have adhesiveness. In a case where the separation layer 61A has adhesiveness, the detection layer 21A and the conductive layer 62A are bonded by the separation layer 61A. The separation layer 61A having adhesiveness is formed by, for example, a single adhesive layer or a stacked body (for example, a double-sided adhesive film) in which adhesive layers are provided on both surfaces of a base material. The material of the adhesive layer is similar to that of the adhesive layer in the first embodiment.

[Operation of Sensor]
(Operation of Sensor at Time of Pressure Detection)

Figure 21:
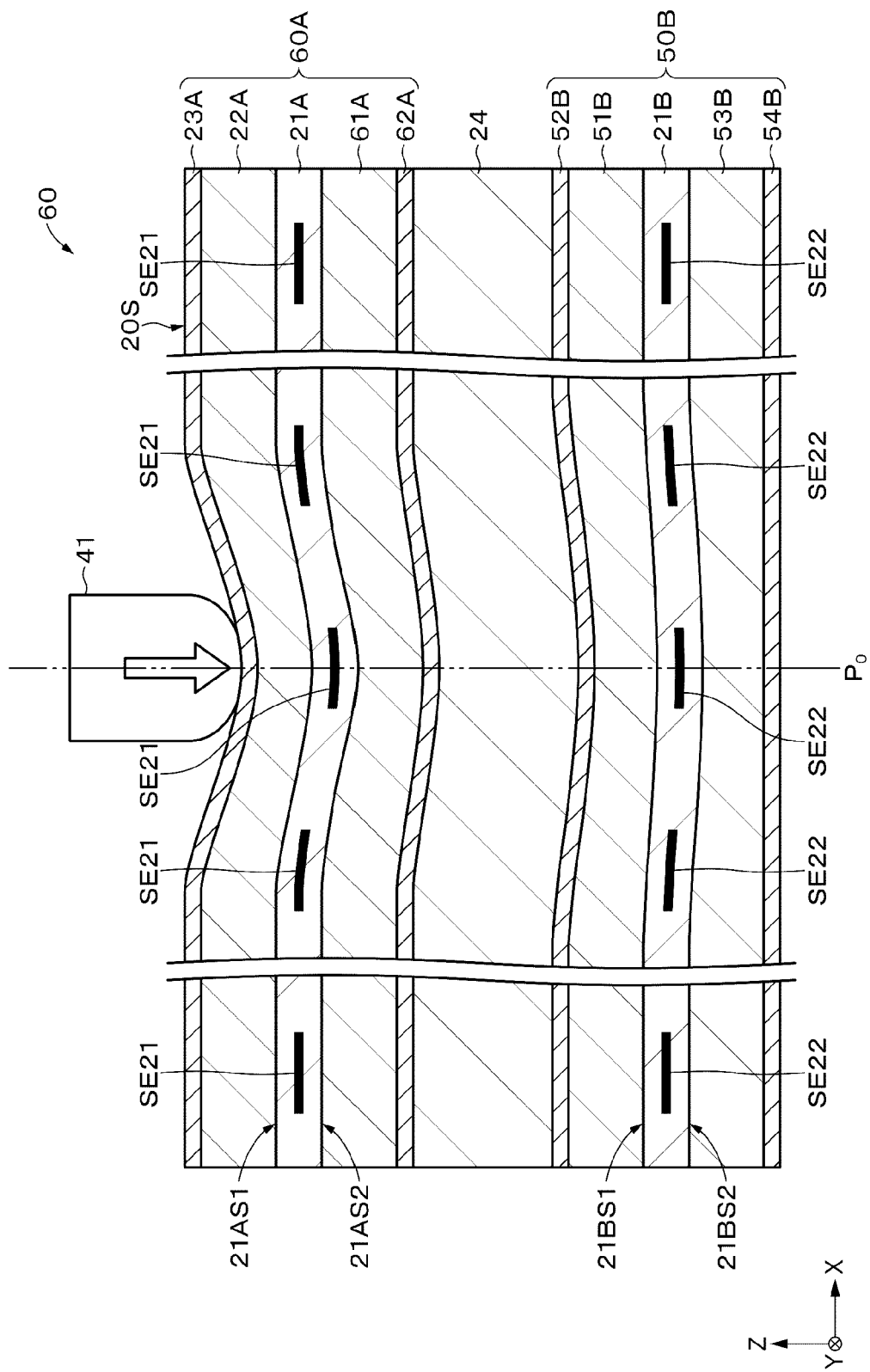
FIG. 21 is a cross-sectional view for describing an example of operation of the sensor at a time of pressure detection.

FIG. 21 is a cross-sectional view for describing an example of operation of the sensor 60 at the time of pressure detection. Here, an example of the operation of the sensor 60 at the time of pressure detection will be described for a case where the separation layers 61A and 53B are formed to be elastically deformable by the pressure acting on the sensing surface 20S.

Furthermore, when the sensing surface 20S is pressed by the object 41 and a pressure acts on the sensing surface 20S, the conductive layer 23A and a part of the detection layer 21A approach each other, similarly to the operation of the sensor 20 in the first embodiment. Moreover, when a pressure acts on the first surface 21AS1 of the detection layer 21A by a part of the deformation layer 22A crushed by the conductive layer 23A, the detection layer 21A bends toward the conductive layer 62A with the pressure acting portion as the center, and crushes a part of the separation layer 61A. Thus, the detection layer 21A and the part of the conductive layer 62A approach each other.

As described above, when the conductive layer 23A and the part of the detection layer 21A, and the detection layer 21A and the part of the conductive layer 62A approach each other, in the detection layer 21A a part of lines of electric force of the plurality of detection units SE21 included in the portion close to the conductive layer 23A and the conductive layer 62A (that is, a part of lines of electric force between the reception electrode 36 and the drive electrode 37) flows to the conductive layer 23A and the conductive layer 62A, and the electrostatic capacitance of the plurality of detection units SE21 changes.

When a pressure acts on the first surface of the conductive layer 62A by the part of the separation layer 61A crushed as described above, the conductive layer 62A, the separation layer 24, and the conductive layer 52B are bent toward the detection layer 21B with the pressure acting portion as the center, and a part of the deformation layer 51B is crushed. Thus, the conductive layer 52B and a part of the detection layer 21B approach each other. Furthermore, when a pressure acts on the first surface 21BS1 of the detection layer 21B by the part of the deformation layer 51B crushed as described above, the detection layer 21B bends toward the conductive layer 54B around the pressure acting portion and crushes a part of the separation layer 53B. Thus, the detection layer 21B and a part of the conductive layer 54B approach each other.

As described above, when the conductive layer 52B and the part of the detection layer 21B, and the detection layer 21B and the part of the conductive layer 54B approach each other, in the detection layer 21B, a part of lines of electric force of the plurality of detection units SE22 included in the portion close to the conductive layer 52B and the conductive layer 54B (that is, a part of lines of electric force between the reception electrode 36 and the drive electrode 37) flows to the conductive layer 52B and the conductive layer 54B, and the electrostatic capacitance of the plurality of detection units SE22 changes.

(Operation of Sensor When Shearing Force Is Detected)

Figure 22:
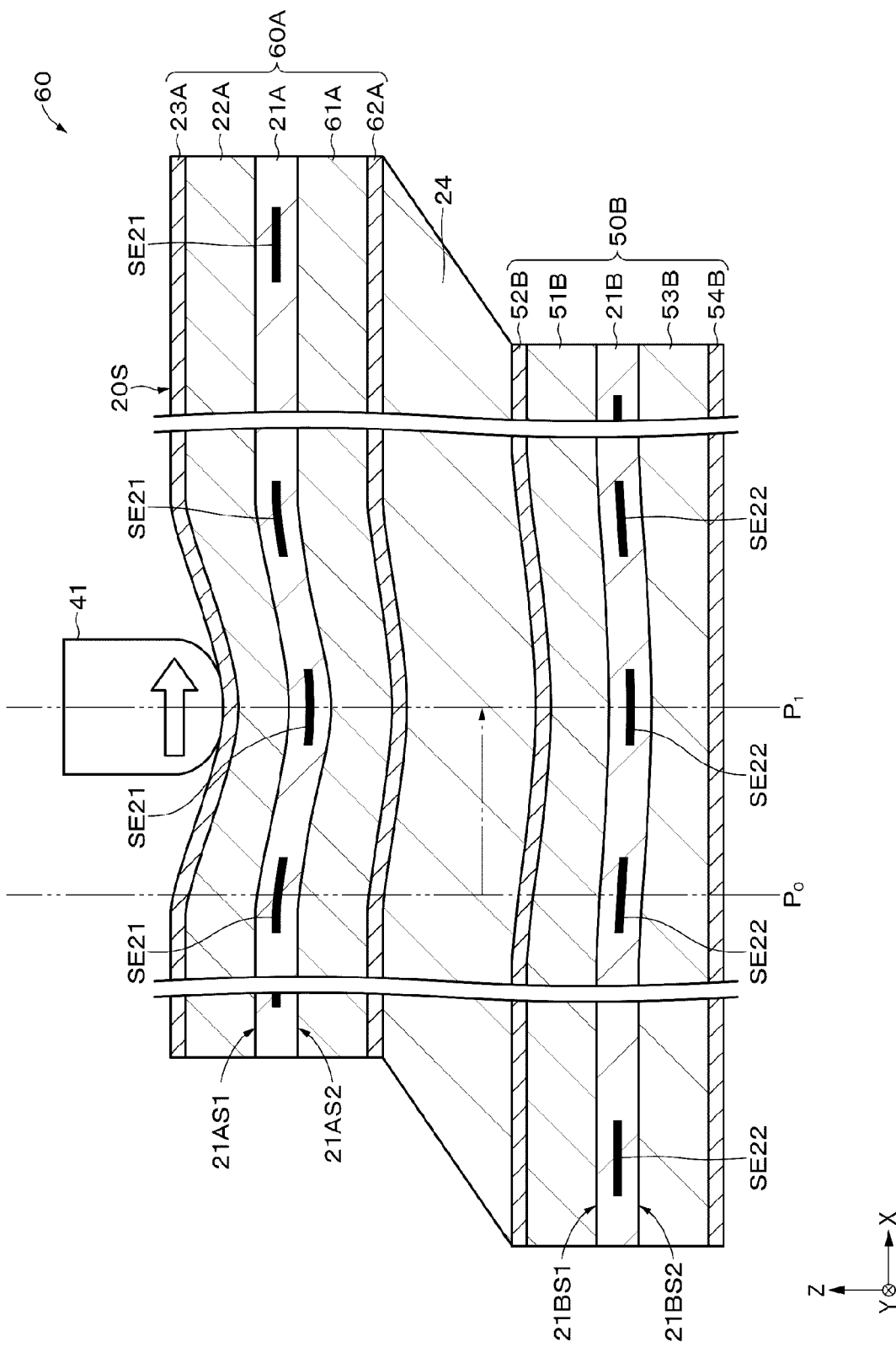
FIG. 22 is a cross-sectional view for describing an example of operation of the sensor at a time of detecting a shearing force.

FIG. 22 is a cross-sectional view for describing an example of operation of the sensor 60 at a time of detecting a shearing force. When the shearing force acts on the sensor 60, the separation layer 24 is elastically deformed in the in-plane direction of the sensor 60, and the relative positions of the detection unit SE21 and the detection unit SE22 in the in-plane direction (X, Y direction) of the sensor 60 are shifted. Thus, the centroid position of the output signal distribution (capacitance distribution) of the detection layer 21A and the centroid position of the output signal distribution (capacitance distribution) of the detection layer 21B are shifted in the in-plane direction (X, Y direction) of the sensor 60.

[Effects]

The sensor 60 according to the fourth embodiment can be configured by interposing the separation layer 24 between the sensor layer 60A and the sensor layer 50B having the same structure. Therefore, similarly to the sensor 20 according to the first embodiment, it is possible to detect the distribution of three-axis forces with a relatively simple and space-saving configuration as a whole.

5. Fifth Embodiment

[Configuration of Sensor]

Figure 23:
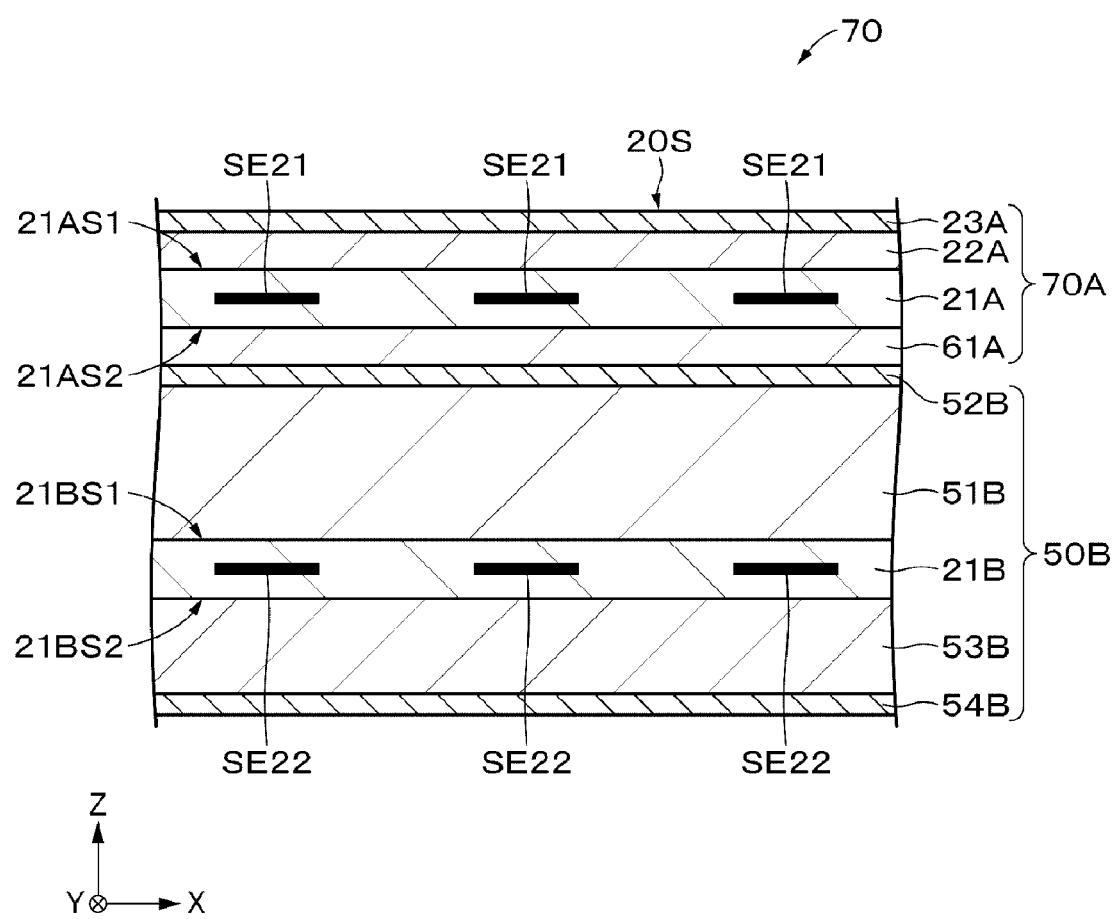
FIG. 23 is a cross-sectional view illustrating an example of a configuration of a sensor according to a fifth embodiment of the present disclosure.

FIG. 23 is a cross-sectional view illustrating an example of a configuration of a sensor 70 according to a fifth embodiment of the present disclosure. The sensor 70 is what is called a pressure distribution sensor, and includes a sensor layer 70A having high sensitivity and a sensor layer 70B having low sensitivity, and the sensor layer 70A is provided on the sensor layer 70B. The sensitivity of the sensor layer 70A is higher compared to the sensitivity of the sensor layer 70B. Note that in the fifth embodiment, the same reference numerals are given to parts similar to those in the fourth embodiment, and the description thereof will be omitted.

The sensor layer 70A has a configuration similar to that of the sensor layer 60A (see FIG. 20) in the fourth embodiment except that the sensor layer 70A does not include the conductive layer 62A. The sensor layer 70B has a configuration similar to that of the sensor layer 50B in the fourth embodiment.

(Load Sensitivity Curve)

FIG. 24A is a graph illustrating an example of a load sensitivity curve of the sensor 70. FIG. 24B is an enlarged graph illustrating a part of FIG. 24A (near a boundary between a low load region and a high load region). The sensor layer 70A is for a low load region (for a first load region). The sensor layer 70B is for a high load region (for a second load region). The low load region is a pressure range of a prescribed pressure P or less. The high load region is a pressure range exceeding a prescribed pressure P. The prescribed pressure P is set to a boundary value at which a load sensitivity curve of the sensor layer 70A as an upper layer starts to be saturated. The boundary value may be, for example, an inflection point. FIGS. 24A and 24B illustrate an example in which the prescribed pressure P is 100 kPa.

An example of a method for deriving the load sensitivity curve illustrated in FIG. 24A will be described with reference to FIGS. 25A and 25B. FIG. 25A is a graph illustrating an example of a load sensitivity curve (hereinafter referred to as a "low load sensitivity curve") of the sensor layer 70A. FIG. 25B is a graph illustrating an example of a load sensitivity curve (hereinafter referred to as a "high load sensitivity curve") of the sensor layer 70B. The low load sensitivity curve of the sensor layer 70A as the upper layer starts to be saturated at a pressure of 100 kPa. Accordingly, in FIGS. 25A and 25B, an output signal value is normalized such that the output signal value at the pressure of 100 kPa becomes 100. This normalization processing is performed by the CPU 12A.

The load sensitivity curve illustrated in FIG. 24A is obtained by integrating the low load sensitivity curve in a low load region (load region of 0 kPa or more and 100 kPa or less) and the high load sensitivity curve in a high load region (load region exceeding 100 kPa).

(CPU)

The CPU 12A normalizes a first output signal value from the sensor layer 70A and a second output signal value from the sensor layer 70B as described above. The CPU 12A determines whether or not the normalized first output signal value exceeds a prescribed output signal value. Here, the prescribed output signal value means an output signal value corresponding to the prescribed pressure P described above. FIGS. 24A and 24B illustrate an example in which the output signal value is 100. Note that the IC 13A may output the normalized first output signal value and the second output signal to the CPU 12A after performing the normalization processing described above.

In a case where the normalized first output signal value does not exceed the prescribed output signal value, the CPU 12A calculates centroid coordinates of the pressure acting on the detection layer 21A on the basis of the normalized first output signal value, and executes various controls of the host device 12 on the basis of the calculation result. On the other hand, in a case where the normalized first output signal value exceeds the prescribed output signal value, the CPU 12A calculates centroid coordinates of the pressure acting on the detection layer 21B on the basis of the normalized second output signal value.

[Effects]

Figure 26:
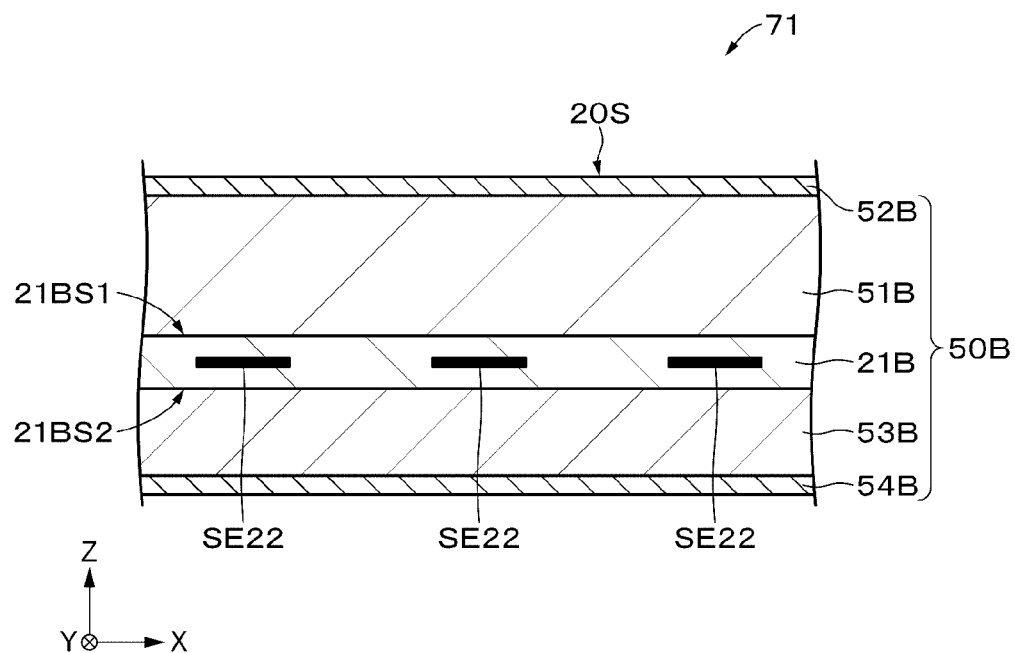
FIG. 26 is a cross-sectional view illustrating a configuration of a sensor according to Reference Example 1.

FIG. 26 is a cross-sectional view illustrating a configuration of a sensor 71 according to Reference Example 1. The sensor 71 is a pressure distribution sensor, and has a configuration similar to that of the sensor layer 50B (see FIG. 23). In order to widen the dynamic range with respect to a vertical pressure (pressure in the Z-axis direction) detectable by the sensor 71, it is conceivable to increase a thickness of the deformation layer 51B or increase hardness of the deformation layer 51B. However, employing any of these configurations may cause a decrease in sensitivity of the sensor 71.

On the other hand, the sensor 70 according to the fifth embodiment includes the sensor layer 70A having high sensitivity and the sensor layer 70B having low sensitivity, and the sensor layer 70A is provided on the sensor layer 70B. Thus, the load (pressure distribution) in the low load region can be detected by the sensor layer 70A, and the load (pressure distribution) in the high load region can be detected by the sensor layer 70B. Therefore, it is possible to complement the dynamic ranges of the sensor layers 70A and 70B with each other while suppressing a decrease in sensitivity of the sensor 70. Thus, it is possible to achieve a wide dynamic range of the entire sensor 70 while suppressing a decrease in sensitivity of the sensor 70.

6. Sixth Embodiment

[Configuration of Sensor]

Figure 27:
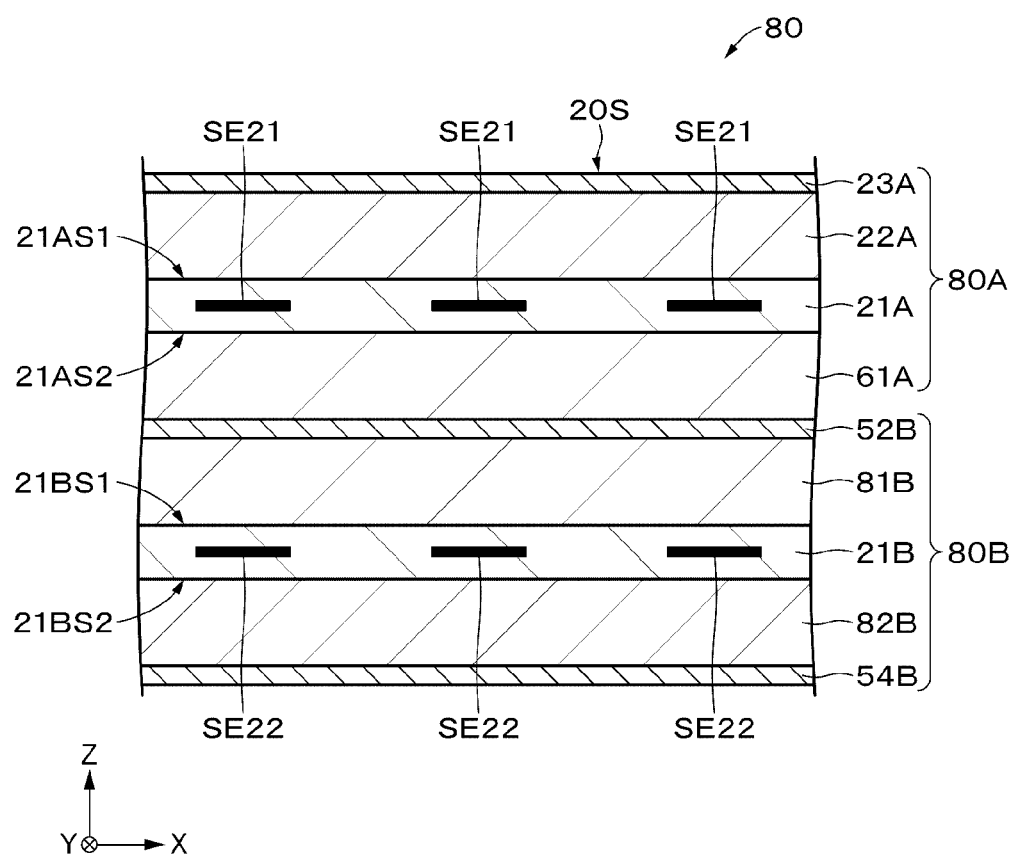
FIG. 27 is a cross-sectional view illustrating an example of a configuration of a sensor according to a sixth embodiment of the present disclosure.

FIG. 27 is a cross-sectional view illustrating an example of a configuration of a sensor 80 according to a sixth embodiment of the present disclosure. The sensor 80 is a pressure distribution sensor having a temperature compensation function, and includes a pressure sensor layer 80A (hereinafter simply referred to as a "sensor layer 80A") that detects a pressure distribution and a temperature detection sensor layer 80B (hereinafter simply referred to as a "sensor layer 80B") that detects an environmental temperature of the sensor 80. The sensor layer 80A is provided on the sensor layer 80B.

The sensor layer 80A has a configuration similar to that of the sensor layer 60A (see FIG. 20) in the fourth embodiment except that the sensor layer 80A does not include the conductive layer 62A. The sensor layer 80A detects a distribution of pressure acting on the sensing surface 20S and outputs the distribution of pressure to the IC 13A.

The sensor layer 80B is different from the sensor layer 50B in the fourth embodiment in including a separation layer 81B in place of the deformation layer 51B and including a separation layer 82B in place of the separation layer 53B (see FIG. 20). The sensor layer 80B detects a change in electrostatic capacitance according to a change in environmental temperature of the sensor 80, and outputs the change to the IC 13A.

The separation layers 81B and 82B are formed to be capable of maintaining a thickness substantially constant with little deformation even when a pressure acts on the sensing surface 20S. Thus, the distance between the detection layer 21B and the conductive layer 52B is held substantially constant, and the distance between the detection layer 21B and the conductive layer 54B is held substantially constant. Therefore, even when a pressure acts on the sensing surface 20S, the capacitance of the detection layer 21B hardly changes.

It is preferable that a dielectric constant (temperature factor) of a member (for example, at least one of the base material 31 or the adhesive layer 35A (see FIG. 4)) provided around the detection unit SE21 is a low dielectric constant, and a dielectric constant (temperature factor) of a member (for example, at least one of the base material 31 or the adhesive layer 35A (see FIG. 4)) provided around the detection unit SE22 is a high dielectric constant. Thus, a temperature factor of detection can be suppressed in the sensor layer 80A, and a temperature factor of detection can be increased in the sensor layer 80B, so that the performance of the sensor 80 can be improved.

For example, it is preferable that a dielectric constant of a member (for example, at least one of the base material 31 or the adhesive layer 35A (see FIG. 4)) provided around the detection unit SE21 is preferably lower compared to a dielectric constant of a member (for example, at least one of the base material 31 or the adhesive layer 35A (see FIG. 4)) provided around the detection unit SE22.

From the viewpoint of temperature compensation, each of the plurality of detection units SE22 is preferably provided corresponding to the detection unit SE21. The plurality of detection units SE22 included in the sensor layer 80B may be provided so as to overlap the plurality of detection units SE21 included in the sensor layer 80A, respectively, in the thickness direction (Z-axis direction) of the sensor 80.

(CPU)

The CPU 12A corrects the first output signal (that is, the first capacitance distribution) from the IC 13A on the basis of the second output signal (that is, the second capacitance distribution) from the IC 13A.

The CPU 12A calculates centroid coordinates of the pressure acting on the detection layer 21A on the basis of the corrected first output signal, and executes various controls of the host device 12 on the basis of a calculation result. Examples of a method for correcting the first output signal include a method described in WO 2018/186022.

[Effects]

The sensor 80 according to the sixth embodiment includes a sensor layer 80A and a sensor layer 80B, and the sensor layer 80A is provided on the sensor layer 80B. Thus, even if the plurality of detection units SE22 for detecting the temperature of the sensor 80 is provided, an increase in the area of the sensor 80 can be suppressed. Therefore, it is possible to achieve temperature compensation of the sensor 80 while suppressing an increase in the area of the sensor 80.

On the other hand, in a pressure distribution sensor (WO 2018/186022) in which a detection unit for temperature detection is arranged near a detection unit for pressure detection and temperature compensation is performed, since the detection unit for temperature detection is provided, the area of the sensor increases.

7. Seventh Embodiment

[Configuration of Sensor]

Figure 28:
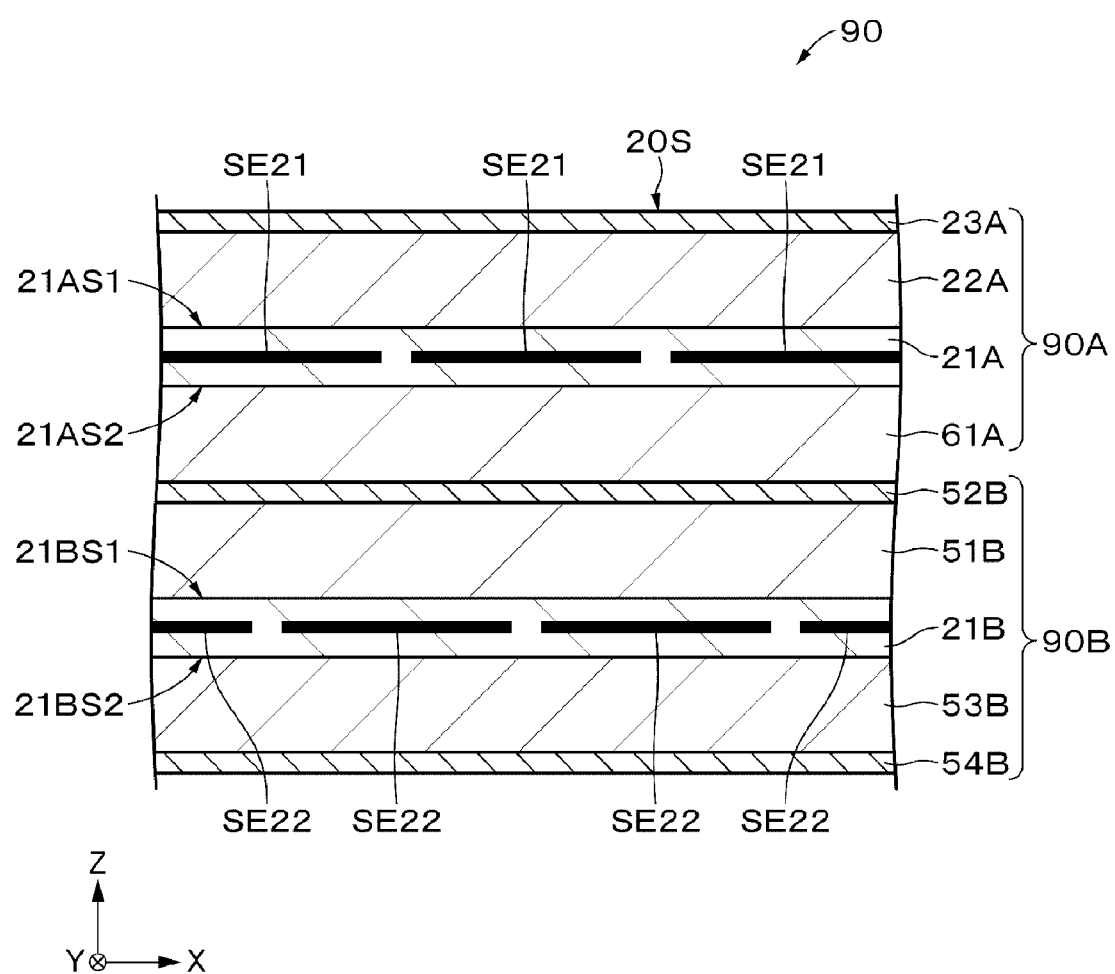
FIG. 28 is a cross-sectional view illustrating an example of a configuration of a sensor according to a seventh embodiment of the present disclosure.

FIG. 28 is a cross-sectional view illustrating an example of a configuration of a sensor 90 according to a seventh embodiment of the present disclosure. The sensor 90 is a pressure distribution sensor and includes a sensor layer 90A and a sensor layer 90B, and the sensor layer 90A is provided on the sensor layer 90B.

The sensor layer 90A has a configuration similar to that of the sensor layer 60A (see FIG. 20) in the fourth embodiment except that the sensor layer 90A does not include the conductive layer 62A. The sensor layer 90B has a configuration similar to that of the sensor layer 50B (see FIG. 17) in the third embodiment except that the plurality of detection units SE22 is arranged to be shifted respectively in the in-plane direction of the sensor 90 with respect to the plurality of detection units SE21.

Figure 29:
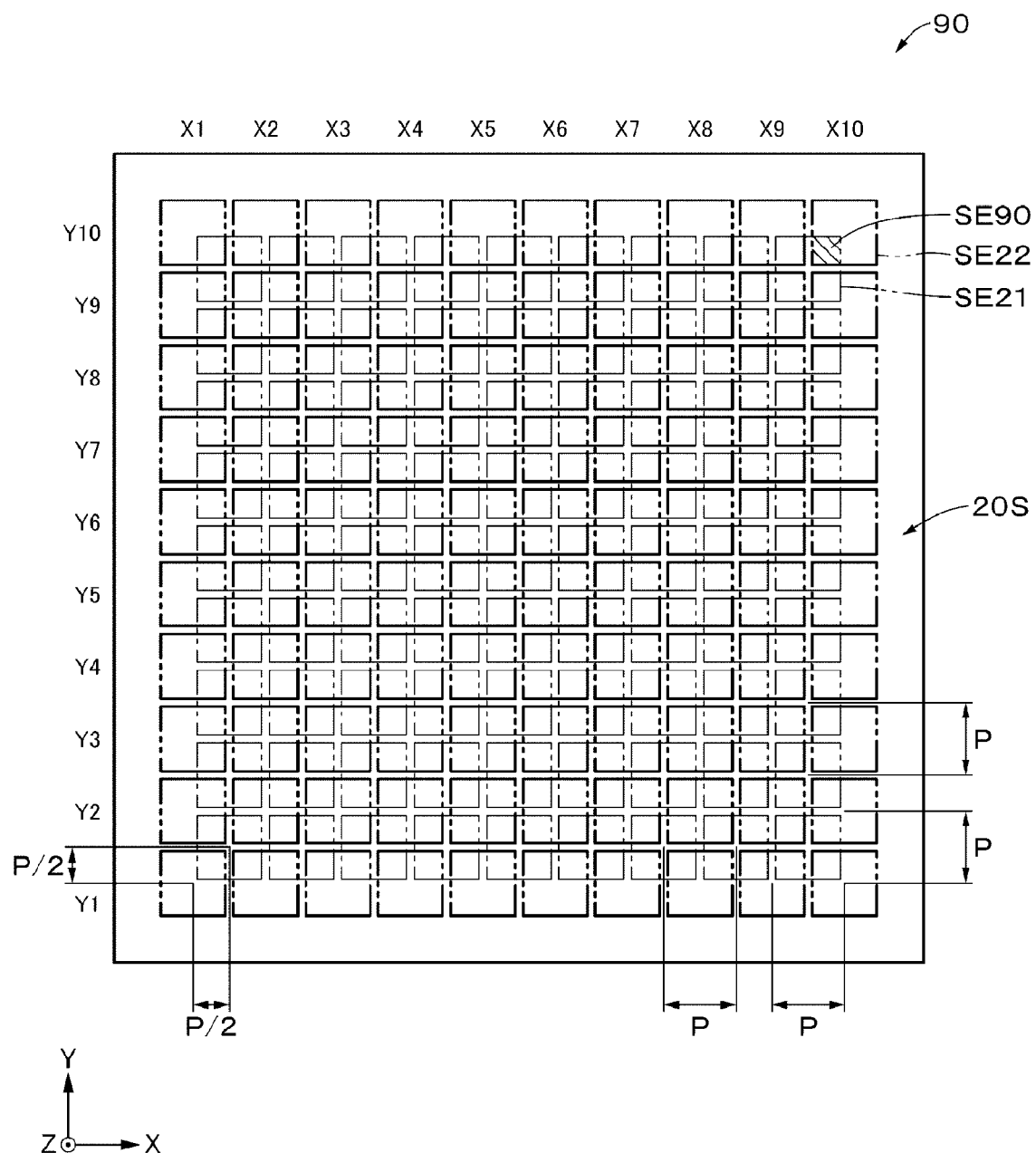
FIG. 29 is a plan view illustrating a positional relationship between a plurality of detection units included in an upper sensor layer and a plurality of detection units included in a lower sensor layer.

FIG. 29 is a plan view illustrating a positional relationship between the plurality of detection units SE21 included in the sensor layer 90A and the plurality of detection units SE22 included in the sensor layer 90B. The plurality of detection units SE21 and the plurality of detection units SE22 are arranged at an arrangement pitch P in the row direction (X-axis direction) and the column direction (Y-axis direction) of the matrix array. The detection units SE22 are arranged to be shifted from the detection units SE21 by P/2 in each of the row direction (X-axis direction) and the column direction (Y-axis direction) of the matrix array. One-fourth size regions of the detection units SE21 and one-fourth size regions of the detection units SE22 overlap in the thickness direction of the sensor 90. Virtual detection units SE90 are formed by portions where these one-fourth size regions overlap. In the seventh embodiment, a case where the detection units SE22 are arranged to be shifted by P/2 in the row direction (X-axis direction) and the column direction (Y-axis direction) with respect to the detection units SE21 will be described, but it is sufficient if the detection units SE21 and the detection units SE22 overlap each other in the thickness direction of the sensor 90, and the shift amount of the detection units SE22 is not limited to P/2.

(CPU)

The CPU 12A calculates output signals (electrostatic capacitance distribution) of the plurality of virtual detection units SE21 on the basis of the first output signals (that is, a first electrostatic capacitance distribution) of the plurality of detection units SE22 and the second output signals (that is, a second electrostatic capacitance distribution) of the plurality of detection units SE90 supplied from the IC 13A. The CPU 12A calculates centroid coordinates of the pressure acting on the sensor 90 on the basis of the calculated output signal (capacitance distribution), and executes various controls of the host device 12 on the basis of the calculation result.

FIG. 30A is a graph illustrating an example of a load sensitivity curve (hereinafter referred to as a "first load sensitivity curve") of the sensor layer 90A. FIG. 30B is a graph illustrating an example of a load sensitivity curve (hereinafter referred to as a "second load sensitivity curve") of the sensor layer 90B. As illustrated in FIGS. 30A and 30B, even when the pressure acting on the sensing surface 20S is the same, the output signal value (delta value) output from the sensor layer 90A is different from the output signal value (delta value) output from the sensor layer 90B. Therefore, the CPU 12A normalizes the output signal value supplied from the sensor layer 90A and the output signal value supplied from the sensor layer 90B, and performs processing so that the output signal values for the same pressure value are the same or substantially the same.

FIG. 31A illustrates a first load sensitivity curve normalized such that the output signal value becomes 1000 at a pressure of 175 kPa. FIG. 31B illustrates a second load sensitivity curve normalized such that the output signal value becomes 1000 at a pressure of 175 kPa. Here, the pressure 175 kPa used for normalization is a pressure value around the maximum value of the detection range of the sensor layer 90A.

Figure 33:
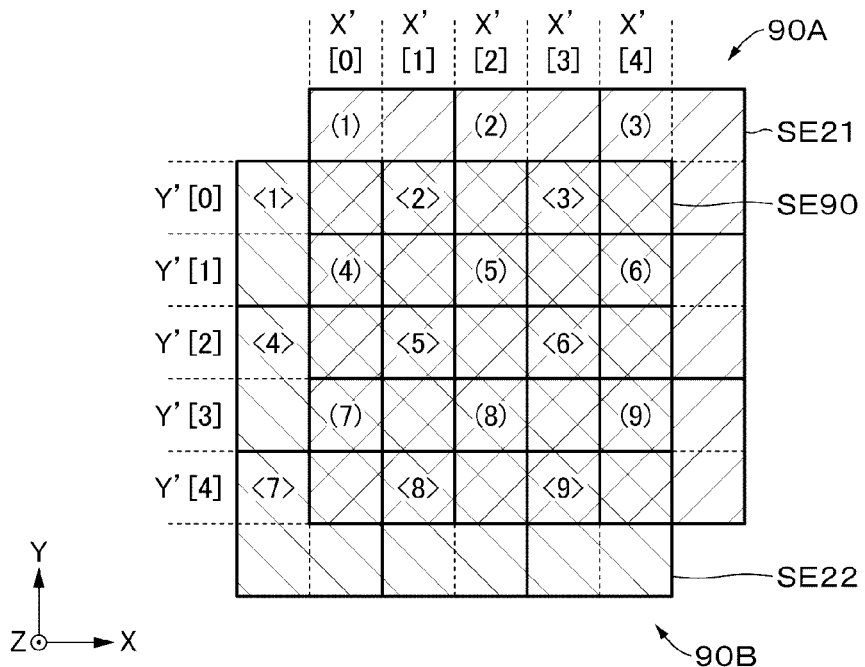
FIG. 33 is a schematic view illustrating a state in which the upper sensor layer and the lower sensor layer are overlapped.

Hereinafter, an example of a method of calculating output signals (capacitance distribution) of the plurality of virtual detection units SE90 will be described with reference to FIGS. 32A, 32B, and 33. Here, a case where each of the plurality of detection units SE21 and the plurality of detection units SE22 is arranged in a 3×3 square matrix will be described as an example.

FIG. 32A is a schematic diagram of the plurality of detection units SE21 included in the sensor layer 90A. FIG. 32B is a schematic diagram of the plurality of detection units SE22 included in the sensor layer 90B. FIG. 33 is a schematic diagram illustrating a positional relationship between the detection units SE21 and SE22 in a state where the sensor layers 90A and 90B are overlapped.

In a case of distinguishing the detection units SE21 included in the sensor layer 90A, as illustrated in FIG. 32A, the detection units SE21 are referred to as detection units (1) to (9) using reference numerals (1) to (9). Furthermore, in a case of distinguishing the detection units SE22 included in the sensor layer 90B, as illustrated in FIG. 32B, the detection units SE22 are referred to as detection units <1> to <9> using reference numerals <1> to <9>.

As illustrated in FIGS. 32A and 32B, the center position of each of the detection units SE21 and SE22 is indicated by coordinates (X[m],Y [n]) (where m and n are integers of 0 or more and 2 or less). Furthermore, as illustrated in FIG. 33, the center position of each virtual detection unit SE90 is indicated by coordinates (X'[m'], Y' [n']) (where m' and n' are integers of 0 or more and 4 or less).

The output signal value of each virtual detection unit SE90 is calculated by the following equation.

Output signal value of virtual detection unit (X'[0],
    Y'[0])=(normalized output signal value of detection unit (1)+normalized output signal value of detection unit <1>)/2

Output signal value of virtual detection unit (X'[0],
    Y'[1])=(normalized output signal value of detection unit (1)+normalized output signal value of detection unit <2>)/2

Output signal value of virtual detection unit (X'[0],
    Y'[2])=(normalized output signal value of detection unit (2)+normalized output signal value of detection unit <2>)/2

. . .

Output signal value of virtual detection unit (X'[1],
    Y'[0])=(normalized output signal value of detection unit (4)+normalized output signal value of detection unit <1>)/2

Output signal value of virtual detection unit (X'[1],
    Y'[1])=(normalized output signal value of detection unit (4)+normalized output signal value of detection unit <2>)/2

Output signal value of virtual detection unit (X'[1],
    Y'[2])=(normalized output signal value of detection unit (5)+normalized output signal value of detection unit <2>)/2

. . .

The seventh embodiment is similar to the first embodiment except for the above.

[Effects]

In the conventional film pressure distribution sensor, in order to improve the resolution of the pressure distribution in the XY plane, a method of reducing the area of the detection unit and narrowing the pitch of the detection unit is conceivable, but there is a limit to narrowing the pitch because the initial capacity of the detection unit decreases and the sensitivity of the sensor decreases.

On the other hand, in the sensor 90 according to the seventh embodiment, the upper sensor layer (pressure distribution sensor) 90A and the lower sensor layer (pressure distribution sensor) 90B are arranged to be shifted in XY plane directions. For example, arrangement in the XY plane directions is shifted by ½ pitch. Pressure data of the two sensor layers 90A and 90B is integrated in the CPU 12A. Thus, the pressure distribution resolution in the XY plane as the whole sensor 90 can be improved.

8. Eighth Embodiment

[Configuration of Sensor]

Figure 34:
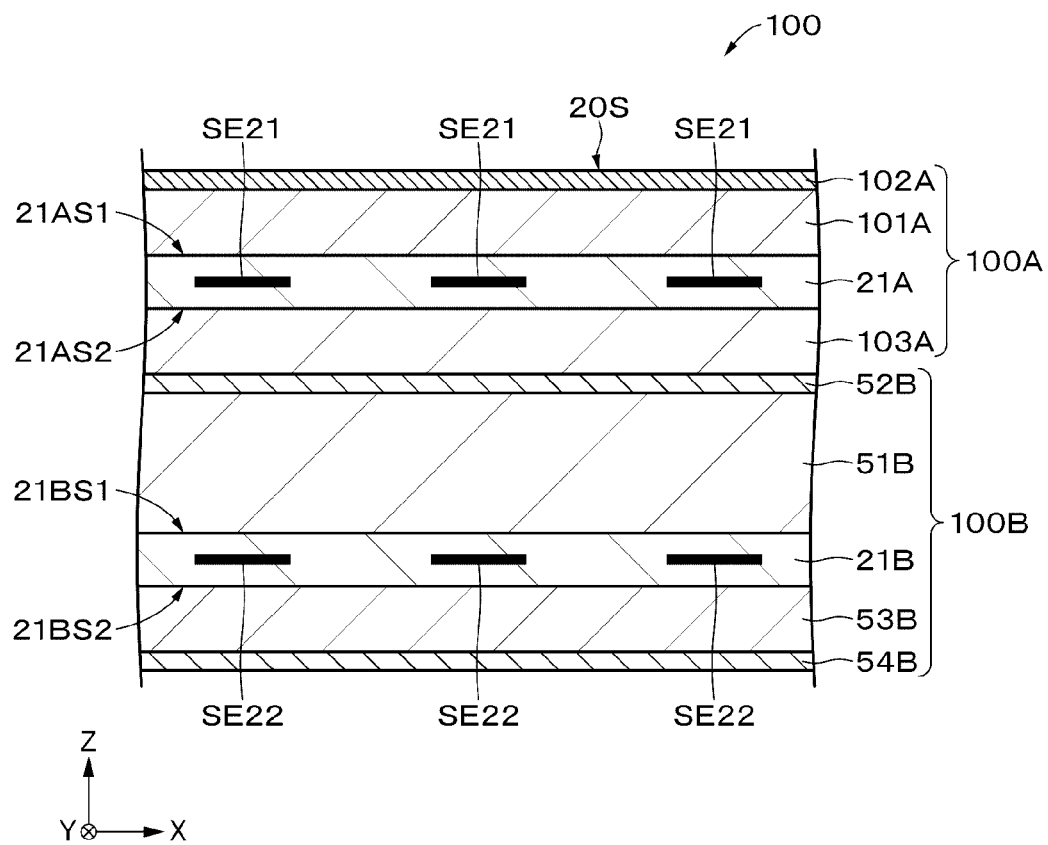
FIG. 34 is a cross-sectional view illustrating an example of a configuration of a sensor according to an eighth embodiment of the present disclosure.

FIG. 34 is a cross-sectional view illustrating an example of a configuration of a sensor 100 according to an eighth embodiment of the present disclosure. The sensor 100 is a combined sensor capable of detecting a proximity operation, a touch operation (feather touch operation), and a push-in operation. Here, the proximity operation refers to an input operation in which a finger, an object, or the like does not contact the sensing surface 20S. The touch operation (feather touch operation) refers to an input operation in which no pressure acts on the sensing surface 20S or a very small pressure acts on the sensing surface 20S. The push-in operation refers to an input operation in which the sensing surface 20S is pushed by a finger, an object, or the like.

The sensor 100 includes a sensor layer 100A and a sensor layer 100B, and the sensor layer 100A is provided on the sensor layer 100B.

The sensor layer 100A is a capacitance type touch sensor layer. The sensor layer 100A has a configuration similar to that of the sensor layer 60A in the fourth embodiment except that the sensor layer 100A includes a separation layer 101A, a surface layer 102A, and a separation layer 103A instead of the deformation layer 22A, the conductive layer 23A, and the separation layer 61A (see FIG. 20).

The separation layers 101A and 103A are similar to the separation layers 81B and 81B (see FIG. 27) in the sixth embodiment. The surface layer 102A has an insulating property. The surface layer 102A is formed by, for example, a polymer film or a coating layer or the like. The surface layer 102A can have a configuration similar to that of a surface layer 104A in Modification Example 1 described later.

The sensor layer 100B is a pressure sensor layer that detects a pressure distribution. The sensor layer 100B has a configuration similar to that of the sensor layer 50B (see FIG. 20) in the fourth embodiment.

The sensor layer 100A has flexibility. Thus, the pressure acting on the sensing surface 20S is transmitted to the first surface of the sensor layer 100B (the surface on the side on which the conductive layer 52B is provided), so that the distribution of the pressure acting on the sensing surface 20S can be detected in the sensor layer 100B.

The CPU 12A detects a proximity operation and a touch operation on the sensing surface 20S on the basis of the first output signal (that is, the first capacitance distribution) of the sensor layer 100A supplied from the IC 13A, and executes various controls of the host device 12 on the basis of the detection result. Furthermore, the CPU 12A detects a push-in operation on the sensing surface 20S on the basis of the second output signal (that is, the second capacitance distribution) of the sensor layer 100B supplied from the IC 13A, and executes various controls of the host device 12 on the basis of the detection result.

[Effects]

The sensor 100 according to the eighth embodiment includes the sensor layer 100A as a capacitive touch sensor (proximity detection sensor) and the sensor layer 100B as a pressure distribution sensor, and the sensor layer 100A is provided on the sensor layer 100B. This makes it possible to detect all of the proximity operation, the touch operation (feather touch operation), and the push-in operation by a human finger, a conductive device, or the like.

On the other hand, the sensor 71 (see FIG. 26) of Reference Example 1 can detect the push-in operation, but is difficult to detect the proximity operation and the touch operation (feather touch operation).

8. Modification Example

Modification Example 1

Figure 35:
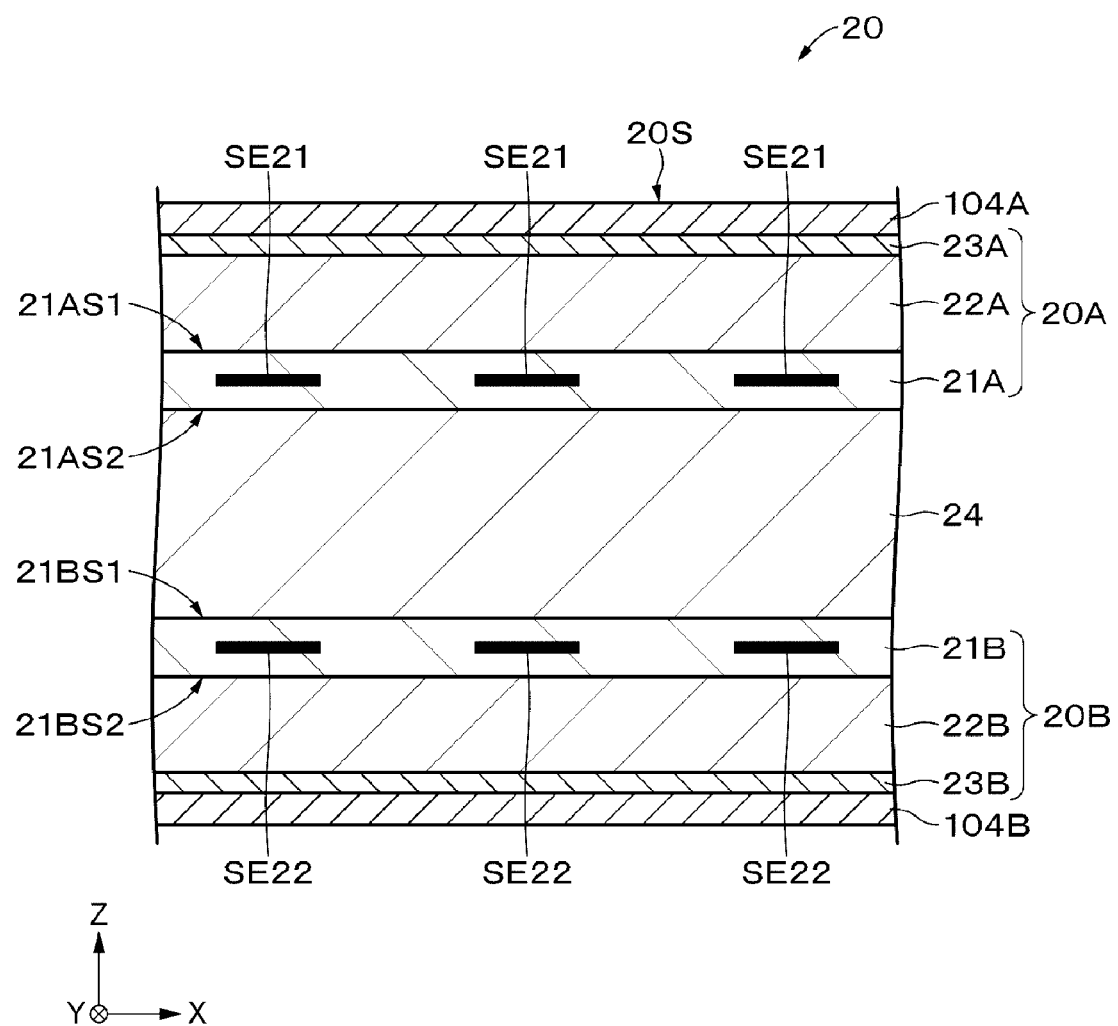
FIG. 35 is a cross-sectional view illustrating an example of a configuration of a sensor according to a modification example.

In the first embodiment, as illustrated in FIG. 35, the sensor 20 may further include a surface layer 104A provided on the sensing surface 20S (that is, the surface on the conductive layer 23A side). The surface layer 104A has an insulating property and is a high friction layer with a surface having a high friction coefficient. Since the sensor 20 further includes the surface layer 104A as described above, it is possible to protect the conductive layer 23A and to suppress sliding of an object on the sensing surface 20S of the sensor 20. Therefore, the conductive layer 23A can be protected, and detection accuracy of the shearing force of the sensor 20 can be improved. The surface layer 104A is formed by, for example, a polymer film or a coating layer or the like.

The surface layer 104A may have an irregularity shape on a surface to achieve the surface having a high friction coefficient, the surface layer 104A may contain a rubber-based resin (for example, silicone rubber) to achieve the surface having a high friction coefficient, or the surface layer 104A may have the irregularity shape on a surface and the surface layer 104A may contain the rubber-based resin to achieve the surface having a high friction coefficient. A static friction coefficient of the surface of the surface layer 104A is preferably 1 or more from the viewpoint of suppressing sliding of an object on the sensing surface 20S of the sensor 20. Here, the static friction coefficient is measured in accordance with JIS K 7125: 1999 using a friction coefficient measuring jig manufactured by IMADA Co., Ltd. The surface layer 104A may be an exterior member of an electronic device or the like.

As illustrated in FIG. 35, the sensor 20 may further include a surface layer 104B provided on the back surface (that is, a surface on the conductive layer 23B side) opposite to the sensing surface 20S.

Similarly in the second to eighth embodiments, the sensors 40, 50, 60, 70, 80, and 90 may further include a surface layer 104A provided on the sensing surface 20S, or may further include a surface layer 104B provided on the back surface opposite to the sensing surface 20S.

Modification Example 2

In the first to eighth embodiments, the case where the reception electrode 36 and the drive electrode 37 have a comb shape has been described, but the shapes of the reception electrode 36 and the drive electrode 37 are not limited to this shape. The reception electrode 36 and the drive electrode 37 may have, for example, a flat plate shape, a net shape, a concentric shape, a spiral shape, a radial shape, a stripe shape, or the like.

Modification Example 3

In the first to eighth embodiments, the case where the reception electrode 36 and the drive electrode 37 are provided on the first surface 31S1 of the base material 31 has been described, but the reception electrode 36 and the drive electrode 37 may be provided on different surfaces of the base material 31. For example, the reception electrode 36 may be provided on the first surface 31S1 of the base material 31, the drive electrode 37 may be provided on the second surface 31S2 of the base material 31, and the reception electrode 36 and the drive electrode 37 may face each other with the base material 31 interposed therebetween.

Modification Example 4

In the first to eighth embodiments, the case where the sensor layers 20A, 20B, 50B, 60A, 70A, 80A, 80B, 90A, 90B, 100A, and 100B (hereinafter referred to as "sensor layers 20A, 20B, and so on") are mutual capacitive sensor layers has been described, but the sensor layers 20A and 20B and the like may be self-capacitive sensor layers. In this case, the sensor layers 20A and 20B and the like include a base material and a thin-film electrode layer provided on the base material.

Modification Example 5

In the first to eighth embodiments, the case where the sensor layers 20A and 20B and the like are capacitance type sensor layers has been described, but the sensor layers 20A and 20B and the like may be sensor layers of a type other than the capacitance type.

Modification Example 6

In the first to eighth embodiments, the detection layer 21A and the detection layer 21B may be configured by one flexible printed circuit board. Thus, the configurations of the sensors 20, 40, 50, 60, 70, 80, and 90 can be simplified. The flexible printed circuit board described above may be folded back between the region including the detection layer 21A and the region including the detection layer 21B, and overlapped with the separation layer 24, the separation layer 25, or the like interposed therebetween.

9. Application Example

Example of Electronic Device

At least one of the sensors 20, 40, 50, 60, 70, 80, 90, or 100 according to the first to eighth embodiments and their modification examples can be applied to various electronic devices. For example, it is applicable to a mobile phone such as a personal computer or a smartphone, a television, a remote controller, a camera, a game device, a navigation system, an electronic book, an electronic dictionary, a portable music player, a keyboard, a wearable terminal, a radio, a stereo, a medical device, a robot, or the like. Examples of the wearable terminal include a smart watch, a head-mounted display, a wristband, a ring, glasses, shoes, clothes, and the like.

Example Other than Electronic Device

At least one of the sensors 20, 40, 50, 60, 70, 80, 90, or 100 according to the first to eighth embodiments and their modification examples can be applied to various devices other than electronic devices. For example, it is applicable to an electric device such as an electric power tool, a refrigerator, an air conditioner, a water heater, a microwave oven, a dishwasher, a washing machine, a dryer, a lighting device, or a toy. Moreover, it is also applicable to buildings including houses, building members, vehicles, furniture such as tables and desks, manufacturing devices, analytical instruments, and the like. Examples of the construction member include a paving stone, a wall member, a floor tile, a floor board, and the like. Examples of the vehicle include a vehicle (for example, an automobile, a motorcycle, or the like), a ship, a submarine, a railway vehicle, an aircraft, a spacecraft, an elevator, playground equipment, and the like.

Application Example to Robot Hand

At least one of the sensors 20, 40, 50, 60, 70, 80, 90, or 100 according to the first to eighth embodiments and their modification examples may be applied to a robot hand.

Figure 36:
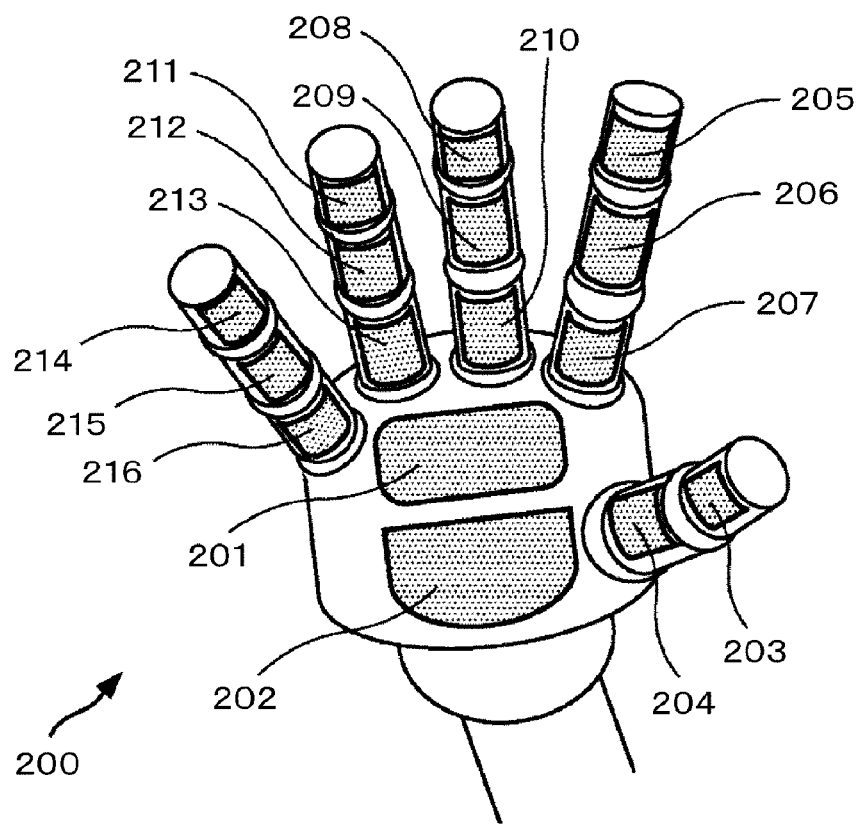
FIG. 36 is a schematic view illustrating an example of a configuration of a robot hand according to an application example.

FIG. 36 illustrates a configuration of a robot hand 200 to which sensors 201 to 216 is applied. The sensors 201 to 216 are any one of the sensors 20, 40, 50, 60, 70, 80, 90, and 100 according to the first to eighth embodiments and their modification examples.

The sensors 201 and 202 are provided in a palm constituting the robot hand 200, the sensor 203 is provided above a first joint on a palm surface of the thumb constituting the robot hand 200, the sensor 204 is provided between the first joint and a second joint, the sensor 205 is provided above a first joint on a palm surface of the index finger, the sensor 206 is provided between the first joint and a second joint, and the sensor 207 is provided between the second joint and a third joint.

Moreover, the sensor 208 is provided above a first joint on a palm surface of the middle finger, the sensor 209 is provided between the first joint and a second joint, the sensor 210 is provided between the second joint and a third joint, the sensor 211 is provided above a first joint on a palm surface of the ring finger, the sensor 212 is provided between the first joint and a second joint, the sensor 213 is provided between the second joint and a third joint, the sensor 214 is provided above a first joint on a palm surface of the little finger, the sensor 215 is provided between the first joint and a second joint, and the sensor 216 is provided between the second joint and a third joint.

Although the embodiments and modification examples of the present disclosure have been specifically described above, the present disclosure is not limited to the embodiments and modification examples described above, and various modification examples based on the technical idea of the present disclosure are possible.

For example, the following modification examples are possible.

For example, the configurations, methods, steps, shapes, materials, numerical values, and the like given in the embodiments and modification examples described above are merely examples, and different configurations, methods, steps, shapes, materials, numerical values, and the like may be used as necessary.

The configurations, methods, steps, shapes, materials, numerical values, and the like of the embodiments and modification examples described above can be combined with each other without departing from the gist of the present disclosure.

Among the materials exemplified in the above-described embodiments and modification examples, one can be used alone or two or more can be used in combination unless otherwise specified.

Further, the present disclosure can employ the following configurations.

(1)

A sensor module including:

a sensor that includes a first sensor layer of a capacitance type including a plurality of first detection units arranged two-dimensionally and a second sensor layer of a capacitance type including a plurality of second detection units arranged two-dimensionally, the first sensor layer being provided on the second sensor layer; and a control unit that scans the plurality of first detection units and the plurality of second detection units.

(2)

The sensor module according to (1), in which the control unit is configured to be capable of scanning a plurality of detection units arranged two-dimensionally, and the control unit scans the plurality of first detection units as a group of detection units included in a first detection region among the plurality of detection units arranged two-dimensionally, and scans the plurality of second detection units as a group of detection units included in a second detection region among the plurality of detection units arranged two-dimensionally.

(3)

The sensor module according to (1) or (2), in which each of the first sensor layer and the second sensor layer includes a plurality of reception electrodes and a plurality of drive electrodes, the first detection unit includes the reception electrodes and the drive electrodes included in the first sensor layer, and the second detection unit includes the reception electrodes and the drive electrodes included in the second sensor layer.

(4)

The sensor module according to (3), in which the first detection unit and the second detection unit do not share the reception electrodes and the drive electrodes.

(5)

The sensor module according to (3), in which the first detection unit and the second detection unit share the reception electrodes or the drive electrodes.

(6)

The sensor module according to any one of (1) to (5), further including a separation layer provided between the first sensor layer and the second sensor layer, in which the first sensor layer and the second sensor layer are pressure distribution sensor layers, and the separation layer is elastically deformed by a shearing force acting in an in-plane direction of the sensor.

(7)

The sensor module according to (6), in which the separation layer includes a gel.

(8)

The sensor module according to any one of (1) to (5), in which the first sensor layer is a pressure sensor layer, and the second sensor layer is a temperature detection sensor layer.

(9)

The sensor module according to any one of (1) to (5), in which the first sensor layer is a capacitance type touch sensor layer, and the second sensor layer is a pressure sensor layer.

(10)

The sensor module according to any one of (1) to (5), in which sensitivity of the first sensor layer is higher compared to sensitivity of the second sensor layer.

(11)

The sensor module according to any one of (1) to (5), in which the two-dimensional arrangement of the plurality of first detection units and the two-dimensional arrangement of the plurality of second detection units are matrix arrangements, the plurality of first detection units and the plurality of second detection units are arranged at an arrangement pitch P in a row direction and a column direction of the matrix arrangements, and the second detection unit is arranged to be shifted from the first detection unit by a distance P/2 in the row direction and the column direction.

(12)

The sensor module according to (6) or (7), in which the first sensor layer includes a first detection layer that has a first surface and a second surface opposite to the first surface, and includes the plurality of first detection units, a first conductive layer provided to face the first surface of the first detection layer, and a first deformation layer that is provided between the first conductive layer and the first detection layer and is elastically deformed according to a pressure acting in a thickness direction of the sensor, and the second sensor layer includes a second detection layer that has a first surface facing the first detection layer and a second surface opposite to the first surface, and includes the plurality of second detection units, a second conductive layer provided to face the second surface of the second detection layer, and a second deformation layer that is provided between the second conductive layer and the second detection layer and is elastically deformed according to a pressure acting in the thickness direction of the sensor.

(13)

The sensor module according to (12), in which the separation layer includes a third conductive layer, a first separation layer that is provided between the first sensor layer and the third conductive layer and separates the first sensor layer and the third conductive layer from each other, and a second separation layer that is provided between the third conductive layer and the second sensor layer and separates the third conductive layer and the second sensor layer from each other.

(14)

The sensor module according to (6) or (7), in which the first sensor layer includes a first detection layer that has a first surface and a second surface opposite to the first surface, and includes the plurality of first detection units, a first conductive layer provided to face the first surface of the first detection layer, a second conductive layer provided to face the second surface of the first detection layer, a first deformation layer that is provided between the first conductive layer and the first detection layer and is elastically deformed according to a pressure acting in a thickness direction of the sensor, and a first separation layer that is provided between the second conductive layer and the first detection layer and separates the second conductive layer and the first detection layer from each other, and the second sensor layer includes a second detection layer that has a first surface facing the first detection layer and a second surface opposite to the first surface, and includes the plurality of second detection units, a third conductive layer provided to face the first surface of the second detection layer, a fourth conductive layer provided to face the second surface of the second detection layer, a second deformation layer that is provided between the third conductive layer and the second detection layer and is elastically deformed according to a pressure acting in the thickness direction of the sensor, and a second separation layer that is provided between the fourth conductive layer and the second detection layer and separates the fourth conductive layer and the second detection layer from each other.

(15)

The sensor module according to (6) or (7), in which the first sensor layer includes a first detection layer that has a first surface and a second surface opposite to the first surface, and includes the plurality of first detection units, a first conductive layer provided to face the first surface of the first detection layer, and a first deformation layer that is provided between the first conductive layer and the first detection layer and is elastically deformed according to a pressure acting in a thickness direction of the sensor, and the second sensor layer includes a second detection layer that has a first surface facing the first detection layer and a second surface opposite to the first surface, and includes the plurality of second detection units, a second conductive layer provided to face the first surface of the second detection layer, a second deformation layer that is provided between the second conductive layer and the second detection layer and is elastically deformed according to a pressure acting in the thickness direction of the sensor, a third conductive layer provided to face the second surface of the second detection layer, and a separation layer that is provided between the third conductive layer and the second detection layer and separates the third conductive layer and the second detection layer.

(16)

The sensor module according to any one of (1) to (15), in which the first sensor layer includes a first detection layer including the plurality of first detection units, the second sensor layer includes a second detection layer including the plurality of second detection units, and the first detection layer and the second detection layer include one flexible substrate.

(17)

The sensor module according to any one of (1) to (16), in which the control unit sequentially scans the plurality of first detection units and the plurality of second detection units.

(18)

A sensor module including:

a sensor that includes a first sensor layer having a plurality of first detection units arranged two-dimensionally and a second sensor layer having a plurality of second detection units arranged two-dimensionally, the first sensor layer being provided on the second sensor layer; and a control unit that scans the plurality of first detection units and the plurality of second detection units.

(19)

An electronic device including the sensor module according to any one of (1) to (18).

REFERENCE SIGNS LIST

10 Electronic device
11 Sensor module
12 Host device
13 Sensor board
13A Sensor IC
14A, 14B Connector
20, 40, 50, 60, 70, 71, 80, 90, 100 Sensor
20A, 60A, 70A, 80A, 90A, 100A Sensor layer (first sensor Layer)
20B, 50B, 80B, 90B, 100B Sensor layer (second sensor Layer)
20S Sensing surface
21A Detection layer (first detection Layer)
21B Detection layer (second detection Layer)
21A1, 21B1 Connection portion
21A2 Connection terminal
21AS1, 21BS1, 31S1 First surface
21AS2, 21BS2, 31S2 Second surface 24, 25A, 25B, 53B, 61A, 81B, 82B, 101A, 103A Separation layer
22A, 22B, 51B Deformation layer
23A, 23B, 25C, 52B, 54B, 62A Conductive layer
31 Base material
32, 33, 38 Plurality of routing wirings
34A, 34B Coverlay film
35A, 35B Adhesive layer
36 Reception electrode
36A Connection line
37 Drive electrode
37A Lead-out wiring
37B Through hole
41 Object
102A, 104A, 104B Surface layer
DB1, DB2 Output signal distribution
P Arrangement pitch
SE21, SE22 Detection unit
SE90 Virtual detection unit

The invention claimed is:

1. A sensor module comprising:
a sensor that includes a first sensor layer including a plurality of first detection units arranged two-dimensionally and a second sensor layer including a plurality of second detection units arranged two-dimensionally, the first sensor layer being provided on the second sensor layer; and
a control unit that scans the plurality of first detection units and the plurality of second detection units,
wherein the sensor module further includes a separation layer provided between the first sensor layer and the second sensor layer,
wherein the first sensor layer and the second sensor layer are pressure distribution sensor layers,
wherein the separation layer is elastically deformed by a shearing force acting in an in-plane direction of the sensor, and
wherein the first sensor layer includes
a first detection layer that has a first surface and a second surface opposite to the first surface, and includes the plurality of first detection units,
a first conductive layer provided to face the first surface of the first detection layer, and
a first deformation layer that is provided between the first conductive layer and the first detection layer and is elastically deformed according to a pressure acting in a thickness direction of the sensor, and
the second sensor layer includes
a second detection layer that has a first surface facing the first detection layer and a second surface opposite to the first surface, and includes the plurality of second detection units,
a second conductive layer provided to face the second surface of the second detection layer, and
a second deformation layer that is provided between the second conductive layer and the second detection layer and is elastically deformed according to a pressure acting in the thickness direction of the sensor.

2. The sensor module according to claim 1, wherein
the control unit is configured to be capable of scanning a plurality of detection units arranged two-dimensionally, and
the control unit
scans the plurality of first detection units as a group of detection units included in a first detection region among the plurality of detection units arranged two-dimensionally, and
scans the plurality of second detection units as a group of detection units included in a second detection region among the plurality of detection units arranged two-dimensionally.

3. The sensor module according to claim 1, wherein
each of the first sensor layer and the second sensor layer includes a plurality of reception electrodes and a plurality of drive electrodes,
the first detection unit includes the reception electrodes and the drive electrodes included in the first sensor layer, and
the second detection unit includes the reception electrodes and the drive electrodes included in the second sensor layer.

4. The sensor module according to claim 3, wherein the first detection unit and the second detection unit do not share the reception electrodes and the drive electrodes.

5. The sensor module according to claim 3, wherein the first detection unit and the second detection unit share the reception electrodes or the drive electrodes.

6. The sensor module according to claim 1, wherein the separation layer includes a gel.

7. The sensor module according to claim 1, wherein
the first sensor layer is a pressure sensor layer, and
the second sensor layer is a temperature detection sensor layer.

8. The sensor module according to claim 1, wherein
the first sensor layer is a capacitance type touch sensor layer, and
the second sensor layer is a pressure sensor layer.

9. The sensor module according to claim 1, wherein sensitivity of the first sensor layer is higher compared to sensitivity of the second sensor layer.

10. The sensor module according to claim 1, wherein
the two-dimensional arrangement of the plurality of first detection units and the two-dimensional arrangement of the plurality of second detection units are matrix arrangements,
the plurality of first detection units and the plurality of second detection units are arranged at an arrangement pitch P in a row direction and a column direction of the matrix arrangements, and
the second detection unit is arranged to be shifted from the first detection unit by a distance P/2 in the row direction and the column direction.

11. The sensor module according to claim 1, wherein
the separation layer includes
a third conductive layer,
a first separation layer that is provided between the first sensor layer and the third conductive layer and separates the first sensor layer and the third conductive layer from each other, and
a second separation layer that is provided between the third conductive layer and the second sensor layer and separates the third conductive layer and the second sensor layer from each other.

12. A sensor module comprising:
a sensor that includes a first sensor layer including a plurality of first detection units arranged two-dimensionally and a second sensor layer including a plurality of second detection units arranged two-dimensionally, the first sensor layer being provided on the second sensor layer; and
a control unit that scans the plurality of first detection units and the plurality of second detection units, wherein the first sensor layer includes
a first detection layer that has a first surface and a second surface opposite to the first surface, and includes the plurality of first detection units,
a first conductive layer provided to face the first surface of the first detection layer,
a second conductive layer provided to face the second surface of the first detection layer,
a first deformation layer that is provided between the first conductive layer and the first detection layer and is elastically deformed according to a pressure acting in a thickness direction of the sensor, and
a first separation layer that is provided between the second conductive layer and the first detection layer and separates the second conductive layer and the first detection layer from each other, and
the second sensor layer includes
a second detection layer that has a first surface facing the first detection layer and a second surface opposite to the first surface, and includes the plurality of second detection units,
a third conductive layer provided to face the first surface of the second detection layer,
a fourth conductive layer provided to face the second surface of the second detection layer,
a second deformation layer that is provided between the third conductive layer and the second detection layer and is elastically deformed according to a pressure acting in the thickness direction of the sensor, and
a second separation layer that is provided between the fourth conductive layer and the second detection layer and separates the fourth conductive layer and the second detection layer from each other,
wherein the sensor module further includes a separation layer provided between the first sensor layer and the second sensor layer,
wherein the first sensor layer and the second sensor layer are pressure distribution sensor layers, and
wherein the separation layer is elastically deformed by a shearing force acting in an in-plane direction of the sensor.

13. A sensor module comprising:
a sensor that includes a first sensor layer including a plurality of first detection units arranged two-dimensionally and a second sensor layer including a plurality of second detection units arranged two-dimensionally, the first sensor layer being provided on the second sensor layer; and
a control unit that scans the plurality of first detection units and the plurality of second detection units, wherein
the first sensor layer includes
a first detection layer that has a first surface and a second surface opposite to the first surface, and includes the plurality of first detection units,
a first conductive layer provided to face the first surface of the first detection layer, and
a first deformation layer that is provided between the first conductive layer and the first detection layer and is elastically deformed according to a pressure acting in a thickness direction of the sensor, and
the second sensor layer includes
a second detection layer that has a first surface facing the first detection layer and a second surface opposite to the first surface, and includes the plurality of second detection units,
a second conductive layer provided to face the first surface of the second detection layer,
a second deformation layer that is provided between the second conductive layer and the second detection layer and is elastically deformed according to a pressure acting in the thickness direction of the sensor,
a third conductive layer provided to face the second surface of the second detection layer, and
a separation layer that is provided between the third conductive layer and the second detection layer and separates the third conductive layer and the second detection layer,
wherein the sensor module further includes a separation layer provided between the first sensor layer and the second sensor layer,
wherein the first sensor layer and the second sensor layer are pressure distribution sensor layers, and
wherein the separation layer is elastically deformed by a shearing force acting in an in- plane direction of the sensor.

14. The sensor module according to claim 1, wherein
the first sensor layer includes a first detection layer including the plurality of first detection units,
the second sensor layer includes a second detection layer including the plurality of second detection units, and
the first detection layer and the second detection layer include one flexible substrate.

15. The sensor module according to claim 1, wherein the control unit sequentially scans the plurality of first detection units and the plurality of second detection units.

16. An electronic device comprising the sensor module according to claim 1.

17. An electronic device comprising the sensor module according to claim 12.

18. An electronic device comprising the sensor module according to claim 13.

19. The sensor module according to claim 1, wherein the first sensor layer is a capacitance type, and wherein the second sensor layer is a capacitance type.

20. The sensor module according to claim 12, wherein the first sensor layer is a capacitance type, and wherein the second sensor layer is a capacitance type.

21. The sensor module according to claim 13, wherein the first sensor layer is a capacitance type, and wherein the second sensor layer is a capacitance type.

* * * * *